(12) United States Patent
Choi et al.

(10) Patent No.: US 11,216,178 B2
(45) Date of Patent: Jan. 4, 2022

(54) VIDEO ENCODING METHOD AND ELECTRONIC DEVICE ADAPTED THERETO

(71) Applicant: SAMSUNG ELECTRONICS CO., LTD., Suwon-si (KR)

(72) Inventors: Bokun Choi, Seoul (KR); Yongjoon Jeon, Hwaseong-si (KR); Seokhyun Yoon, Yongin-si (KR); Hyungsup Byeon, Suwon-si (KR); Donghyun Yeom, Bucheon-si (KR); Inhyuk Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/572,302

(22) Filed: Sep. 16, 2019

(65) Prior Publication Data

US 2020/0012418 A1   Jan. 9, 2020

Related U.S. Application Data

(63) Continuation of application No. 15/429,507, filed on Feb. 10, 2017, now abandoned.

(30) Foreign Application Priority Data

Feb. 11, 2016 (KR) .................. 10-2016-0015656
Aug. 30, 2016 (KR) .................. 10-2016-0110572

(51) Int. Cl.
*G06F 3/0488* (2013.01)
*H04B 1/3827* (2015.01)
(Continued)

(52) U.S. Cl.
CPC ..... *G06F 3/04883* (2013.01); *G06K 9/00255* (2013.01); *G06K 9/00604* (2013.01);
(Continued)

(58) Field of Classification Search
USPC .... 348/14.02, 14.03, 14.08, 14.09, 143, 159
See application file for complete search history.

(56) References Cited

U.S. PATENT DOCUMENTS 7,450,638 B2 * 11/2008 Iwamura .......... G08B 13/19656
   348/E7.051
8,798,609 B2   8/2014 Jeon
(Continued)

OTHER PUBLICATIONS

Choi et al., U.S. Appl. No. 15/429,507, filed Feb. 10, 2017.

*Primary Examiner* — Yosef K Laekemariam
(74) *Attorney, Agent, or Firm* — Nixon & Vanderhye, P.C.

(57) ABSTRACT

A video encoding method and an electronic device adapted to the method are provided. The electronic device includes: a wireless communication circuit configured to communicate with a first electronic device, a touchscreen configured to display a user interface for performing a video call, a speaker, a microphone, one or more processors electrically connected to the communication circuit, the touchscreen, the speaker, and the microphone, and a memory electrically connected to the one or more processors, wherein the memory stores instructions that, when executed, cause the one or more processors to: receive a signal related to an incoming video call from the first electronic device via the wireless communication circuit, receive a user input accepting the video call via the user interface, transmit a signal accepting the video call to the first electronic device via the wireless communication circuit in response to the user input, (Continued)

receive a video stream from the first electronic device via the wireless communication circuit, wherein the video stream has been adapted at the first electronic device, based at least partly on: status information on the electronic device and/or status information on wireless communication between the electronic device and the first electronic device, display the received video stream on the touchscreen while providing voice from the video call, using the speaker, receive voice, using the microphone, and transmit the received voice to the first electronic device, using the wireless communication circuit.

20 Claims, 45 Drawing Sheets

(51) Int. Cl.
*H04N 7/14* (2006.01)
*G06K 9/00* (2006.01)
*H04W 4/80* (2018.01)
*H04N 7/15* (2006.01)

(52) U.S. Cl.
CPC ............ *H04B 1/385* (2013.01); *H04N 7/147* (2013.01); *H04N 7/15* (2013.01); *H04W 4/80* (2018.02); *H04B 2001/3861* (2013.01); *H04N 2007/145* (2013.01)

(56) References Cited

U.S. PATENT DOCUMENTS

| | | |
|---|---|---|
| 2001/0043789 A1 | 11/2001 | Nishimura |
| 2003/0202008 A1* | 10/2003 | McDonald ............ H04L 29/06 715/736 |
| 2007/0177619 A1 | 8/2007 | Jung |
| 2008/0013837 A1 | 1/2008 | Porter |
| 2010/0005390 A1 | 1/2010 | Bong |
| 2011/0018962 A1* | 1/2011 | Lin .................... H04N 21/2402 348/14.13 |
| 2011/0249073 A1 | 10/2011 | Cranfill et al. |
| 2011/0249080 A1 | 10/2011 | Choi |
| 2012/0320146 A1 | 12/2012 | Civanlar et al. |
| 2014/0013342 A1 | 1/2014 | Swan |
| 2014/0362159 A1 | 12/2014 | Zhai et al. |
| 2015/0089029 A1 | 3/2015 | Karaoguz et al. |
| 2015/0146012 A1 | 5/2015 | Shipley |
| 2015/0242062 A1 | 8/2015 | Mehta et al. |
| 2016/0164852 A1 | 6/2016 | McCoy |
| 2016/0165384 A1 | 6/2016 | Amano |
| 2016/0239142 A1 | 8/2016 | Kim |
| 2016/0313913 A1 | 10/2016 | Leem |
| 2017/0013232 A1 | 1/2017 | Pfeffer |
| 2017/0026516 A1 | 1/2017 | Westlake |
| 2017/0031534 A1* | 2/2017 | Singh .................... G06F 3/0481 |
| 2017/0085782 A1* | 3/2017 | Oyman ............. H04N 5/23216 |
| 2017/0111513 A1 | 4/2017 | Ye |
| 2017/0237986 A1 | 8/2017 | Choi et al. |

* cited by examiner

FIG. 18
⟨1801⟩
⟨1803⟩
⟨1805⟩

FIG. 22A
⟨2201⟩
⟨2203⟩
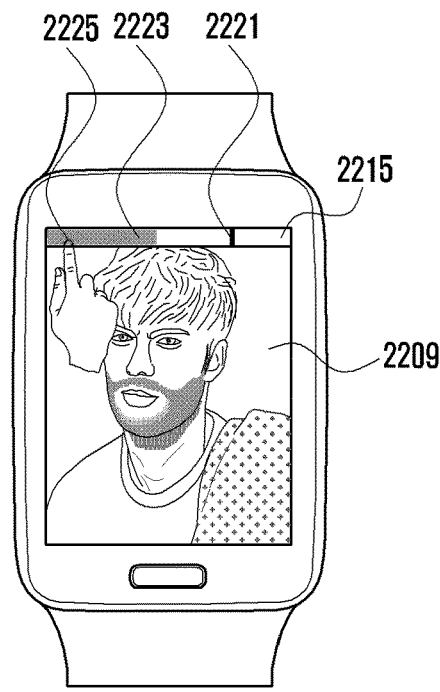
⟨2205⟩
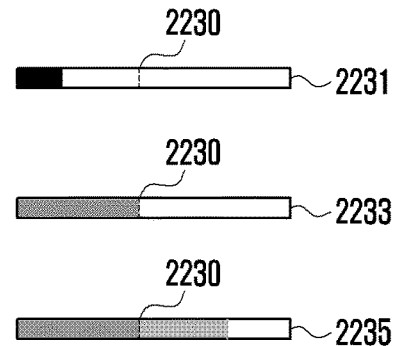
⟨2207⟩

VIDEO ENCODING METHOD AND ELECTRONIC DEVICE ADAPTED THERETO

CROSS-REFERENCE TO RELATED APPLICATIONS

This application is a continuation of U.S. application Ser. No. 15/429,507, filed on Feb. 10, 2017, which claims priority to Korean Patent Application No. 10-2016-0015656 filed on Feb. 11, 2016 and Korean Patent Application No. 10-2016-0110572 filed on Aug. 30, 2016. The contents of each of these applications are incorporated herein in their entirety.

BACKGROUND

1. Field

The present disclosure relates generally to a video encoding method and an electronic device adapted to the method.

2. Description of Prior Art

With the development of mobile communication technology and hardware technology for electronic devices, a real-time video call is possible between electronic devices and high-resolution video data can also be transmitted in real time between electronic devices.

When a real-time video call is connected between electronic devices, the electronic device takes videos of the users via the cameras, encodes the taken video data, and transmits the encoded video data to each party's electronic devices via a network. A real time video call may refer, for example, to a video call allowing two or more users to make a video all to each other in such a way that users' electronic devices synchronize video data with voice data, compress the data, and transmit the compressed data to each other in streaming mode.

During the video call between two electronic devices, the electronic devices take videos, encode the videos, and transmit the encoded data to each other.

However, when an electronic device encodes video data suitable for playing back between stationary devices with high resolution and large battery capacity (level) and transmits the encoded data to a wearable device with low resolution and small (limited) battery capacity, the wearable device may have difficulty in playing back the encoded video data. The encoding process is suitable for playing back video data between electronic devices with high resolution and large battery capacity (level), but is not suitable for wearable devices with low resolution, low (limited) transfer rate, and small (limited) battery capacity to receive and play back encoded video data. That is, the wearable devices may take a relatively long time to receive video data encoded by and transmitted from the electronic device, due to the limited transfer rate and may consume an excessive amount of battery power.

SUMMARY

The present disclosure addresses the above problems and disadvantages, and provides at least the advantages described below. Accordingly, the present disclosure provides a video encoding method and an electronic device adapted to the method.

In accordance with an example aspect of the present disclosure, an electronic device is provided. The electronic device includes: a wireless communication circuit configured to communicate with a first electronic device, a touchscreen configured to display a user interface for performing a video call, a speaker, a microphone, one or more processors electrically connected to the communication circuit, the touchscreen, the speaker, and the microphone, and a memory electrically connected to the one or more processors, wherein the memory stores instructions that, when executed, cause the one or more processors to: receive a signal related to an incoming video call from the first electronic device via the wireless communication circuit, receive a user input accepting the video call via the user interface, transmit a signal accepting the video call to the first electronic device via the wireless communication circuit in response to the user input, receive a video stream from the first electronic device via the wireless communication circuit, wherein the video stream has been adapted at the first electronic device, based at least partly on: status information on the electronic device and/or status information on wireless communication between the electronic device and the first electronic device, display the received video stream on the touchscreen while providing voice from the video call, using the speaker, receive voice, using the microphone, and transmit the received voice to the first electronic device, using the wireless communication circuit.

BRIEF DESCRIPTION OF THE DRAWINGS

The above and other aspects, features and attendant advantages of the present disclosure will be more apparent and readily understood from the following detailed description, taken in conjunction with the accompanying drawings, in which like reference numerals refer to like elements, and wherein:

FIG. 18 is a diagram illustrating an example method of encoding video data in a second electronic device according to various example embodiments of the present disclosure;

FIG. 22A are diagrams illustrating an example user interface including an indicator indicating the quality of video call according to various example embodiments of the present disclosure;

DETAILED DESCRIPTION

Figure 1:
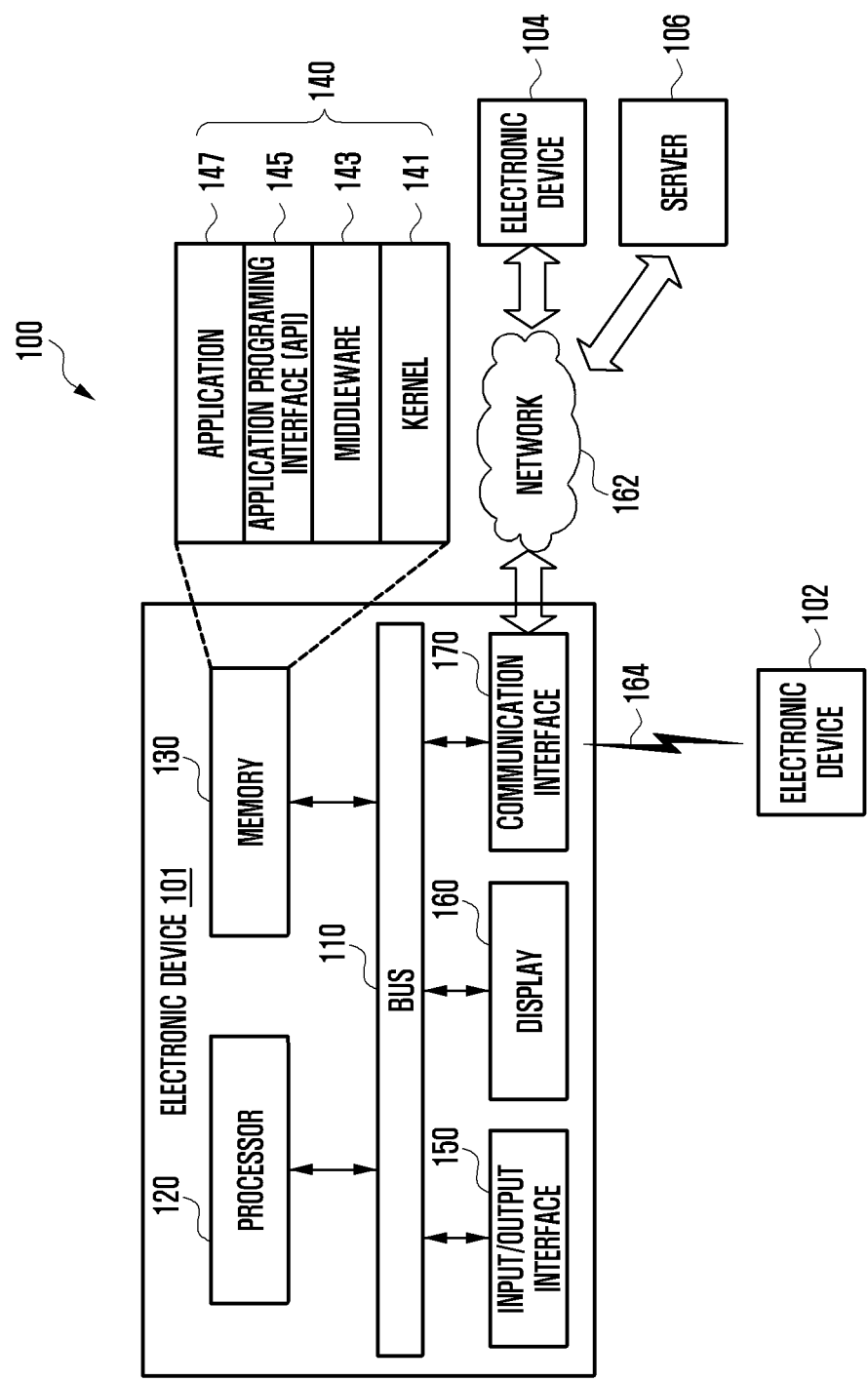
FIG. 1 is a diagram illustrating an example network environment according to various example embodiments of the present disclosure.

Hereinafter, the present disclosure is described with reference to the accompanying drawings. Although various example embodiments are illustrated in the drawings and related detailed descriptions are discussed in the disclosure, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

In various embodiments of the present disclosure, the terms such as "include", "have", "may include" or "may have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "(operatively or communicatively) coupled to" or "connected to" another component, the component may be directly coupled or connected to another component or a new component may exist between the component and another component. On the other hand, when it is stated that a component is "directly coupled to" or "directly connected to" another component, a new component does not exist between the component and another component. In the present disclosure, the expression "configured (or set) to do" may be used interchangeably with, for example, "suitable for doing," "having the capacity to do," "designed to do," "adapted to do," "made to do," or "capable of doing." The expression "configured (or set) to do" may not necessarily be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor (e.g., CPU or application processor or any other processing circuitry) that may execute one or more software programs stored in a memory device to perform corresponding functions.

According to various embodiments, examples of the electronic device may include a smartphone, a tablet Personal Computer (PC), a mobile phone, a video phone, an electronic book reader, a desktop PC, a laptop PC, a netbook computer, a workstation, a server, a Personal Digital Assistant (PDA), a Portable Multimedia Player (PMP), an MP3 player, a medical device, a camera, and a wearable device, or the like, but is not limited thereto. Examples of the wearable device may include an accessory type device (such as, watch, ring, bracelet, ankle bracelet, necklace, glasses, contact lens, and Head-Mount Device (HMD)), a textile or clothes type device (such as electronic clothes), a body-attached type (such as skin pad and tattoo), and a bio-implemented type, or the like, but is not limited thereto. According to an embodiment, examples of the electronic device may include a television, a Digital Video Disc (DVD) player, an audio player, a refrigerator, an air conditioner, a cleaner, an oven, a microwave oven, a laundry machine, an air purifier, a set-top box, a home automation control panel, a security control panel, a media box (such as Samsung HomeSync™ apple TV™, and google TV™), a game console (such as Xbox™ and PlayStation™), an electronic dictionary, an electronic key, a camcorder, and an electronic frame, or the like, but is not limited thereto.

According to an embodiment, examples of the electronic device may include a medical device (such as portable medical sensors (including glucometer, heart rate sensor, tonometer, and body thermometer), Magnetic Resonance Angiography (MRA) device, Magnetic Resonance Imaging (MRI) device, Computed Tomography (CT) device, camcorder, and microwave scanner), a navigation device, a Global navigation Satellite System (GNSS), an Event Data Recorder (EDR), a Flight Data Recorder (FDR), an automotive infotainment device, marine electronic equipment (such as marine navigation system and gyro compass), aviation electronics (avionics), an automotive head unit, an industrial or household robot, an Automatic Teller Machine (ATM), a Point Of Sales (POS) terminal, and an Internet-of-Things (IoT) device (such as electric bulb, sensor, sprinkler system, fire alarm system, temperature controller, street lamp, toaster, fitness equipment, hot water tank, heater, and boiler), or the like, but is not limited thereto.

According to an embodiment, examples of the electronic device may include furniture, a building/structure, a part of a vehicle, an electronic board, an electronic signature receiving device, a projector, and a sensor (such as water, electricity, gas, and electric wave meters), or the like, but is not limited thereto. According to various embodiments, the electronic device may be flexible or a combination of at least two of the aforementioned devices. According to an embodiment, the electronic device is not limited to the aforementioned devices.

In the disclosure, the term "user" may denote a person who uses the electronic device or a device (e.g., artificial intelligent electronic device) which uses the electronic device.

FIG. 1 is a diagram illustrating an example network environment including electronic devices according to various example embodiments.

Referring to FIG. 1, electronic device (an electronic device 101, a first external device 102 and a second external device 104) or server 106 may be connected with network 162 through short-range communication 164.

The electronic device 101, in a network environment 100, includes a bus 110, a processor (e.g., including processing circuitry) 120, a memory 130, an input/output interface (e.g., including input/output circuitry) 150, a display 160, and a communication interface (e.g., including communication circuitry) 170. According to some embodiments, the electronic device 101 may omit at least one of the components or further include another component.

The bus 110 may be a circuit connecting the above described components 110-170 and transmitting communication (e.g., a control message or data) between the above described components.

The processor 120 may include various processing circuitry, such as, for example, and without limitation one or more of a dedicated processor, a central processing unit (CPU), application processor (AP) or communication processor (CP). For example, the processor 120 may control at least one component of the electronic device 101 and/or execute calculation relating to communication or data processing.

The memory 130 may include volatile and/or non-volatile memory. For example, the memory 130 may store command or data relating to at least one component of the electronic device 101. According to some embodiment, the memory 130 may store software and/or program 140. For example, the program 140 may include a kernel 141, middleware 143, an application programming interface (API) 145, and/or an application 147 and so on. At least one portion of the kernel 141, the middleware 143 and the API 145 may be defined as operating system (OS).

The kernel 141 controls or manages system resources (e.g., the bus 110, the processor 120, or the memory 130) used for executing an operation or function implemented by the remaining other program, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. Further, in operation requests received from the application 147, the middleware 143 performs a control for the operation requests (e.g., scheduling or load balancing) by using a method of assigning a priority, by which system resources (e.g., the bus 110, the processor 120, the memory 130 and the like) of the electronic device 101 may be used, to the application 147.

The API 145 is an interface by which the application 147 may control a function provided by the kernel 141 or the middleware 143 and includes, for example, at least one interface or function (e.g., command) for a file control, a window control, image processing, or a character control.

The input/output interface 150 may include various input/output circuitry configured to provide an interface to transmit command or data input by a user or another external device to another component(s) of the electronic device 101. Further, the input/output interface 150 may output the command or data received from the another component(s) of the electronic device 101 to the user or the another external device.

The display 160 may include, for example, liquid crystal display (LCD), light emitting diode (LED), organic LED (OLED), or micro electro mechanical system (MEMS) display, or electronic paper display, or the like, but is not limited thereto. The display 160 may display, for example, various contents (text, image, video, icon, or symbol, and so on) to a user. The display 160 may include a touch screen, and receive touch, gesture, approaching, or hovering input using a part of body of the user.

The communication interface 170 may include various communication circuitry configured to set communication of the electronic device 101 and external device (e.g., a first external device 102, a second external device 104, or a server 1106). For example, the communication interface 170 may be connected with the network 162 through wireless communication or wire communication and communicate with the external device (e.g., a second external device 104 or server 106).

Wireless communication may use, as cellular communication protocol, at least one of LTE (long-term evolution), LTE-A (LTE Advance), CDMA (code division multiple access), WCDMA (wideband CDMA), UMTS (universal mobile telecommunications system), WiBro (Wireless Broadband), GSM (Global System for Mobile Communications), and the like, for example. A short-range communication 164 may include, for example, at least one of Wi-Fi, Bluetooth, Near Field Communication (NFC), Magnetic Secure Transmission or near field Magnetic data Stripe Transmission (MST), and Global Navigation Satellite System (GNSS), and the like. The GNSS may include at least one of, for example, a Global Positioning System (GPS), a Global navigation satellite system (Glonass), a Beidou Navigation Satellite System (hereinafter, referred to as "Beidou"), and Galileo (European global satellite-based navigation system). Hereinafter, the "GPS" may be interchangeably used with the "GNSS" in the disclosure. Wired communication may include, for example, at least one of USB (universal serial bus), HDMI (high definition multimedia interface), RS-232 (recommended standard-232), POTS (plain old telephone service), and the like. The network 162 may include telecommunication network, for example, at least one of a computer network (e.g., LAN or WAN), internet, and a telephone network.

Each of the first external device 102 and the second external device 104 may be same type or different type of device with the electronic device 101. According to some embodiment, the server 106 may include one or more group of servers. According to various embodiment, at least one portion of executions executed by the electronic device may be performed by one or more electronic devices (e.g., external electronic device 102, 104, or server 106). According to some embodiments, when the electronic device 101 should perform a function or service automatically, the electronic device 101 may request performing of at least one function to another device (e.g., external electronic device 102, 104, or server 106). The another device (e.g., external electronic device 102, 104, or server 106) may perform the requested function or additional function, and may transfer a result of the performance to the electronic device 101. The electronic device 101 may additionally process the received result to provide the requested function or service. For the above, cloud computing technology, distributed computing technology, or client-server computing technology may be used, for example.

Figure 2:
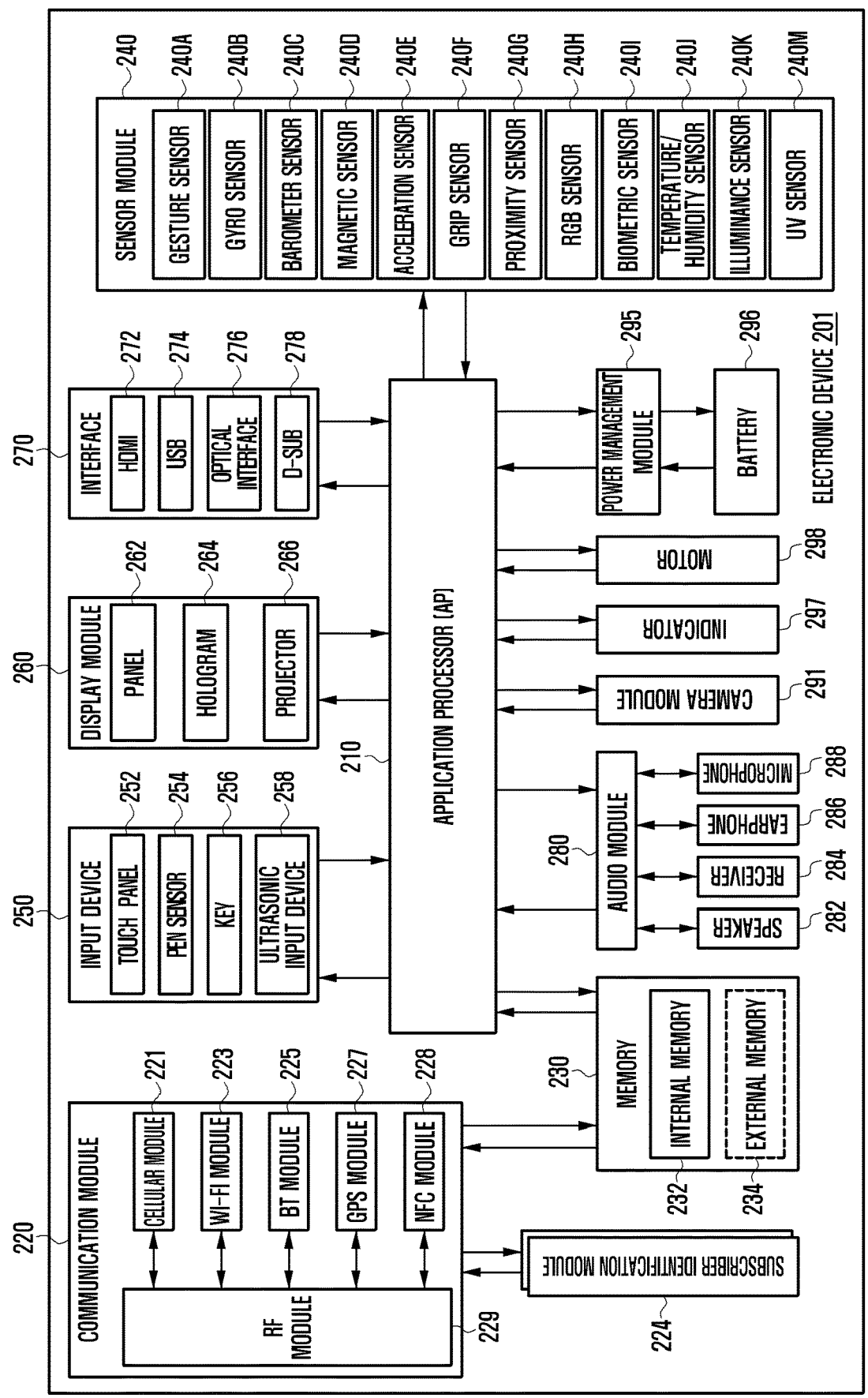
FIG. 2 is a block diagram illustrating an example electronic device according to various example embodiments of the present disclosure.

FIG. 2 is a block diagram illustrating an example electronic device according to various example embodiments.

Referring to FIG. 2, an electronic device 201 may include, for example, a whole or a part of the electronic device 101 illustrated in FIG. 1. The electronic device 201 includes one or more APs (e.g., including processing circuitry) 210, a communication module (e.g., including communication circuitry) 220, a subscriber identification module (SIM) card 224, a memory 230, a sensor module 240, an input device (e.g., including input circuitry) 250, a display 260, an interface (e.g., including interface circuitry) 270, an audio module 280, a camera module 291, a power managing module 295, a battery 296, an indicator 297, and a motor 298.

The AP 210 may include various processing circuitry and operates an OS or an application program so as to control a plurality of hardware or software component elements connected to the AP 210 and execute various data processing and calculations including multimedia data. The AP 210 may be implemented by, for example, a system on chip (SoC). According to an embodiment, the processor 210 may further include a graphics processing unit (GPU) and/or image signal processor. The AP 210 may include at least one portion of components illustrated in FIG. 2 (e.g., a cellular module 221). The AP 210 may load command or data received from at least one of another component (e.g., non-volatile memory), store various data in the non-volatile memory.

The communication module 220 may include the same or similar components with the communication interface 170 of FIG. 1. The communication module 220 may include various communication circuitry therein, such as, for example, and without limitation, a cellular module 221, a Wi-Fi module 223, a BT module 225, a GPS module 227, a NFC module 228, and a radio frequency (RF) module 229.

The cellular module 221 provides a voice, a call, a video call, a short message service (SMS), or an internet service through a communication network (e.g., LTE, LTE-A, CDMA, WCDMA, UMTS, WiBro, GSM and the like). Further, the cellular module 221 may distinguish and authenticate electronic devices within a communication network by using a SIM (e.g., the SIM card 224). According to an embodiment, the cellular module 221 performs at least some of the functions which may be provided by the AP 210. For example, the cellular module 221 may perform at least some of the multimedia control functions. According to an embodiment, the cellular module 221 may include a CP.

Each of the Wi-Fi module 223, the BT module 225, the GPS module 227, and the NFC module 228 may include, for example, a processor for processing data transmitted/received through the corresponding module.

According to various embodiments, at least part of the cellular module 221, the Wi-Fi module 223, the BT module 225, the GPS module 227, and the NFC module 228 may be included in one integrated chip (IC) or one IC package.

The RF module 229 transmits/receives data, for example, an RF signal. Although not illustrated, the RF module 229 may include, for example, a transceiver, a power amp module (PAM), a frequency filter, a low noise amplifier (LNA), antenna and the like.

According to various embodiments, at least one of the cellular module 221, the Wi-Fi module 223, the BT module 225, the GPS module 227, and the NFC module 228 may transmit/receive an RF signal through a separate RF.

The SIM card 224 may refer, for example, to a card including a SIM and may be inserted into a slot formed in a particular portion of the electronic device. The SIM card 224 includes unique identification information (e.g., integrated circuit card identifier (ICCID)) or subscriber information (e.g., international mobile subscriber identity (IMSI)).

The memory 230 (e.g., memory 130) may include an internal memory 232 and/or an external memory 234. The internal memory 1232 may include, for example, at least one of a volatile memory (e.g., a random access memory (RAM), a dynamic RAM (DRAM), a static RAM (SRAM), a synchronous dynamic RAM (SDRAM), and the like), and a non-volatile Memory (e.g., a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, etc.), a hard drive, a solid state drive (SSD), etc.

According to an embodiment, the external memory 234 may further include a flash drive, for example, a compact flash (CF), a secure digital (SD), a micro-SD, a mini-SD, an extreme digital (xD), or a memory stick. The external memory 1234 may be functionally connected to the electronic device 201 through various interfaces. According to an embodiment, the electronic device 201 may further include a storage device (or storage medium) such as a hard drive.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometer) sensor 240C, a magnetic sensor 240D, an acceleration sensor 240E, a grip sensor 240F, a proximity sensor 240G, a color sensor 240H (e.g., red, green, and blue (RGB) sensor) 240H, a biometric sensor 240I, a temperature/humidity sensor 240J, an illuminance (e.g., light) sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, a fingerprint sensor (not illustrated), and the like. The sensor module 240 may further include a control circuit for controlling one or more sensors included in the sensor module 240. In embodiments, the electronic device 201 is capable of including a processor, configured as part of the processor 210 or a separate component, for controlling the sensor module 240. In this case, while the processor 210 is operating in sleep mode, the processor is capable of controlling the sensor module 240.

The input device 250 may include various input circuitry, such as, for example, and without limitation, a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 may recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which may detect an acoustic wave by a microphone (e.g., a microphone 288) through an input means generating an ultrasonic signal to identify data and may perform wireless recognition.

The display 260 (e.g., display 160) includes a panel 262, a hologram unit or device 264, and a projector 266. The panel 262 may be implemented to be, for example, flexible, transparent, or wearable. The panel 262 may also be incorporated into one module together with the touch panel 252. The According to one embodiment, the panel 262 may include a pressure sensor (or force sensor) capable of measuring the intensity of the pressure on the user's touch. The pressure sensor may be integrated with the touch panel 252, or may be implemented by one or more sensors separate from the touch panel 252. The hologram device 264 shows a stereoscopic image in the air by using interference of light. The projector 266 projects light on a screen to display an image. For example, the screen may be located inside or outside the electronic device 201. According to an embodiment, the display 260 may further include a control circuit for controlling the panel 262, the hologram device 264, and the projector 266.

The interface 270 may include various interface circuitry, such as, for example, and without limitation, a HDMI 272, an USB 274, an optical interface 276, and a D-subminiature (D-sub) 278. The interface 270 may be included in, for example, the communication interface 170 illustrated in FIG. 1. Additionally or alternatively, the interface 270 may include, for example, a mobile high-definition link (MHL) interface, an SD card/multi-media card (MMC), or an infrared data association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, the microphone 288 and the like.

The camera module 291 is a device which may photograph a still image and a video. According to an embodiment, the camera module 291 may include one or more image sensors (e.g., a front sensor or a back sensor), an image signal processor (ISP) (not shown) or a flash (e.g., an LED or xenon lamp).

The power managing module 295 manages power of the electronic device 201. Although not illustrated, the power managing module 295 may include, for example, a power management integrated circuit (PMIC), a charger IC, or a battery or fuel gauge.

The PMIC may be mounted to, for example, an integrated circuit or a SoC semiconductor. A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier and the like may be added.

The battery fuel gauge measures, for example, a remaining quantity of the battery 296, or a voltage, a current, or a temperature during charging. The battery 296 may store or generate electricity and supply power to the electronic device 201 by using the stored or generated electricity. The battery 296 may include a rechargeable battery or a solar battery.

The indicator 297 shows particular statuses of the electronic device 201 or a part (e.g., AP 210) of the electronic device 201, for example, a booting status, a message status, a charging status and the like. The motor 298 converts an electrical signal to a mechanical vibration. Although not illustrated, the electronic device 201 may include a processing unit (e.g., GPU) for supporting a module TV. The processing unit for supporting the mobile TV may process, for example, media data according to a standard of digital multimedia broadcasting (DMB), digital video broadcasting (DVB), media flow and the like.

Each of the components of the electronic device according to various embodiments may be implemented by one or more components and the name of the corresponding component may vary depending on a type of the electronic device. The electronic device according to various embodiments may include at least one of the above described components, a few of the components may be omitted, or additional components may be further included. Also, some of the components of the electronic device according to various embodiments may be combined to form a single entity, and thus may equivalently execute functions of the corresponding components before being combined.

Figure 3:
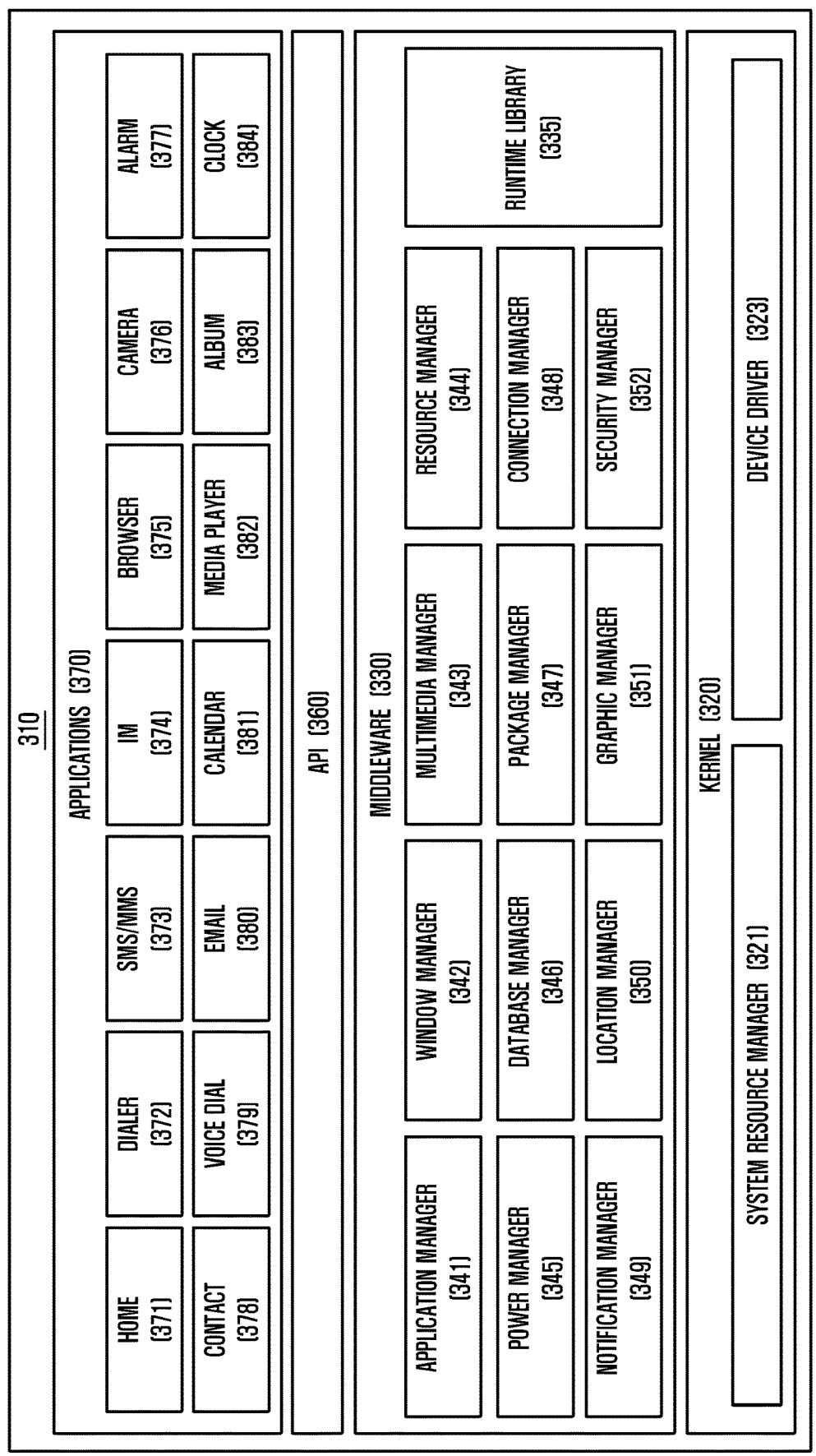
FIG. 3 is a block diagram illustrating an example program module according to various example embodiments of the present disclosure.

FIG. 3 is a block diagram illustrating an example programming module according to various example embodiments.

Referring to FIG. 3, a programming module 310 may be included, e.g. stored, in the electronic apparatus 100, e.g. the memory 130, as illustrated in FIG. 1. At least a part of the programming module 310 (e.g., program 140) may be realized by software, firmware, hardware, and/or combinations of two or more thereof. The programming module 310 may include an OS that is implemented in hardware, e.g., the hardware 200 to control resources related to an electronic device, e.g., the electronic device 100, and/or various applications. e.g., application 147, driven on the OS. For example, the OS may be Android, iOS, Windows, Symbian, Tizen, Bada, and the like.

Referring to FIG. 3, the programming module 310 may include a kernel 320 (e.g., kernel 141, middleware 330 (e.g., middleware 143), an API 360 (e.g., API 145), and the applications 370 (e.g., application 147). At least part of the program module 310 may be preloaded on the electronic device or downloaded from a server (e.g., an electronic device 102, 104, server 106, etc.).

The kernel 320 may include a system resource manager 321 and/or a device driver 323. The system resource manager 321 may control, allocate, and/or collect system resources. The system resource manager 321 may include, for example, a process manager, a memory manager, and a file system manager. The device driver 323 may include, for example, a display driver, a camera driver, a BT driver, a shared memory driver, a USB driver, a keypad driver, a Wi-Fi driver, and an audio driver. Further, according to an embodiment, the device driver 323 may include an inter-process communication (IPC) driver (not illustrated).

The middleware 330 may include a plurality of modules implemented in advance for providing functions commonly used by the applications 370. Further, the middleware 330 may provide the functions through the API 360 such that the applications 370 may efficiently use restricted system resources within the electronic apparatus. For example, as illustrated in FIG. 3, the middleware 330 may include at least one of a runtime library 335, an application manager 341, a window manager 342, a multimedia manager 343, a resource manager 344, a power manager 345, a database manager 346, a package manager 347, a connectivity (e.g., connection) manager 348, a notification manager 349, a location manager 350, a graphic manager 351, and a security manager 352.

The runtime library 335 may include a library module that a compiler uses in order to add a new function through a programming language while one of the applications 370 is being executed. According to an embodiment, the runtime library 335 may perform an input/output, memory management, and/or a function for an arithmetic function.

The application manager 341 may manage a life cycle of at least one of the applications 370. The window manager 342 may manage graphical user interface (GUI) resources used by a screen. The multimedia manager 343 may detect formats used for reproduction of various media files, and may perform encoding and/or decoding of a media file by using a codec suitable for the corresponding format. The resource manager 344 may manage resources such as a source code, a memory, and a storage space of at least one of the applications 370.

The power manager 345 may manage a battery and/or power, while operating together with a basic input/output system (BIOS), and may provide power information used for operation. The database manager 346 may manage generation, search, and/or change of a database to be used by at least one of the applications 370. The package manager 347 may manage installation and/or an update of an application distributed in a form of a package file.

For example, the connectivity manager 348 may manage wireless connectivity such as Wi-Fi or BT. The notification manager 349 may display and/or notify of an event, such as an arrival message, a promise, a proximity notification, and the like, in such a way that does not disturb a user. The location manager 350 may manage location information of an electronic apparatus. The graphic manager 351 may manage a graphic effect which will be provided to a user, and/or a user interface related to the graphic effect. The security manager 352 may provide all security functions used for system security and/or user authentication. According to an embodiment, when an electronic apparatus, e.g., the electronic apparatus 100, has a telephone call function, the middleware 330 may further include a telephony manager (not illustrated) for managing a voice and/or video communication function of the electronic apparatus.

The middleware 330 may generate and use a new middleware module through various functional combinations of the aforementioned internal element modules. The middleware 330 may provide modules specialized according to types of OSs in order to provide differentiated functions. Further, the middleware 330 may dynamically remove some of the existing elements and/or add new elements. Accordingly, the middleware 330 may exclude some of the elements described in the various embodiments, further include other elements, and/or substitute the elements with elements having a different name and performing a similar function.

The API 360 is a set of API programming functions, and may be provided with a different configuration according to the OS. For example, in a case of Android or iOS, one API set may be provided for each of platforms, and in a case of Tizen, two or more API sets may be provided.

The applications 370 may include one or more applications for performing various functions, e.g., home 371, dialer 372, SMS/MMS 373, instant message (IM) 374, browser 375, camera 376, alarm 377, contact 378, voice dial 379, email 380, calendar 381, media player 382, album 383, clock 384, health care (e.g., an application for measuring amount of exercise, blood sugar level, etc.), and environment information (e.g., an application for providing atmospheric pressure, humidity, temperature, etc.), not shown.

According to an embodiment, the applications 370 are capable of including an application for supporting information exchange between an electronic device and an external device, which is hereafter called 'information exchange application'. The information exchange application is capable of including a notification relay application for relaying specific information to external devices or a device management application for managing external devices.

For example, the notification relay application is capable of including a function for relaying notification information, created in other applications of the electronic device to external devices. In addition, the notification relay application is capable of receiving notification information from external devices to provide the received information to the user.

The device management application is capable of managing (e.g., installing, removing or updating) at least one function of an external device communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc.

According to an embodiment, the applications 370 are capable of including an application (e.g., a health care application of a mobile medical device, etc.) specified attributes of an external device. According to an embodiment, the applications 370 are capable of including applications received from an external device. According to an embodiment, the applications 370 are capable of including a preloaded application or third party applications that can be downloaded from a server. It should be understood that the components of the program module 310 may be called different names according to types of operating systems.

According to various embodiments, at least part of the program module 310 can be implemented with software, firmware, hardware, or any combination of two or more of them. At least part of the program module 310 can be implemented (e.g., executed) by a processor (e.g., processor 210). At least part of the programming module 310 may include modules, programs, routines, sets of instructions or processes, etc., in order to perform one or more functions.

The term "module" used in the disclosure may refer to, for example, a unit including at least one combination of hardware (e.g., circuitry), software, and firmware. The "module" may be interchangeably used with a term, such as unit, logic, logical block, component, and/or circuit. The "module" may be a minimum unit of an integrally configured article and/or a part thereof. The "module" may be a minimum unit performing at least one function and/or a part thereof. The "module" may be mechanically and/or electronically implemented. For example, the "module" according to the disclosure may include at least one of processing circuitry (e.g., a CPU), a dedicated processor, an application-specific IC (ASIC) chip, a field-programmable gate arrays (FPGA), and a programmable-logic device for performing operations which has been known and/or are to be developed.

According to various embodiments, at least some of the devices (e.g., modules or functions thereof) or the method (e.g., operations) according to the disclosure may be implemented by a command stored in a computer-readable storage medium in a programming module form. When the instructions are executed by at least one processor (e.g., the processor 120), the at least one processor may perform functions corresponding to the instructions. The computer-readable storage medium may be, for example, the memory 130. At least a part of the programming module may be implemented (e.g., executed) by, for example, the processor 120. At least some of the programming modules may include, for example, a module, a program, a routine, a set of instructions or a process for performing one or more functions.

The computer-readable recording medium may include magnetic media such as a hard disk, a floppy disk, and a magnetic tape, optical media such as a compact disc ROM (CD-ROM) and a DVD, magneto-optical media such as a floptical disk, and hardware devices specially configured to store and perform a program instruction (e.g., programming module), such as a ROM, a RAM, a flash memory and the like. In addition, the program instructions may include high class language codes, which may be executed in a computer by using an interpreter, as well as machine codes made by a compiler. The aforementioned hardware device may be configured to operate as one or more software modules in order to perform the operation of the disclosure, and vice versa.

The module or programming module of the disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

Figure 4:
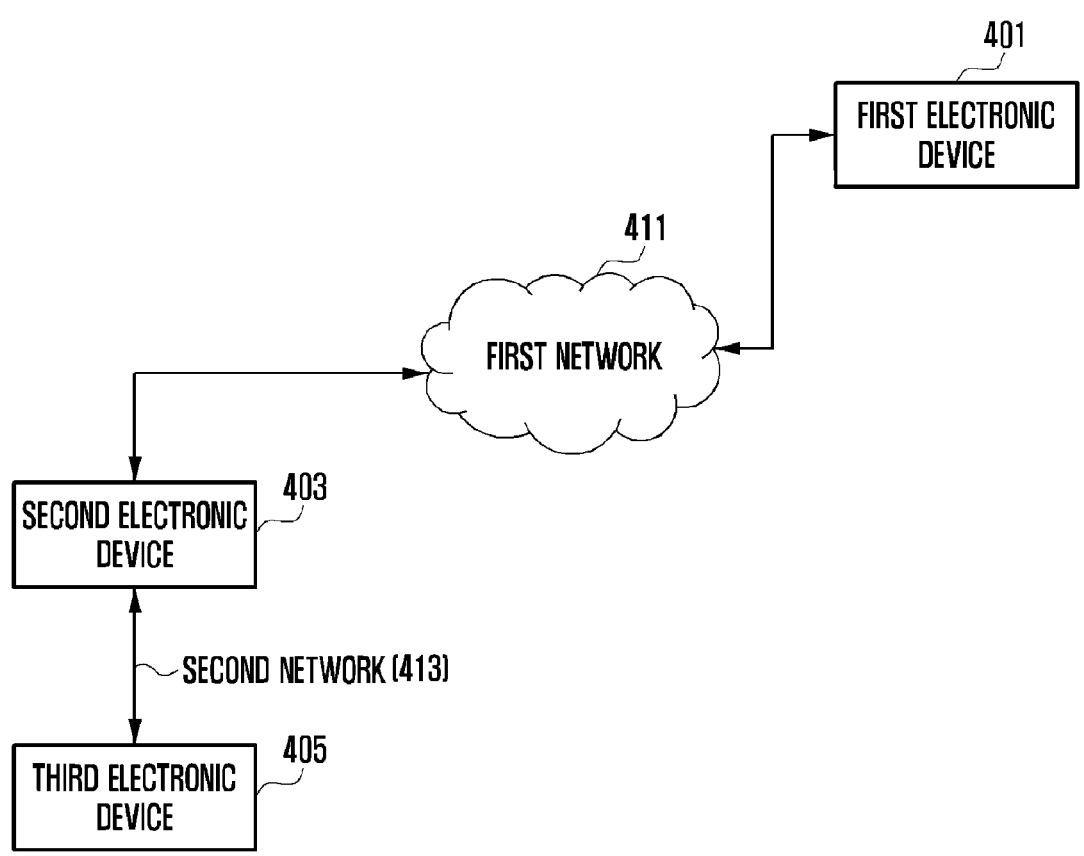
FIG. 4 is a block diagram illustrating an example connection between first to third electronic devices according to various example embodiments of the present disclosure.

FIG. 4 is a block diagram illustrating an example connection between first to third electronic devices according to various embodiments of the present disclosure.

With reference to FIG. 4, various embodiments of the present disclosure are described assuming that: a first electronic device 401 is an electronic device (calling electronic device) transmitting a video call request signal; a second electronic device 403 is an electronic device (referred to herein as electronic device) receiving the video call request signal from the first electronic device 401; and a third electronic device 405 is an electronic device, connected to the second electronic device 403, which receives the video call request signal from the second electronic device 403 and performs a video call with the first electronic device 401. For example, the third electronic device 405 may be a wearable device whose display size is, for example, less than or equal to 4 inches.

In various embodiments of the present disclosure, the first electronic device 401 and the second electronic device 403 are connected to each other via a first network 411, e.g., 3G or LTE network. The second electronic device 403 and the third electronic device 405 are connected to each other via a second network 413, e.g., a low-power network, such as a Bluetooth or Wi-Fi network.

In various embodiments of the present disclosure, the third electronic device 405 has a display which is smaller in size than those of the first electronic device 401 and the second electronic device 403. For example, the third electronic device 405 has a display size of 4 inches. The first electronic device 401 and the second electronic device 403 have a display size of 7 inches. The smaller the display size of the third electronic device 405, the lower the resolution that the third electronic device 405 supports compared to the first electronic device 401 and the second electronic device 403. As described above, the third electronic device 405 is capable of operating according to: a signal detected via its sensor; or a control signal received from the second electronic device 403 via the second network 413, e.g., a low power network such as Bluetooth or Wi-Fi network.

In various embodiments of the present disclosure, video data, related to a video call performed by the third electronic device 405 connected to the first and second electronic devices 401 and 403 via the second network 413, may be processed (e.g., encoded) by the first electronic device 401 or the second electronic device 403.

Processing video data related to a video call performed by the first electronic device 401 will be described in greater detail below with reference to FIGS. 6 to 8.

Processing video data related to a video call performed by the second electronic device 403 will be described in greater detail below with reference to FIG. 9.

Figure 5:
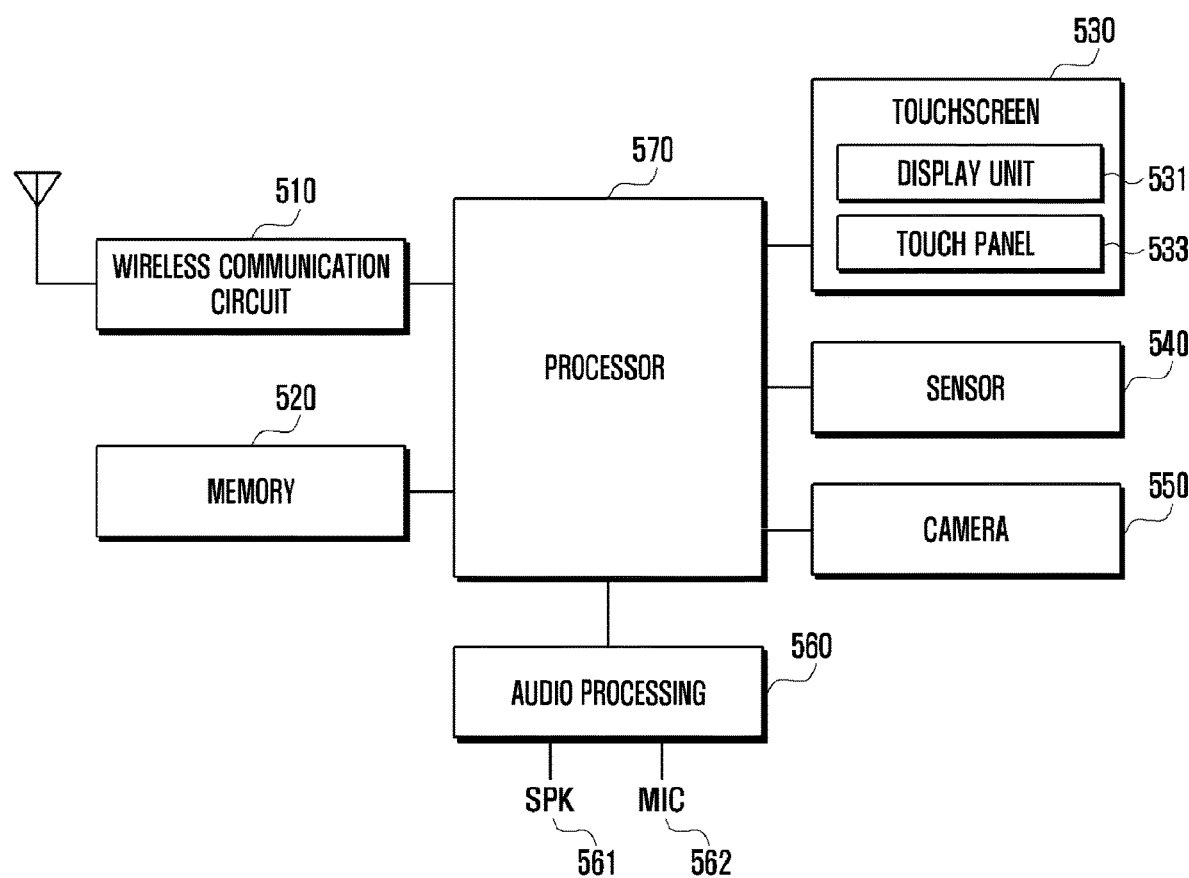
FIG. 5 is a block diagram illustrating an example electronic device according to various example embodiments of the present disclosure.

FIG. 5 is a block diagram illustrating an example electronic device according to various embodiments of the present disclosure.

With reference to FIG. 5, the electronic device may include a wireless communication circuit 510, a memory 520, a touchscreen 530, a sensor 540, a camera 550, an audio processing 560, and a processor 570.

In various embodiments of the present disclosure, the electronic device serves as: an electronic device (calling electronic device) making a video call request, e.g., the first electronic device 401 illustrated in FIG. 4; an electronic device (called electronic device) receiving the video call request, e.g., the second electronic device 403 illustrated in FIG. 4; and an electronic device accepting the video call request and performing a video call, e.g., the third electronic device 405 illustrated in FIG. 4.

In various embodiments of the present disclosure, the wireless communication circuit 510 (e.g., the communication interfaces 170 and 220 illustrated in FIGS. 1 and 2, respectively) may include various communication circuitry and is capable of connecting to (including) first and second networks. The first network is capable of connecting, in communication, an electronic device (calling electronic device) making a video call request, e.g., the first electronic device 401 illustrated in FIG. 4, and an electronic device (called electronic device) receiving the video call request, e.g., the second electronic device 403 illustrated in FIG. 4. The second network is capable of connecting, in communication, the electronic device (called electronic device) receiving the video call request, e.g., the second electronic device 403 illustrated in FIG. 4, and an electronic device accepting the video call request and performing a video call, e.g., the third electronic device 405 illustrated in FIG. 4. The electronic devices are capable of transmitting/receiving a video call request signal and the acceptance signal in response to the video call request signal to/from each other via the first and second networks. The electronic devices are capable of transmitting/receiving video data for a video call and information regarding the electronic devices to/from each other via the first and second networks.

In various embodiments of the present disclosure, the memory 520 (e.g., the memory 130 illustrated in FIG. 1 and the memory 230 illustrated in FIG. 2) is capable of storing information regarding at least one electronic device capable of performing a video call, e.g., a type of electronic device, a display size, a form (e.g., a circle, a rectangle, a square, or the like), the battery capacity; the screen resolution, CPU power consumption, etc. The memory 520 is also capable of mapping and storing a function or a user interface, displayed according to: a direction in which the user input is detected, a user input, a duration of the user input, a level of a hovering input, or a pressure level of the user input.

In various embodiments of the present disclosure, the touchscreen 530 is capable of including a display unit 531 (e.g., displays 160 and 260 illustrated in FIGS. 1 and 2 respectively) and a touch panel 533 (e.g., the input module 250 illustrated in FIG. 2), configuring into a single body.

In various embodiments of the present disclosure, the display unit 531 is capable of displaying a user interface for controlling functions related to a video call. The display unit 531 is capable of displaying video data for performing a video call. When the display unit 531 detects a user input under the control of the processor 570, it is capable of displaying a user interface, based on a duration of the detected user input, a pressure level of the detected user input, or a direction in which the user input is detected. When the display unit 531 detects a hovering input under the control of the processor 570, it is capable of analyzing a level of the detected hovering input and displaying a user interface mapped to the analyzed hovering input level.

In various embodiments of the present disclosure, the sensor 540 (e.g., the sensor module 240 illustrated in FIG. 2) is capable of measuring a physical quantity or detecting an operation state of the electronic device, and converting the measured or detected physical quantity into an electrical signal. The sensor 540 is capable of including at least one of the following: a gesture sensor, a gyro sensor, an acceleration sensor, and a geomagnetic sensor. In various embodiments of the present disclosure, when the sensor 540 includes a geomagnetic sensor, the electronic device is capable of measuring a movement angle of its head via the geomagnetic sensor. When the sensor 540 includes an acceleration sensor and a gyro sensor, the electronic device is capable of detecting its movement via the acceleration sensor and the gyro sensor. The sensor 540 is capable of transferring, to the processor 570, the sensed information according to the movement of the electronic device and the measured movement angle of the electronic device. The sensor 540 is capable of collecting external environment information of the electronic device, including at least one of the following: weather information, brightness information, and sound information.

In various embodiments of the present disclosure, when the electronic device serves as a first electronic device 401 (e.g., a calling electronic device making a video call request), the processor 570 controls: the camera 550 (e.g., the camera module 291 illustrated in FIG. 2) to take a video of a subject; and the wireless communication circuit 510 to transmit the video data taken from the subject to the second electronic device 403.

In various embodiments of the present disclosure, when the electronic device serves as a third electronic device 405 (e.g., an electronic device accepting a video call request and performing a video call), the processor 570 controls: the camera 550 to take a video of a subject; and the wireless communication circuit 510 to transmit the video data taken from the subject to the second electronic device 403. The camera 550 is capable of recognizing at least one of the following: a user's face and a user's iris from the video data taken from a subject. In various embodiments of the present disclosure, the audio processing unit 560 (e.g., the audio module 280 illustrated in FIG. 2) is connected to a speaker (SPK) 561 and/or a microphone (MIC) 563. The speaker 561 outputs audio signals transmitted/received during the call (transmission sound or reception sound), audio signals including a received message, audio signals when an audio file stored in the memory 433 is played, etc. The microphone 563 receives a user's voice or other audios.

In various embodiments of the present disclosure, when the audio processing unit 560 receives a voice for controlling functions related to a video call via the microphone 563, it is capable of transferring the voice signal to the processor 570. The audio processing unit 560 is capable of extracting voices from the video data received from the first electronic device 401, under the control of the processor 570, and outputting the extracted voices via the speaker 561. The audio processing unit 560 is capable of outputting, via the speaker 561, audio signals related to a notification of switching to a video call, the reception of a video call, etc.

In various embodiments of the present disclosure, when the electronic device serves as a first electronic device 401 (e.g., a calling electronic device making a video call request), the processor 570 (e.g., processors 120 and 210 illustrated in FIGS. 1 and 2 respectively) is capable of requesting the video call connection from the second electronic device 403 (e.g., a called electronic device receiving the video call request) or the third electronic device 405 (e.g., an electronic device accepting the video call request and performing a video call), via the wireless communication circuit 510. When the processor 570 receives an acceptance signal in response to the video call connection request from the second electronic device 403 or the third electronic device 405, it is capable of obtaining status information regarding the second electronic device 403, status information regarding the third electronic device 405, and network connection information.

In various embodiments of the present disclosure, the processor 570 is capable of determining an encoding scheme for video data (e.g., video stream) taken by the camera 550, based on the obtained information. The processor 570 is capable of encoding video data, based on the determined encoding scheme, and transmitting the encoded video data to the second electronic device 403 or the third electronic device 405. The processor 570 is capable of creating a number of images, extracting audio signals, based on the video data, and transmitting the created and extracted result to the second electronic device 403 or the third electronic device 405. The processor 570 is capable of: detecting at least one of the following, a maximum resolution, a maximum picture quality, and a maximum fps, supported by the second electronic device 403 or the third electronic device 405; adjusting at least one of the maximum resolution, the maximum picture quality, and the maximum fps, based on status information regarding the second network; and encoding video data based on at least one of the adjusted resolution, the adjusted picture quality, and the adjusted fps. In various embodiments of the present disclosure, when the processor 570 receives video data for the third electronic device 405 from the second electronic device 403, it is capable of determining an encoding scheme, based on the received video data, and encoding the video data based on the determined encoding scheme. In various embodiments of the present disclosure, when the processor 570 receives a value for adjusting quality of video data (e.g., a value of change in picture quality, a value of change in resolution, a value of change in fps) from the second electronic device 403, it is capable of encoding the video data based on the received quality adjustment value and a transfer rate based on the network states, and transmitting the encoded video data to the second electronic device 403.

It should be understood that the operation of determining an encoding scheme and the operation of encoding video data based on the determined encoding scheme, described above, may also be applied to the second electronic device 403 in the same ways as the first electronic device 401.

In various embodiments of the present disclosure, in a state where the electronic device serves as a second electronic device 403 (e.g., a called electronic device receiving the video call request), when the processor 570 receives a video call request signal from the first electronic device 401 (e.g., a calling electronic device making a video call request) via the wireless communication circuit 510, the processor 570 is capable of transmitting the video call request signal to the third electronic device 405 (e.g., an electronic device accepting the video call request and performing a video call). When the processor 570 receives an acceptance signal in response to the video call connection request from the third electronic device 405, it is capable of transmitting the acceptance signal to the first electronic device 401. The processor 570 is capable of forwarding controls signals and video data for a video call between the first and third electronic devices 401 and 405.

In various embodiments of the present disclosure, when the electronic device serves as a third electronic device 405 (e.g., an electronic device accepting the video call request and performing a video call), the processor 570 is capable of receiving a video call request signal from the second electronic device 403 (e.g., a called electronic device receiving the video call request) via wireless communication circuit 510. When the processor 570 detects a user input accepting the video call request, it is capable of transmitting an acceptance signal in response to the video call request to the second electronic device 403. The processor 570 is capable of: receiving video data, encoded based on information the second network and status information regarding the third electronic device 405, from the second electronic device 403; and reproducing the received video data. In various embodiments of the present disclosure, the processor 570 is capable of: receiving a number of images and audio signals, created based on information the second network and status information regarding the third electronic device 405, from the second electronic device 403; and reproducing the received images and audio signals.

In various embodiments of the present disclosure, the processor 570 takes a video of a subject via the camera 550 and transmits the video data taken from the subject to the second electronic device 403. The processor 570 is capable of encoding video data, based on status information regarding the third electronic device 405 and status information regarding the second network, and transmitting the encoded video data to the second electronic device 403. In various embodiments of the present disclosure, the processor 570 is capable of displaying the encoded video data and an indicator for adjusting the quality of the video data. The processor 570 is capable of detecting an input for adjusting the quality of video data via the indicator. The processor 570 is capable of determining a quality adjustment value corresponding to the detected input (e.g., a value of change in picture quality, a value of change in resolution, a value of change in fps), and transmitting the determined value to the second electronic device 403. The processor 570 is capable of receiving video data, encoded based on the adjusted quality value, from the second electronic device 403, and reproducing the encoded video data. The processor 570 is capable of detecting the movement of the third electronic device 405 via the sensor 540. The processor 570 collects sensed information regarding the movement of the third electronic device 405 and reproduces video data and/or audio signals, based on the sensed information. For example, when the processor 570 ascertains that the sensed information regarding the movement of the electronic device is within a preset range, it reproduces the audio signals and stores the video data in the memory 520. When the processor 570 ascertains that the sensed information regarding the movement of the electronic device is not within a preset range, it reproduces video data stored in the memory 520. When the processor 570 detects a signal for switching a video call currently in progress to other devices, it is capable of searching for and displaying at least one electronic device to which the video call can be switched. When the processor 570 detects an input selecting an electronic device to be switched for the video call from among one or more electronic devices which is/are displayed, for a preset period of time, it is capable of transmitting a video call switching signal to the selected electronic device. On the other hand, when the processor 570 has not detected an input selecting an electronic device to be switched for the video call from among one or more electronic devices which is/are displayed, for a preset period of time, it is capable of capable of: analyzing status information regarding the one or more electronic devices which are displayed, information status regarding the second network; assigning the priority to electronic devices; and automatically selecting an electronic device with higher priority as an electronic device to be switched for the video call.

In various embodiments of the present disclosure, an electronic device is implemented to include: a wireless communication circuit configured to communicate with a first electronic device, a touchscreen configured to display a user interface for performing a video call, a speaker, a microphone, one or more processors electrically connected to the communication circuit, the touchscreen, the speaker, and the microphone, and a memory electrically connected to the one or more processors. The memory stores instructions that, when executed, cause the one or more processors to: receive a signal related to an incoming video call from the first electronic device via the wireless communication circuit, receive a user input accepting the video call via the user interface, transmit a signal accepting the video call to the first electronic device via the wireless communication circuit in response to the user input, receive a video stream from the first electronic device via the wireless communication circuit, the video stream has been adapted at the first electronic device, based at least partly on: status information on the electronic device and/or status information on wireless communication between the electronic device and the first electronic device, display the received video stream on the touchscreen while providing voice from the video call, using the speaker, receive voice, using the microphone, and transmit the received voice to the first electronic device, using the wireless communication circuit.

According to various embodiments, the instructions further cause the one or more processors to: detect an alteration in a state of the electronic device or an alteration in a state of the wireless communication, and receive a video steam, which differs from the received video stream by at least one of: a resolution, picture quality, and a frame rate, from the first electronic device via the wireless communication circuit, the status information on the electronic device includes at least one of: a type of the electronic device, a size of the touchscreen, processing power of the processor, a maximum resolution of the touchscreen, a battery status or level, memory status or capacity, or presence/absence of a camera, and the status information on the communication includes a video call quality level for performing a video call.

According to various embodiments, the electronic device further includes a camera. The instructions further cause the one or more processors to: adapt a video stream taken by the camera, based at least partly on the status information on the electronic device and the status information on the wireless communication circuit, and transmit the adapted video stream to the first electronic device via the communication.

According to various embodiments, the instructions further cause the one or more processors to: detect at least one of a face or an iris of the user via the camera while receiving the video stream, and display the received video stream on the touchscreen only while at least one of a face or an iris of the user is detected.

According to various embodiments, the instructions further cause the one or more processors to: display an indicator to adjust a quality of the received video stream, detect an input for adjusting the quality of video stream via the indicator, determine an encoding scheme corresponding to the adjusted quality of video stream, transmit the determined encoding scheme to the first electronic device, receive a video stream, adapted based on the encoding scheme, from the first electronic device, and display the received video stream.

According to various embodiments, the instructions further cause the one or more processors to: set a region of interest (ROI) in the displayed video stream, transmit the ROI to the first electronic device, receive, from the first electronic device, a video stream, adapted based on at least one of: focus, crop, change in picture quality, or exposure adjustment, with respect to the ROI, and display the received video stream.

According to various embodiments, the electronic device further includes at least one motion sensor. The instructions further cause the one or more processors to: detect orientation of the electronic device using the sensor, while receiving the video stream, and display the received video stream on the touchscreen only while the detected orientation is in a selected range.

According to various embodiments, the instructions further cause the one or more processors to: display the received video stream, receive a user input for forwarding the video call, display at least one external display device to which the video call can be forwarded, receive a user selection of one of the at least one external display device, and forward the video call to the selected external display device.

According to various embodiments, the instructions further cause the one or more processors to: analyze the status information on the electronic device and the status information on the wireless communication, and display a selectable the user interface on the touchscreen, the user interface is indicative of at least one operation related to the video call, based on the analyzed status information on the electronic device and the analyzed status information on the wireless communication, the operation is related to at least one of a quality of the video stream, a voice only call, a video call using a second electronic device, or a voice call using the second electronic device.

According to various embodiments, the instructions further cause the one or more processors to: receive another video call request via the first electronic device from a third electronic device while performing the video call, detect an input for accepting the received video call request, further receive a video stream of the other video call via the first electronic device from the third electronic device, and display a screen of the video call on a first region of the touchscreen, and another screen of the other video call on a second region of the touchscreen.

According to various embodiments, the electronic device further includes at least one motion sensor. The instructions further cause the one or more processors to: detect an input pressing against the touchscreen while providing voice from the video call, using the speaker, determine a pressure level of the detected input, and perform an operation, based at least partly on the detected pressure level.

According to various embodiments, the instructions further cause the one or more processors to: detect a touch gesture input using the touchscreen, while providing voice from the video call, using the speaker, determine a direction of the input, and perform an operation, based at least partly on the detected direction.

According to various embodiments, the instructions further cause the one or more processors to: detect an input via the touchscreen for storing at least a portion of the received video stream, and transmit, to the first electronic device, a request for storing, in the first electronic device, the at least a portion of the video stream, the request includes information on time when the input is detected.

According to various embodiments, the instructions further cause the one or more processors to: detect a touch gesture input using the touchscreen, while providing voice from the video call, using the speaker, determine a direction of the input, and perform an operation, based at least partly on the detected direction.

According to various embodiments, the instructions further cause the one or more processors to: detect an input via the touchscreen for storing at least a portion of the received video stream, and transmit, to the first electronic device, a request for storing, in the first electronic device, the at least a portion of the video stream, the request includes information on time when the input is detected.

According to various embodiments, the instructions further cause the one or more processors to: receive, from the first electronic device, information on at least one electronic device capable of performing the video call, display an indication of the at least one electronic device on the touchscreen, receive a user input for selecting one of the at least one electronic device, and transmit a signal for forwarding the video call to the selected electronic device to the first electronic device, using the wireless communication circuit.

According to various embodiments, the wireless communication circuit comprises at least one of: a Bluetooth modem or Wi-Fi modem.

According to various embodiments, the electronic device is smartwatch and the first electronic device is a smartphone.

In various embodiments of the present disclosure, an electronic device is implemented to include: a first wireless communication circuit configured to communicate with a first electronic device, a second wireless communication circuit configured to communicate with a second electronic device, a touchscreen configured to display a user interface to perform a video call, a speaker, a microphone, one or more processors electrically connected to the first wireless communication circuit, a second wireless communication circuit, the touchscreen, the speaker, and the microphone, and a memory electrically connected to the one or more processors. The memory stores instructions that, when executed, cause the one or more processors to: receive a video call request from the first electronic device via the first wireless communication circuit, display the received video call request on the touchscreen, create a notification based on the received video call request, transmit the created notification to the second electronic device via the second wireless communication, receive a signal accepting the video call request from the second electronic device via the second wireless communication circuit, stop displaying the video call request in response to the received signal accepting the video call request, receive and adapt a video stream from the first electronic device, based at least partly on status information on the second electronic device and status information on the communication between the electronic device and the second electronic device, transmit the adapted video stream to the second electronic device via the second wireless communication circuit, and transmit voice, received from the second electronic device via the second wireless communication circuit, to the first electronic device via the first wireless communication circuit.

According to various embodiments, the instructions further cause the one or more processors to: receive, from the second electronic device, at least one of a maximum resolution, a maximum level of picture quality, or a maximum frame rate (fps) of a video stream supported by the second electronic device, adapt at least one of a resolution, a level of picture quality, or a fps of the video stream within the at least one of a maximum resolution, a maximum level of picture quality, or a maximum fps, based at least partly on the status information on the communication.

According to various embodiments, the instructions further cause the one or more processors to: receive, from a third electronic device, a video call forwarding request and information on the third electronic device, transmit video call connection information to the third electronic device, and transmit information on the third electronic device to the first electronic device via the first wireless communication circuit.

In various embodiments of the present disclosure, an electronic device is implemented to include: a first wireless communication circuit configured to communicate with a first electronic device, a touchscreen configured to display a user interface to perform a video call, a speaker, a microphone, one or more processors electrically connected to the first wireless communication circuit, the touchscreen, the speaker, and the microphone, and a memory electrically connected to the one or more processors. The memory stores instructions that, when executed, cause the one or more processors to: transmit a video call request signal to the first electronic device via the first wireless communication circuit, via the first wireless communication circuit, receive, from the first electronic device, a signal accepting the video call request, status information on a second electronic device, and status information on communication between the first electronic device and the second electronic device, adapt a video stream, based at least partly on the received status information on the second electronic device and the received status information on the communication, transmit the adapted video stream to the first electronic device via the first wireless communication circuit, and receive a voice from the first electronic device.

Although it is not shown in FIG. 5, it should be understood that the first to third electronic devices are capable of further including components for added functions, e.g., a Global Positioning System (GPS) module for receiving location information, a broadcast receiving module, etc.

Figure 6:
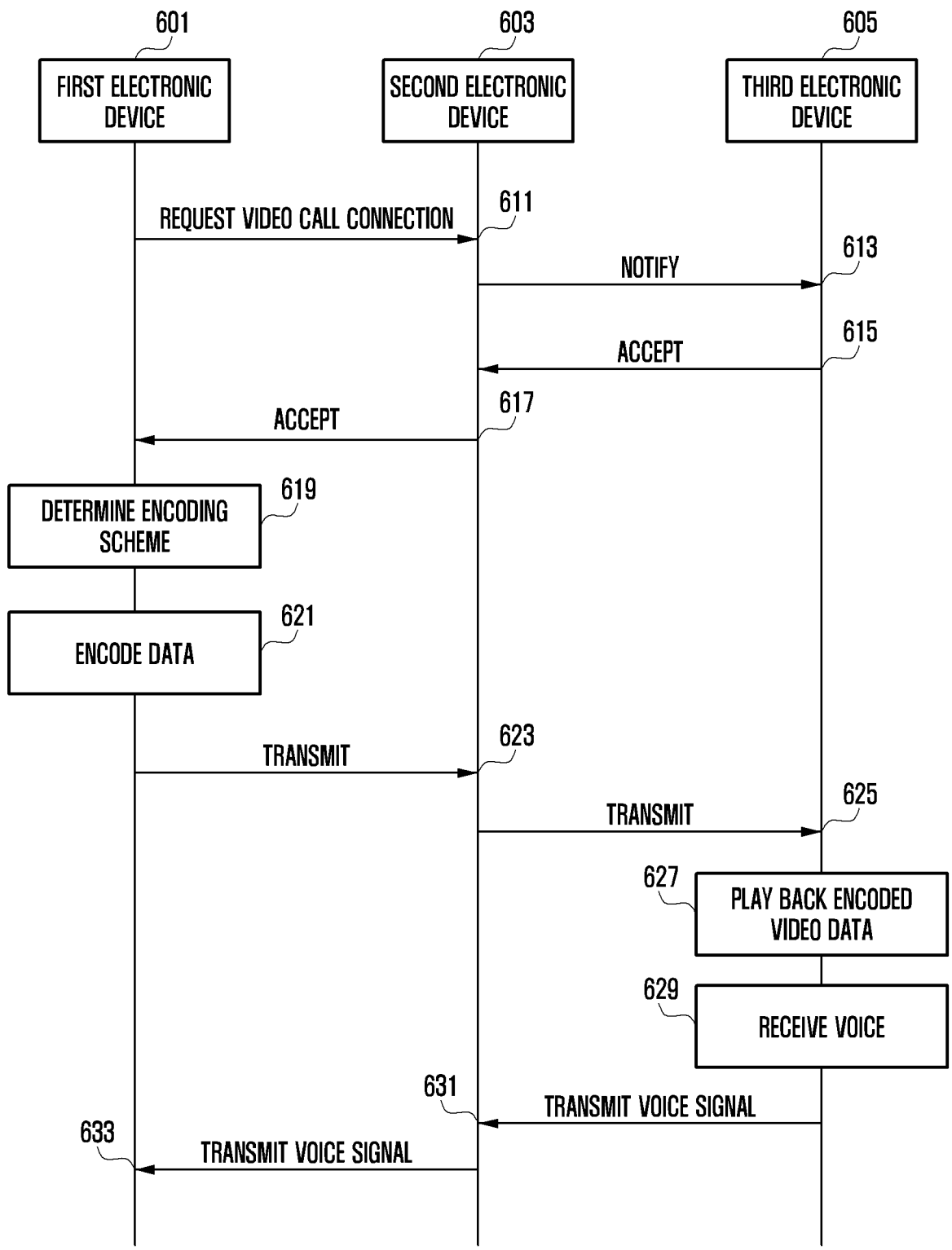
FIG. 6 is a signal flow diagram illustrating an example method for a first electronic device to encode a video, while transmitting/receiving signals to/from second and third electronic devices, according to various example embodiments of the present disclosure.

FIG. 6 is a signal flow diagram illustrating an example method for a first electronic device to encode a video, while transmitting/receiving signals to/from second and third electronic devices, according to various example embodiments of the present disclosure.

In various embodiments of the present disclosure, when the first electronic device 601 (e.g., the first electronic device 401 illustrated in FIG. 4) needs to make a video call with the third electronic device 605 (e.g., the third electronic device 405 illustrated in FIG. 4) which is connected to the second electronic device 603 (e.g., the second electronic device 403 illustrated in FIG. 4) via the second network (e.g., the second network 413 illustrated in FIG. 4), it is capable of converting video data for the video call into video data suitable for the state of the third electronic device 605 or the state of the second network.

In various embodiments of the present disclosure, the first electronic device 601 may be identical or similar to part or the entire part of the first electronic device 401. The second electronic device 603 may be identical or similar to part or the entire part of the second electronic device 403. The third electronic device 605 may be identical or similar to part or the entire part of the third electronic device 405.

With reference to FIG. 6, the first electronic device 601 is capable of making a video call connection request to the second electronic device 603 via the first network (e.g., the first network 411 illustrated in FIG. 4) in operation 611. The second electronic device 603 is capable of transmitting, to the third electronic device 605 via the second network, a notification notifying that a video call connection request has been received from the first electronic device 601 in operation 613. The third electronic device 605 accepts the video call connection request and transmits the acceptance signal to the second electronic device 603 in operation 615. The second electronic device 603 forwards the received video call connection acceptance signal to the first electronic device 601 in operation 617.

In various embodiments of the present disclosure, the first electronic device 601 is capable of obtaining: status information regarding the second electronic device 603 from the second electronic device 603; status information regarding the third electronic device 605 connected to the second electronic device 603 via the second network; and network connection information. The status information regarding the second electronic device 603 may contain at least one of the following: type information, display size, processing power, supporting maximum resolution, battery status (e.g., battery level), memory status, and presence/absence of a camera. The status information regarding the third electronic device 605 may contain at least one of the following: type information, display size, processing power, supporting maximum resolution, battery status (e.g., battery level), memory status, and presence/absence of a camera. The network connection information may contain status information regarding the first or second network.

In various embodiments of the present disclosure, the first electronic device 601 is capable of determining an encoding scheme, based on the obtained information, in operation 619. The first electronic device 601 is capable of encoding (e.g., adapting) video data for performing a video call, based on the determined encoding scheme, in operation 621, and transmitting the encoded (e.g., adapted) video data to the second electronic device 603 in operation 623.

In various embodiments of the present disclosure, the encoding scheme may include a transcoding scheme, a scalable encoding scheme, or a mirroring scheme. The first electronic device 601 is capable of encoding video data based on at least one of the transcoding scheme, the scalable encoding scheme, and the mirroring scheme. The second electronic device 603 is capable of forwarding the encoded video data, received from the first electronic device 601, to the third electronic device 605 in operation 625. The third electronic device 605 is capable of playing back the encoded video data, received from the second electronic device 603, in operation 627.

The process of encoding video data via the transcoding scheme will be described in detail later with reference to FIGS. 10 to 16.

The process of encoding video data via the scalable encoding scheme will be described in greater detail below with reference to FIGS. 17A and 17B.

The process of encoding video data via the mirroring scheme will be described in detail later with reference to FIG. 18.

In various embodiments of the present disclosure, the third electronic device 605 is capable of receiving a voice using the microphone (e.g., the microphone 563) in operation 629, and transmitting the voice signal to the second electronic device 603 in operation 631. The second electronic device 603 is capable of forwarding the received voice signal to the first electronic device 601 in operation 633.

In various embodiments of the present disclosure, when the third electronic device 605 is configured to include a camera, it is capable of encoding videos taken by the camera, and transmitting the encoded video data along with a voice signal to the second electronic device 603. For example, as described above referring to 4, the third electronic device 605 may support a lower resolution than the first electronic device 601 and the second electronic device 603 do. When the resolution that the third electronic device 605 supports is lower than the resolution that the first electronic device 601 and the second electronic device 603 support, the third electronic device 605 is capable of encoding video data transferred from the camera into video data of low quality which can be reproduced with relatively low power. The third electronic device 605 is capable of transmitting the video data encoded in low quality along with a voice signal to the second electronic device 603. It should be understood that the present disclosure is not limited to the embodiments. The third electronic device 605 may also encode video data transferred from the camera into images or an image sequence, and transmit, to the second electronic device 603, the images along with a voice signal or the image sequence along with a voice signal.

Figure 7:
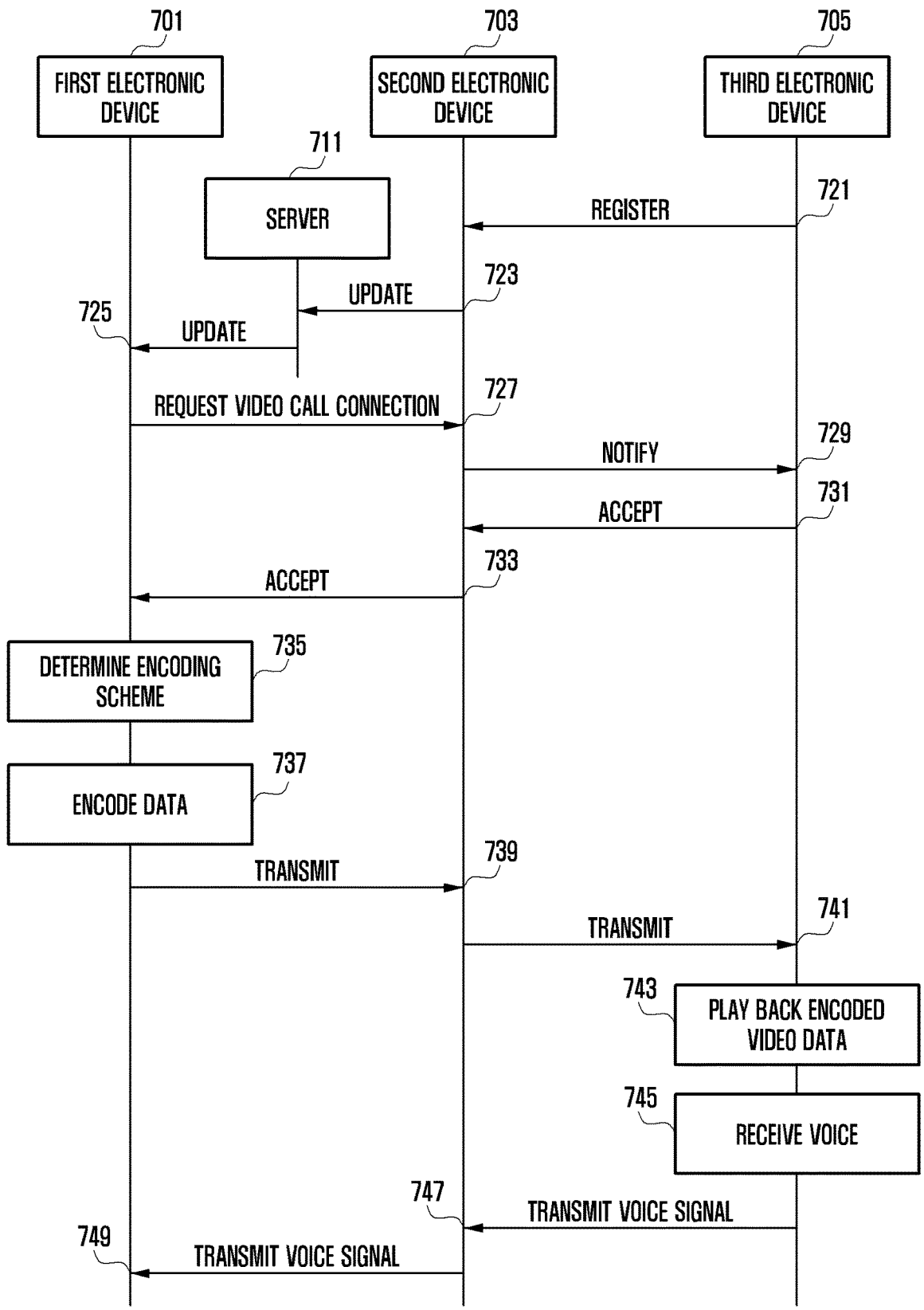
FIG. 7 is a signal flow diagram illustrating an example method for a first electronic device to encode a video, while transmitting/receiving signals to/from second and third electronic devices, according to various example embodiments of the present disclosure.

FIG. 7 is a signal flow diagram illustrating an example method for a first electronic device to encode a video, while transmitting/receiving signals to/from second and third electronic devices, according to various example embodiments of the present disclosure.

In various embodiments of the present disclosure, when the first electronic device 701 (e.g., the first electronic device 401 illustrated in FIG. 4 or the first electronic device 601 illustrated in FIG. 6) needs to make a video call with the third electronic device 705 (e.g., the third electronic device 405 illustrated in FIG. 4 or the third electronic device 605 illustrated in FIG. 6) which is connected to the second electronic device 703 (e.g., the second electronic device 403 illustrated in FIG. 4 or the second electronic device 603 illustrated in FIG. 6) via the second network (e.g., the second network 413), it is capable of converting its video data for a video call into video data suitable for the third electronic device 705, based on information regarding the third electronic device 705 received from a server 711.

In various embodiments of the present disclosure, the server 711 is capable of managing electronic devices capable of performing a video call, based on user accounts. For example, the server 711 is capable of monitoring an electronic device registered based on a user account, and updating status information regarding the electronic device, in real-time, based on the monitoring result. That is, the server 711 is capable of monitoring the electronic device and determining whether the electronic device is possible to perform a video call, based on the status information regarding the electronic device. The status information regarding the electronic device may include a state indicating whether the electronic device is currently in use, a state indicating whether the electronic device is turned on/off, a state indicating whether the user is away from the electronic device, etc. The first electronic device 701 is capable of selecting an electronic device to perform a video call from, e.g., a phonebook, based on the status information regarding the electronic device updated by the server 711, and transmitting a video call request signal to the selected electronic device.

With reference to FIG. 7, the third electronic device 705 is capable of transmitting a registration request to the second electronic device 703 in operation 721. For example, the third electronic device 705 is capable of requesting the second electronic device 703 to register the third electronic device 705 as an electronic device capable of performing a video call in the server 711. When the second electronic device 703 receives a registration request from the third electronic device 705 in operation 721, it is capable of making an update request to the server 711 in operation 723. For example, the second electronic device 703 is capable of requesting the server 711 to register or update information regarding the third electronic device 705 therein. The server 711 is capable of requesting the first electronic device 701 to update information regarding the third electronic device 705, based on the updated information regarding the third electronic device 705, in operation 725.

In various embodiments of the present disclosure, the first electronic device 701 is capable of making a video call request to a specified electronic device, based on information registered in the server 711, e.g., information regarding electronic devices capable of performing a video call. For example, the first electronic device 701 is capable of updating information regarding the second electronic device 703 or the third electronic device 705, received from the server 711, and identifying an electronic device capable of performing a video call, e.g., the third electronic device 705, based on the updated information. The server 711 is capable of obtaining, from the second electronic device 703, and storing at least one of the following: type information regarding the second electronic device 703 and the third electronic device 705, display size, processing power, maximum resolution that the third electronic device 705 supports, battery status (e.g., battery level), memory status, presence/absence of a camera, status information regarding the first network (e.g., the first network 411 illustrated in FIG. 4), and status information regarding the second network.

The first electronic device 701 is capable of determining the third electronic device 705 as an electronic device capable of performing a video call, and making a video call connection request to the second electronic device 703 via the first network in operation 727. The second electronic device 703 is capable of transmitting, to the third electronic device 705 via the second network, a notification notifying that a video call connection request has been received from the first electronic device 701 in operation 729. The third electronic device 705 accepts the video call connection request and transmits the acceptance signal to the second electronic device 703 in operation 731. The second electronic device 703 forwards the received video call connection acceptance signal to the first electronic device 701 in operation 733.

The first electronic device 701 is capable of determining an encoding scheme, based on information regarding the second electronic device 703, information regarding the third electronic device 705 connected to the second electronic device 703, and network connection information, stored in the server 711, in operation 735. The first electronic device 701 is capable of encoding video data for performing a video call, based on the determined encoding scheme, in operation 737, and transmitting the encoded video data to the second electronic device 703 in operation 739. The second electronic device 703 is capable of forwarding the encoded video data, received from the first electronic device 701, to the third electronic device 705 in operation 741. The third electronic device 705 is capable of playing back the encoded video data, received from the second electronic device 703, in operation 743.

In various embodiments of the present disclosure, the third electronic device 705 is capable of receiving a voice using the microphone (e.g., the microphone 563) in operation 745, and transmitting the voice signal to the second electronic device 703 in operation 747. The second electronic device 703 is capable of forwarding the received voice signal to the first electronic device 701 in operation 749.

Figure 8:
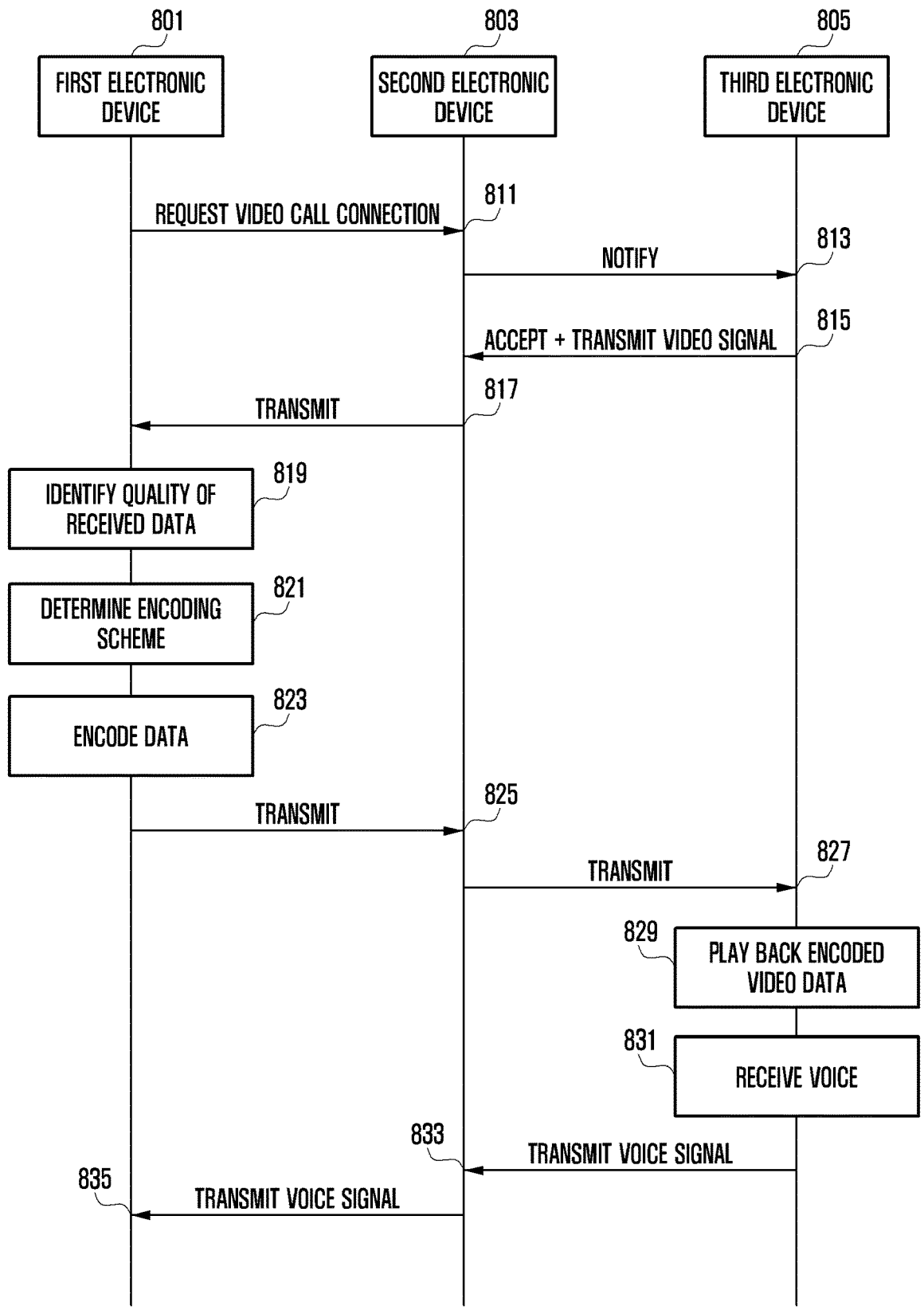
FIG. 8 is a signal flow diagram illustrating an example method for a first electronic device to encode a video, while transmitting/receiving signals to/from second and third electronic devices, according to various example embodiments of the present disclosure.

FIG. 8 is a signal flow diagram illustrating an example method for a first electronic device to encode a video, while transmitting/receiving signals to/from second and third electronic devices, according to various example embodiments of the present disclosure.

With reference to FIG. 8, the first electronic device 801 (e.g., the first electronic device 401 illustrated in FIG. 4, the first electronic device 601 illustrated in FIG. 6, or the first electronic device 701 illustrated in FIG. 7) is capable of making a video call connection request to a second electronic device 803 (e.g., the second electronic device 403 illustrated in FIG. 4, the second electronic device 603 illustrated in FIG. 6, or the second electronic device 703 illustrated in FIG. 7) via the first network (e.g., the first network 411 illustrated in FIG. 4) in operation 811. The second electronic device 803 is capable of transmitting, to the third electronic device 805 via the second network (e.g., the second network 413 illustrated in FIG. 4), a notification notifying that a video call connection request has been received from the first electronic device 801 in operation 813. The third electronic device 805 accepts the video call connection request and transmits the acceptance signal to the second electronic device 803 in operation 815.

In various embodiments of the present disclosure, the third electronic device 805 is capable of transmitting video data of the third electronic device 805 along with the acceptance signal to the second electronic device 803 in operation 815.

In various embodiments of the present disclosure, the third electronic device 805 may be equipped with a camera. In this case, the third electronic device 805 is capable of transmitting video data obtained via the camera to the second electronic device 803. For example, the third electronic device 805 is capable of encoding the obtained video data based on its status information and status information regarding the second network. The third electronic device 805 is capable of transmitting the encoded video data to the second electronic device 803.

In various embodiments of the present disclosure, the second electronic device 803 is capable of forwarding the acceptance signal and the encoded video data, received from the third electronic device 805, to the first electronic device 801 in operation 817. Alternatively, the third electronic device 805 is capable of only creating a voice signal and transmitting the voice signal to the second electronic device 803.

The first electronic device 801 is capable of detecting the quality of video data encoded by the third electronic device 805, received from the second electronic device 803, in operation 819. For example, the first electronic device 801 is capable of detecting the received, encoded video data, in terms of the encoding scheme, the quality, or the size.

The first electronic device 801 is capable of determining an encoding scheme for video data to be transmitted, based on the detected video scheme, quality, or size, of the video data received from the third electronic device 805 in operation 821. It should be understood that the determination of an encoding scheme for video data to be transmitted is not limited to only information related to the video data listed above. That is, the first electronic device 801 is also capable of determining an encoding scheme for video data, using display size and processing power of the third electronic device 805, maximum resolution that the third electronic device 805 supports, battery status (e.g., battery level), memory status, presence/absence of a camera, status information regarding the first network, and status information regarding the second network, received from the second electronic device 803, as well as video data of the third electronic device 805, in operation 821.

The first electronic device 801 is capable of encoding video data, based on the determined encoding scheme, in operation 823, and transmitting the encoded video data to the second electronic device 803 in operation 825. The second electronic device 803 is capable of forwarding the encoded video data, received from the first electronic device 801, to the third electronic device 805 in operation 827. The third electronic device 805 is capable of playing back the encoded video data, received from the second electronic device 803, in operation 829. The third electronic device 805 is capable of receiving a voice using the microphone (e.g., the microphone 563) in operation 831, and transmitting the voice signal to the second electronic device 803 in operation 833. The second electronic device 803 is capable of forwarding the received voice signal to the first electronic device 801 in operation 835.

Figure 9:
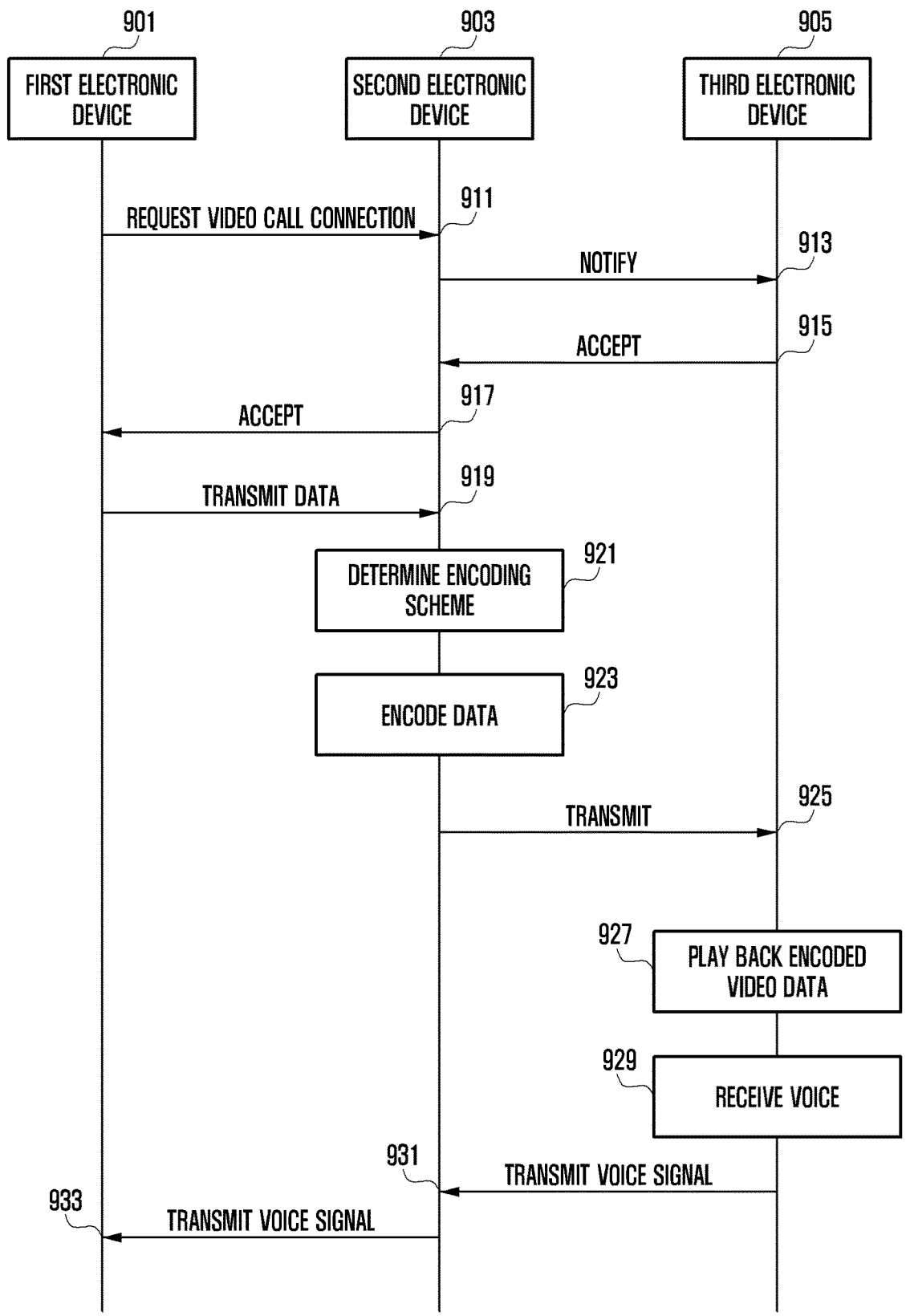
FIG. 9 is a signal flow diagram illustrating an example method for a second electronic device to encode a video, while transmitting/receiving signals to/from first and third electronic devices, according to various example embodiments of the present disclosure.

FIG. 9 is a signal flow diagram illustrating an example method for a second electronic device to encode a video, while transmitting/receiving signals to/from first and third electronic devices, according to various example embodiments of the present disclosure.

In various embodiments of the present disclosure, when the second electronic device 903 (e.g., the second electronic device 403 illustrated in FIG. 4, the second electronic device 603 illustrated in FIG. 6, the second electronic device 703 illustrated in FIG. 7, or the second electronic device 803 illustrated in FIG. 8) needs to make a video call with the third electronic device 905 (e.g., the third electronic device 405 illustrated in FIG. 4, the third electronic device 605 illustrated in FIG. 6, the third electronic device 705 illustrated in FIG. 7, or the third electronic device 805 illustrated in FIG. 8) which is connected to the second electronic device 903 and the first electronic device 901 (e.g., the first electronic device 401 illustrated in FIG. 4, the first electronic device 601 illustrated in FIG. 6, the first electronic device 701 illustrated in FIG. 7 or the first electronic device 801 illustrated in FIG. 8), via the second network (e.g., the second network 413 illustrated in FIG. 4), it is capable of converting video data for performing a video call into video data suitable for the third electronic device 905.

With reference to FIG. 9, the first electronic device 901 is capable of making a video call connection request to the second electronic device 903 via the first network (e.g., the first network 411 illustrated in FIG. 4) in operation 911. The second electronic device 903 is capable of transmitting, to the third electronic device 905 via the second network, a notification notifying that a video call connection request has been received from the first electronic device 901 in operation 913. The third electronic device 905 accepts the video call connection request and transmits the acceptance signal to the second electronic device 903 in operation 915. The second electronic device 903 forwards the received video call connection acceptance signal to the first electronic device 901 in operation 917.

In various embodiments of the present disclosure, the first electronic device 901 is capable of transmitting video data for video call, obtained via the camera, to the second electronic device 903 in operation 919. The second electronic device 903 is capable of determining an encoding scheme for encoding video data received from the first electronic device 901, based on status information regarding the third electronic device 905 (e.g., type, screen size, processing power, maximum resolution, battery status, memory status, presence/absence of a camera, etc. of the third electronic device 905), status information regarding the first network, status information regarding the second network, in operation 921. The second electronic device 903 is capable of encoding video data for performing a video call based on the determined encoding scheme in operation 923, and transmitting the encoded video data to the third electronic device 905 in operation 925. The third electronic device 905 is capable of playing back the received video data in operation 927. When the third electronic device 905 receives a voice using the microphone (e.g., the microphone 563) in operation 929, it is capable of transmitting the voice signal to the second electronic device 903 in operation 931. The second electronic device 903 is capable of forwarding the received voice signal to the first electronic device 901 in operation 933.

Figure 10:
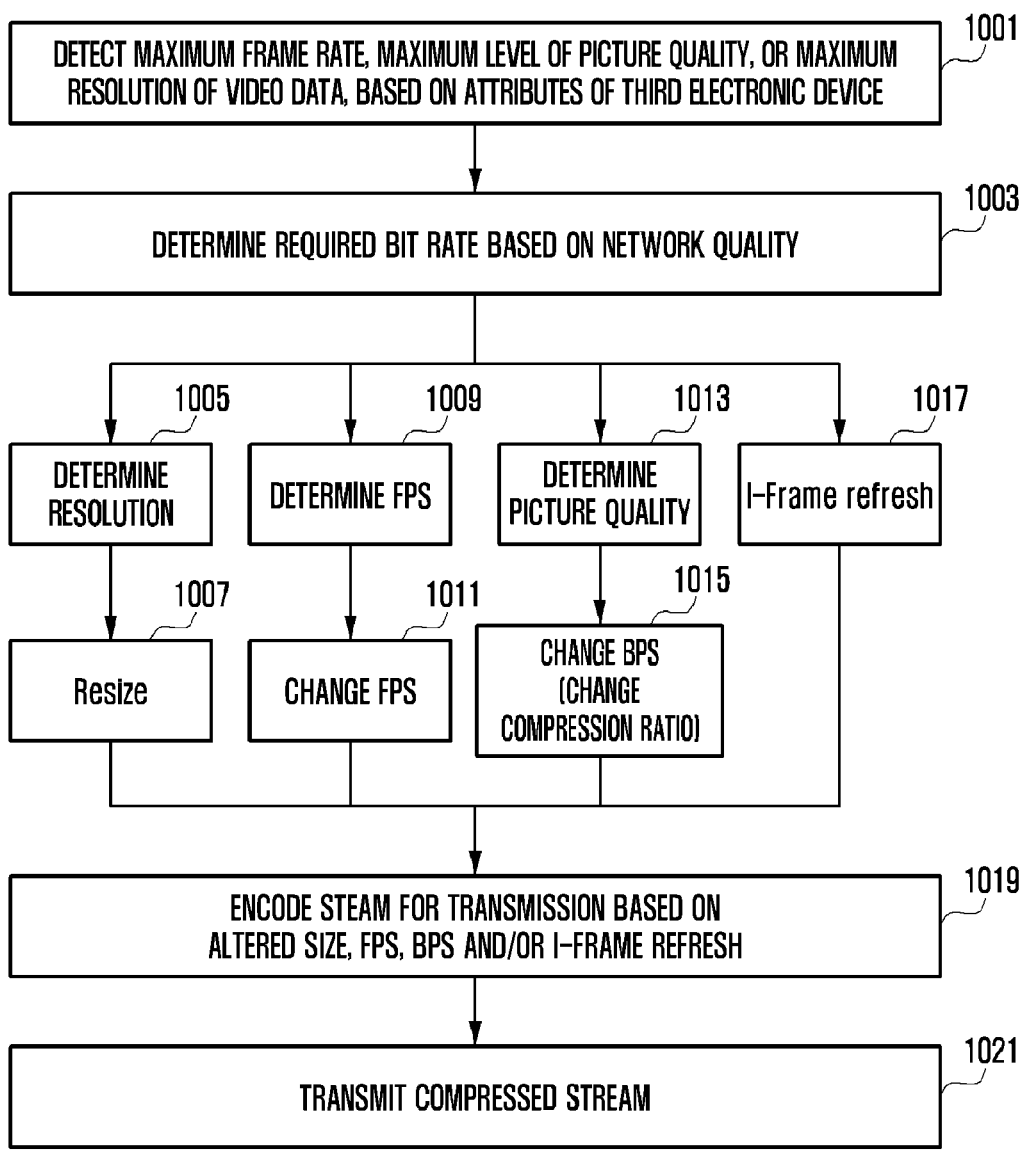
FIG. 10 is a diagram illustrating an example method of encoding video data in a first electronic device according to various example embodiments of the present disclosure.

FIG. 10 is a diagram illustrating an example method of encoding video data in a first electronic device according to various example embodiments of the present disclosure;

In various embodiments of the present disclosure, the first electronic device (e.g., the first electronic device 401 illustrated in FIG. 4, the first electronic device 601 illustrated in FIG. 6, the first electronic device 701 illustrated in FIG. 7, the first electronic device 801 illustrated in FIG. 8 or the first electronic device 901 illustrated in FIG. 9) or the second electronic device (e.g., the second electronic device 403 illustrated in FIG. 4, the second electronic device 603 illustrated in FIG. 6, the second electronic device 703 illustrated in FIG. 7, the second electronic device 803 illustrated in FIG. 8 or the second electronic device 903 illustrated in FIG. 9) is capable of converting video data of the first electronic device into video call suitable for the third electronic device (e.g., the third electronic device 405 illustrated in FIG. 4, the third electronic device 605 illustrated in FIG. 6, the third electronic device 705 illustrated in FIG. 7, the third electronic device 805 illustrated in FIG. 8 or the third electronic device 905 illustrated in FIG. 9) using a transcoding scheme.

Although the embodiment of FIG. 10 is described assuming that the first electronic device encodes video data, it should be understood that the present disclosure is not limited to the embodiment. The video data encoding method may also be applied to the second electronic device in the same way as the first electronic device.

In various embodiments of the present disclosure, the first or second electronic device is suitable for playback of video data which has a resolution of Full HD (1920×1080) or HD (1280×720) and a frame rate of 30 frames per second (fps). The third electronic device is suitable for playback of video data which has a resolution of QVGA (320×204), CIF (352×288), or QCIF (176×240) and a frame rate of 15 or 30 fps, without the degradation of picture quality. Since the third electronic device has a smaller screen size and a lower resolution than the first or second electronic device does, it does not need to play back video data in the same resolution of Full HD (1920×1080) or HD (1280×720) and at the frame rate of 30 fps as the first or second electronic device does. When the second and third electronic devices are connected to each other via the second network (e.g., the second network 413 illustrated in FIG. 4), e.g., a low-power network such as Bluetooth or Wi-Fi network, the second electronic device has difficulty in securing a transfer rate for streaming a large size file to the third electronic device, and the third electronic device consumes a large amount of battery power when streaming and playing video data of high picture quality, which depletes its battery level.

In an embodiment, the third electronic device is capable of playing back video data which has a resolution of QVGA (320×204), CIF (352×288), or QCIF (176×240) and a frame rate of 15 or 30 fps, on its relatively small size screen, efficiently, without the degradation of picture quality. Since the third electronic device has a relatively small size screen playing back video data, the user may have difficulty in finding the degradation of picture quality which is caused as video data is compressed at a relatively high compression ratio. In order to resolve the problem, various embodiments of the present disclosure are capable of reducing a file size of video stream and thus decreasing a bandwidth required for streaming. Therefore, various embodiments have advantages in an environment where the network quality is low or a network whose bandwidth is used for low-power connection.

In various embodiments of the present disclosure, a transcoding scheme parameter is used to convert video data of the first electronic device into video data suitable for the third electronic device using a transcoding scheme. The transcoding scheme parameter may include picture quality (a compression ratio), fps (the number of frames per second), resolution (resize), focus, or crop.

In various embodiments of the present disclosure, the first electronic device is capable of determining a transcoding scheme parameter used for the encoding, based on: information regarding the third electronic device (e.g., a type of the third electronic device, display size, presence/absence of a camera, processing power, supporting codec, current battery level, memory usage, the number of applications in use, or a type of application), connected to the second electronic device via the second network, or the second electronic device; information (state/signal quality) regarding the first network (e.g., the first network 411 illustrated in FIG. 4) connecting the first and second electronic devices; and information (state/signal quality) regarding the second network connecting the second and third electronic devices.

With reference to FIG. 10, the first electronic device is capable of detecting a maximum frame rate (fps), a maximum level of picture quality, or a maximum resolution of video data, which may be required by the third electronic device, in operation 1001.

The first electronic device is capable of determining an available transfer rate (bit rate), based on a network state in operation 1003. The network state may include information (state/signal quality) regarding the first network connecting the first and second electronic devices and information (state/signal quality) regarding the second network connecting the second and third electronic devices.

In various embodiments of the present disclosure, the first electronic device is capable of determining I-frame refresh, picture quality, frame rate (fps), and resolution, corresponding to the determined transfer rate (bit rate). More specifically, the first electronic device is capable of determining a resolution for video data corresponding to the transfer rate (bit rate) in operation 1005, and resizing the video data based on the determined resolution in operation 1007. The first electronic device is capable of determining a frame rate (fps) for video data, corresponding to the transfer rate (bit rate) in operation 1009, and altering a frame rate for the video data, based on the determined frame rate in operation 1011. The first electronic device is capable of determining a level of picture quality (compression ratio) for video data corresponding to the transfer rate (bit rate) in operation 1013, and altering a compression ratio of the video data, based on the determined picture quality (compression ratio) in operation 1015. The first electronic device is capable of determining I-frame refresh for video data, corresponding to the transfer rate (bit rate) in operation 1017.

In various embodiments of the present disclosure, the first electronic device is capable of encoding video data, based on the altered resolution, the altered frame rate (fps), the altered picture quality, or the altered I-frame refresh in operation 1019. The first electronic device is capable of transmitting the encoded video data to the second electronic device via the first network in operation 1021.

Figure 11:
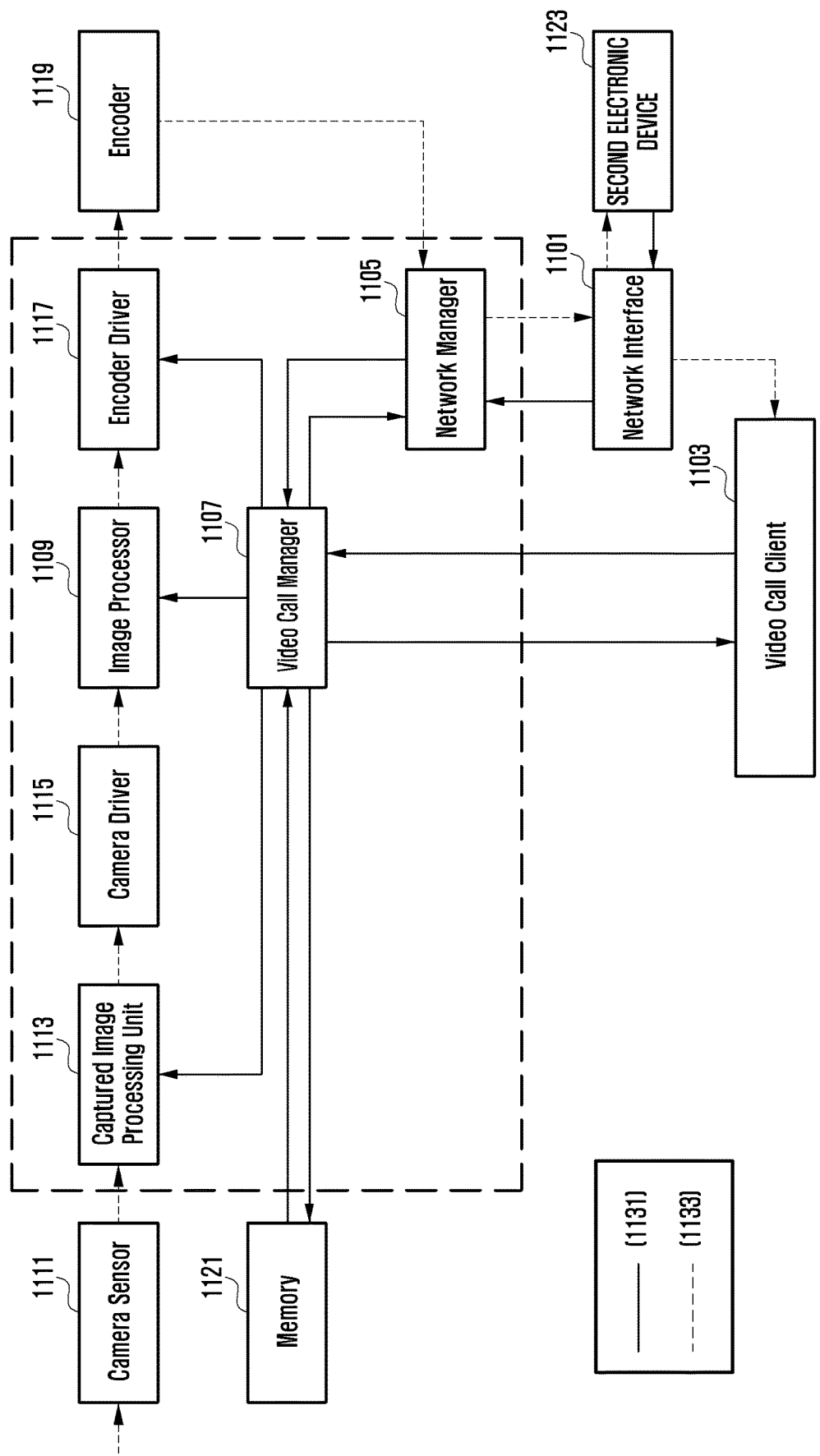
FIG. 11 is a diagram illustrating an example method of encoding video data in a first electronic device according to various example embodiments of the present disclosure.

FIG. 11 is a diagram illustrating an example method of encoding video data in a first electronic device according to various embodiments of the present disclosure.

With reference to FIG. 11, the first electronic device (e.g., the first electronic device 401 illustrated in FIG. 4, the first electronic device 601 illustrated in FIG. 6, the first electronic device 701 illustrated in FIG. 7, the first electronic device 801 illustrated in FIG. 8, or the first electronic device 901 illustrated in FIG. 9) is capable of including a network interface 1101, a video call client 1103, a network manager 1105, a video call manager 1107, an image processor 1109, a camera sensor 1111, a captured image processing unit 1113, a camera driver 1115, an encoder driver 1117, an encoder 1119, and a memory 1121.

With reference to FIG. 11, reference number 1131 represents the flow of a control signal and reference number 1133 represents the flow of a video call signal from the first electronic device to the second electronic device 1123 (e.g., the second electronic device 403 illustrated in FIG. 4, the second electronic device 603 illustrated in FIG. 6, the second electronic device 703 illustrated in FIG. 7, the second electronic device 803 illustrated in FIG. 8, or the second electronic device 903 illustrated in FIG. 9).

In various embodiments of the present disclosure, the network manager 1105 is capable of performing network connection management operations, e.g., connection establishment, connection monitoring, connection adjustments, connection tear down, etc. The network manager 1105 is capable of creating packets from data to be transmitted, to comply with the network environment, and de-packeting and recovering received packets to corresponding signals. The network manager 1105 is capable of measuring the network quality, using feedback data, such as packet loss information, round trip delay, etc. The network manager 1105 is also capable of measuring the network quality via training sequences received at a certain interval from the third electronic device (e.g., the third electronic device 405 illustrated in FIG. 4, the third electronic device 605 illustrated in FIG. 6, the third electronic device 705 illustrated in FIG. 7, the third electronic device 805 illustrated in FIG. 8, or the third electronic device 905 illustrated in FIG. 9). The network manager 1105 transfers the measured network quality to the video call manager 1107.

In various embodiments of the present disclosure, the video call client 1103 is an application for performing a video call. When the video call client 1103 detects a user input for a video call, it is capable of transferring the user input signal to the video call manager 1107.

The video call manager 1107 is a module for controlling video call. The video call manager 1107 is capable of controlling the network manager 1105, the encoder driver 1117, etc. to provide video call services. The video call manager 1107 is capable of controlling functions for performing a video call, based on user inputs received from the video call client 1103. The video call manager 1107 is capable of loading information regarding the third electronic device from the memory 1121 and performing a video call based on the loaded information. For example, the video call manager 1107 is capable of controlling the quality of video data required for a video call, based on part of the information regarding the third electronic device stored in the memory 1121.

In order to perform a video call with the third electronic device, the video call manager 1107 is capable of determining a required transfer rate (e.g., a maximum bit rate), based on the attributes of the third electronic device obtained from the network manager 1105, the memory 1121, and the video call client 1103. The video call manager 1107 is capable of detecting a network state of the second network (e.g., the second network 413 illustrated in FIG. 4) via the network manager 1105, and determining a transfer rate (bit rate) based on the network state. The video call manager 1107 is capable of determining: a resolution, frame rate (fps) or picture quality corresponding to the determined transfer rate (bit rate); and an encoding scheme for encoding video data in the encoder 1119, based on the determined resolution, frame rate (fps) or picture quality.

In various embodiments of the present disclosure, the video call manager 1107 is capable of controlling a vertical blanking interval (VBI) signal for the camera sensor 1111. The video call manager 1107 is capable of adjusting a frame rate in such a way that it controls a VBI of the camera sensor 1111 to drop frames of the video data input via the camera sensor 1111. For example, when the frame rate of video data received via the camera sensor 1111 is 30 fps, the video call manager 1107 adjusts the frame rate from 30 fps to 15 fps, by dropping frames of the video data.

In various embodiments of the present disclosure, the network manager 1105 is capable of adjusting a frame rate of video data which is being encoded, by controlling a buffer to drop frames. The network manager 1105 is capable of adjusting a frame rate of received, encoded video data, by dropping the frames of the video data. For example, when the network manager 1105 receives encoded video data at a frame rate of 30 fps, it is capable of adjusting the frame rate to 15 fps, by dropping frames of the received video data.

In various embodiments of the present disclosure, the camera sensor 1111 is capable of obtaining and transferring video data to the captured image processing unit 1113. The captured image processing unit 1113 is capable of transferring the received video data to the image processor 1109 via the camera driver 1115.

In various embodiments of the present disclosure, the camera sensor 1111 is capable of obtaining video data during a certain interval and transmitting the obtained video data to the image processor 1109 via the camera driver 1115.

In various embodiments of the present disclosure, the image processor 1109 is capable of adjusting the size and the picture quality of video data. The image processor 1109 is capable of adjusting: the size of video data by cropping a screen; and the picture quality of video data, such as the reduction of image, the alteration in quantization level of image, etc., corresponding to the display ratio of the third electronic device. For example, the image processor 1109: recognizes a user's face or an object from video data, determines a region of interest (ROI); and crops the image of the video data to comply with the attribute of the third electronic device, based on the ROI.

Alternatively, the image processor 1109 is capable of applying different encoding schemes to the ROI and the other region, or a non-ROI, based on the ROI. That is, various embodiments of the present disclosure are capable of providing ROI with higher quality video for ROI than the other region (or non-ROI). More specifically, ROI is displayed in higher quality of video than non-ROI. The image processor 1109 is capable of transferring the video data, adjusted in picture quality and size, to the encoder 1119 via the encoder driver 1117.

In various embodiments of the present disclosure, the encoder 1119 is capable of encoding the received adjusted video data, based on the encoding scheme, and transmitting the encoded video data to the second electronic device via the network manager 1105 and the network interface 1101.

In various embodiments of the present disclosure, the memory 1121 is implemented with volatile or non-volatile storage. The memory 1121 is capable of storing information regarding one or more electronic devices, e.g., wearable devices. The memory 1121 is also capable of storing various information regarding one or more electronic devices, such as a type of electronic device, a display size, a battery capacity (level), etc. The various information regarding one or more electronic devices may be used when the video call manager 1107 controls a video call. The information regarding electronic devices may be obtained when the first or second electronic device discovers connectable devices or from a history of stored connection information. The information regarding electronic devices may contain information registered in the manufacturing process.

Figure 12:
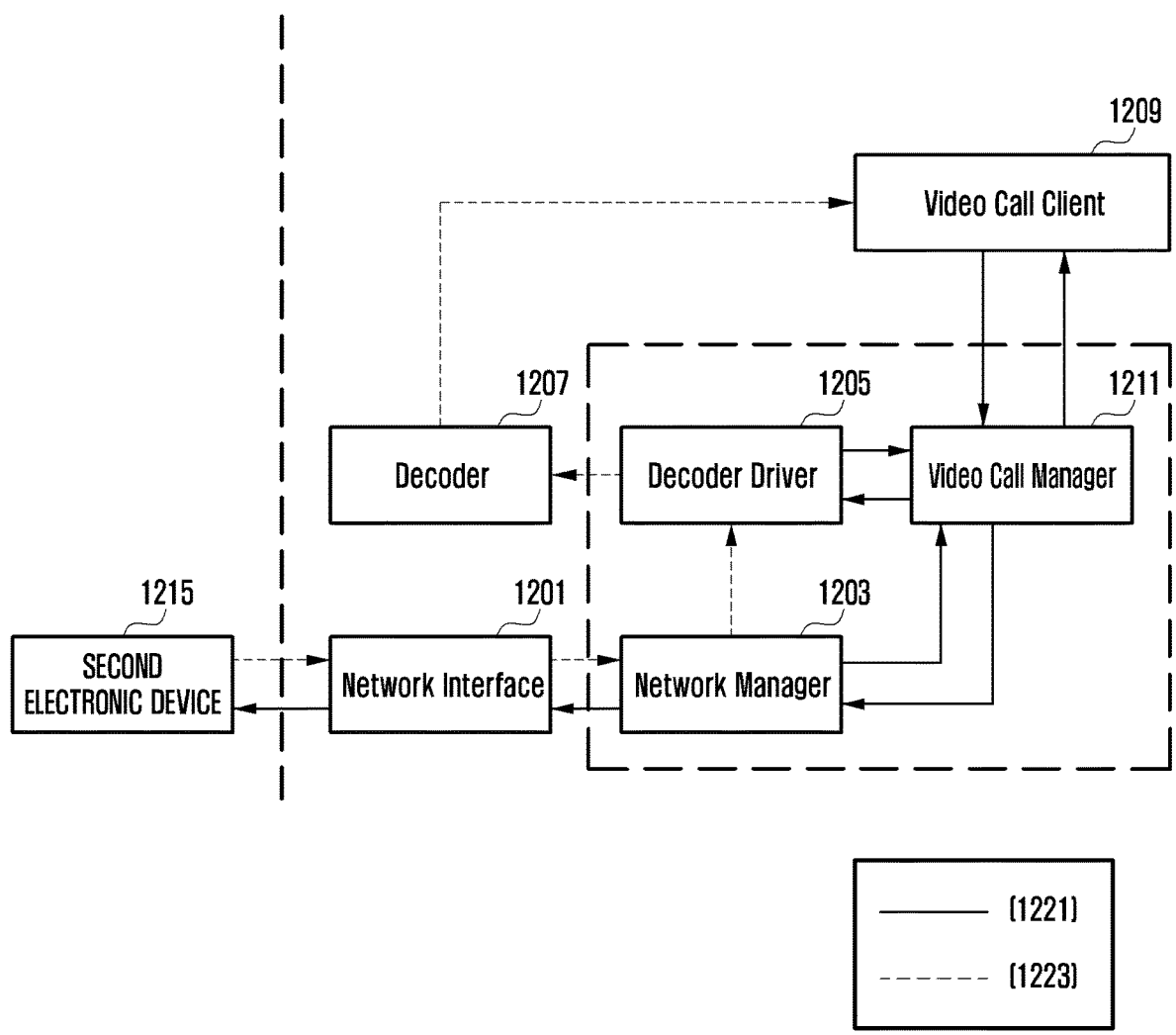
FIG. 12 is a diagram illustrating an example method of reproducing encoded video data in a third electronic device according to various example embodiments of the present disclosure.

FIG. 12 is a diagram illustrating an example method of reproducing encoded video data in a third electronic device according to various example embodiments of the present disclosure.

In various embodiments of the present disclosure, the third electronic device 405 is capable of playing back the encoded video data received from the second electronic device 403.

With reference to FIG. 12, third electronic device (e.g., the third electronic device 405 illustrated in FIG. 4, the third electronic device 605 illustrated in FIG. 6, the third electronic device 705 illustrated in FIG. 7, the third electronic device 805 illustrated in FIG. 8, or the third electronic device 905 illustrated in FIG. 9) is capable of including a network interface 1201 (e.g., the network interface 1101 illustrated in FIG. 11), a network manager 1203 (e.g., the network manager 1105 illustrated in FIG. 11), a decoder driver 1205, a decoder 1207, a video call client 1209 (e.g., the video call client 1103 illustrated in FIG. 11), and a video call manager 1211 (e.g., the video call manager 1107 illustrated in FIG. 11).

In various embodiments of the present disclosure, reference number 1221 1131 represents the flow of a control signal and reference number 1223 represents the flow of signals for receiving and playing back encoded video data from the second electronic device (e.g., the second electronic device 403 illustrated in FIG. 4, the second electronic device 603 illustrated in FIG. 6, the second electronic device 703 illustrated in FIG. 7, the second electronic device 803 illustrated in FIG. 8, the second electronic device 903 illustrated in FIG. 9, or the second electronic device 1123 illustrated in FIG. 11).

In various embodiments of the present disclosure, the third electronic device is capable of receiving video data optimized for the third electronic device, from the second electronic device via the network manager 1203. The decoder driver 1205 and the decoder 1207 transfers the received video data to the video call client 1209, thereby playing back the video data. The third electronic device is capable of transmitting its information or network quality-related status information regarding the second electronic device, via the network manager 1203. In various embodiments of the present disclosure, the third electronic device is capable of transmitting, to the second electronic device, network quality-related status information regarding its nearby other electronic devices and information regarding the nearby electronic devices.

In various embodiments of the present disclosure, the third electronic device is capable of: determining a transcoding scheme parameter. The third electronic device is capable of transmitting the determined parameter to the first electronic device (e.g., the first electronic device 401 illustrated in FIG. 4, the first electronic device 601 illustrated in FIG. 6, the first electronic device 701 illustrated in FIG. 7, the first electronic device 801 illustrated in FIG. 8, or the first electronic device 901 illustrated in FIG. 9) or the second electronic device; and requesting to encode the video data. The first or second electronic device is capable of encoding video data based on the parameter, in response to the encoding request received from the third electronic device, and transmitting the encoded video data to the third electronic device.

Figure 13:
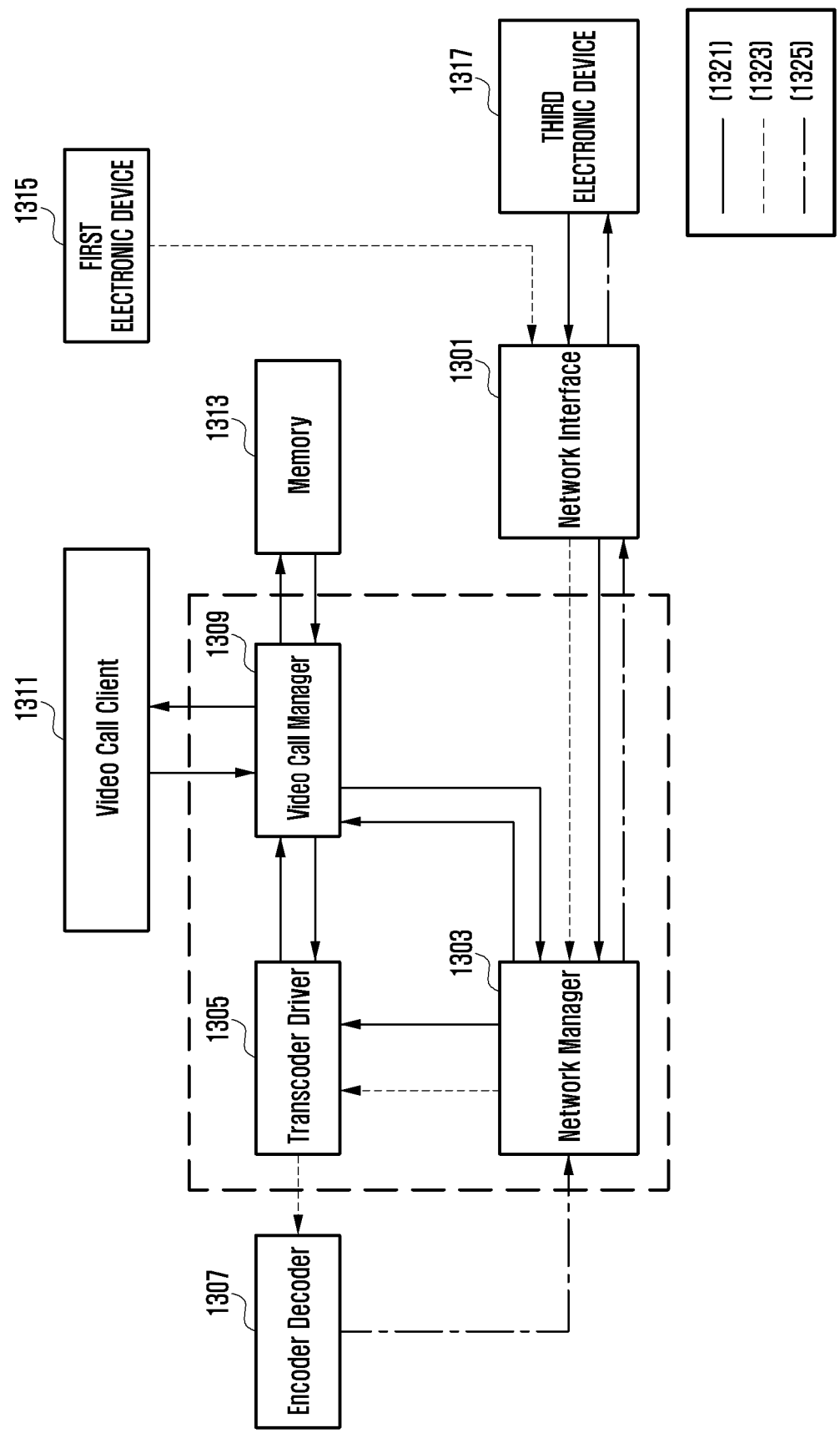
FIG. 13 is a diagram illustrating an example method of encoding video data in a second electronic device according to various example embodiments of the present disclosure.

FIG. 13 is a diagram illustrating an example method of encoding video data in a second electronic device according to various embodiments of the present disclosure.

With reference to FIG. 13, the second electronic device (e.g., the second electronic device 403 illustrated in FIG. 4, the second electronic device 603 illustrated in FIG. 6, the second electronic device 703 illustrated in FIG. 7, the second electronic device 803 illustrated in FIG. 8, the second electronic device 903 illustrated in FIG. 9, the second electronic device 1123 illustrated in FIG. 11, or the second electronic device 1215 illustrated in FIG. 12) is capable of including a network interface 1301 (e.g., the network interface 1101 illustrated in FIG. 11, or the network interface 1201 illustrated in FIG. 12), a network manager 1303 (e.g., the network manager 1105 illustrated in FIG. 11, or the network manager 1203 illustrated in FIG. 12), a transcoder driver 1305, an encoder/decoder 1307, a video call manager 1309 (e.g., the video call manager 1107 illustrated in FIG. 11 or the video call manager 1211 illustrated in FIG. 12), a video call client 1311 (e.g., the video call client 1103 illustrated in FIG. 11 or the video call client 1209 illustrated in FIG. 12), and a memory 1313 (e.g., the memory 1121 illustrated in FIG. 11).

In various embodiments of the present disclosure, reference number 1321 represents the flow of a control signal. Reference number 1323 represents the flow of a signal from the first electronic device 1315 (e.g., the first electronic device 401 illustrated in FIG. 4, the first electronic device 601 illustrated in FIG. 6, the first electronic device 701 illustrated in FIG. 7, the first electronic device 801 illustrated in FIG. 8, or the first electronic device 901 illustrated in FIG. 9) to the second electronic device. Reference number 1325 represents the flow of a signal from the second electronic device to the third electronic device 1317 (e.g., the third electronic device 405 illustrated in FIG. 4, the third electronic device 605 illustrated in FIG. 6, the third electronic device 705 illustrated in FIG. 7, the third electronic device 805 illustrated in FIG. 8, or the third electronic device 905 illustrated in FIG. 9).

In various embodiments of the present disclosure, since the network interface 1301, network manager 1303, video call manager 1309, video call client 1311, and memory 1311 are identical to the network interface 1101, network manager 1105, video call client 1103, video call manager 1107, and memory 1121 which are described above referring to FIG. 11, their detailed description will be omitted below.

In various embodiments of the present disclosure, the video call client 1311 is an application for performing a video call. The video call client 1311 is capable of detecting inputs for selecting an electronic device in order to perform a video call and adjusting the quality of video data.

In various embodiments of the present disclosure, the network manager 1303 is capable of performing network connection management operations, e.g., connection establishment, connection monitoring, connection adjustments, connection tear down, etc. The network manager 1303 is capable of measuring the network quality, using feedback data, such as packet loss information, round trip delay, etc. The network manager 1303 is also capable of measuring the network quality via training sequences received at a certain interval from the third electronic device 1317. The network manager 1303 is capable of transferring the measured network quality to the video call manager 1311.

In various embodiments of the present disclosure, the transcoder driver 1305 is capable of: determining the picture quality, frame rate (fps) or resolution of video data, using the encoding parameter that the video call manager 1311 determined based on encoding criteria (e.g., attribute information regarding the second electronic device and the third electronic device 1317, status information regarding the first network (e.g., the first network 411 illustrated in FIG. 4), or status information regarding the second network (e.g., the second network 413 illustrated in FIG. 4); and converting the video data into video data suitable for the third electronic device 1317, based on the determined picture quality, frame rate (fps) or resolution of video data.

In various embodiments of the present disclosure, the memory 1313 is capable of storing information regarding one or more electronic devices, e.g., a type of electronic device, a display size, a battery capacity, etc.

The video call manager 1309 is a module for controlling video call. The video call manager 1309 is capable of controlling the network manager 1303, the encoder/decoder driver 1307, etc. to provide video call services. The video call manager 1311 is capable of controlling functions for performing a video call, based on user inputs received from the video call client 1311. The video call manager 1309 is capable of loading information regarding the third electronic device 1317, e.g., wearable device, from the memory 1313, performing a video call, and controlling the quality of video data.

The video call manager 1309 is capable of determining a required transfer rate (maximum bit rate) based on the attributes of the third electronic device 1317 in order to perform a video call using video data obtained from the network manager 1303, the memory 1313, and the video call client 1311. The video call manager 1309 is capable of estimating a quality level of the second network connecting the third electronic device 1317 and the second electronic device, from the network manager 1303, and determining an available transfer rate (bit rate), based on the estimated quality level. The video call manager 1309 is capable of determining: the picture quality, frame rate (fps) or resolution corresponding to the determined transfer rate (bit rate); and an encoding scheme for encoding video data, based on the determined picture quality, frame rate (fps) or resolution.

In various embodiments of the present disclosure, the video call manager 1309 is capable of adjusting the size and the picture quality of video data, via an image processor of the transcoder driver 1305. The image processor is capable of reducing to the size in screen for video data to a certain ration or adjusting the picture quality of video data by altering the quantization level. Alternatively, the image processor: crops a screen of video data to adjust the size; recognizes a user's face or an object to set a region of interest (ROI); and crops the ROI, complying with the attribute of the third electronic device 1317, e.g., the display size.

For example, it is assumed that the first electronic device 1315 has a touchscreen whose height is larger than the width and the third electronic device 1317 has a touchscreen whose height and width are identical to each other, i.e., a square. In this case, the image processor of the first electronic device 1315 sets an ROI (e.g., face), as a portrait shape, in a video, crops the set ROI from the video, and transmits the cropped video data to the third electronic device 1317. When the second electronic device does not detect or track the ROI from the video data, it may crop the center portion from the video data and transmit the center-cropped video data to the third electronic device 1317 or may transmit the video data without performing the cropping operation to the third electronic device 1317.

In various embodiments of the present disclosure, the ROI may be set, based on a graphic tool for a rectangle, a circle, etc., a closed loop, a touch input, a duration of a touch input, etc.

In various embodiments of the present disclosure, the second electronic device is capable of encoding the set ROI with different levels of quality. For example, when a user's face is set as an ROI, the image processor of the second electronic device adjusts quantization levels on the face and its neighboring part in such a way as to create: video data of high picture quality for the ROI; and video data of low picture quality for the non-ROI.

In various embodiments of the present disclosure, the second electronic device is capable of receiving an ROI selected by the third electronic device 1317.

In various embodiments of the present disclosure, one or more ROIs may be set. The ROI may be altered during a video call.

Figure 14A:
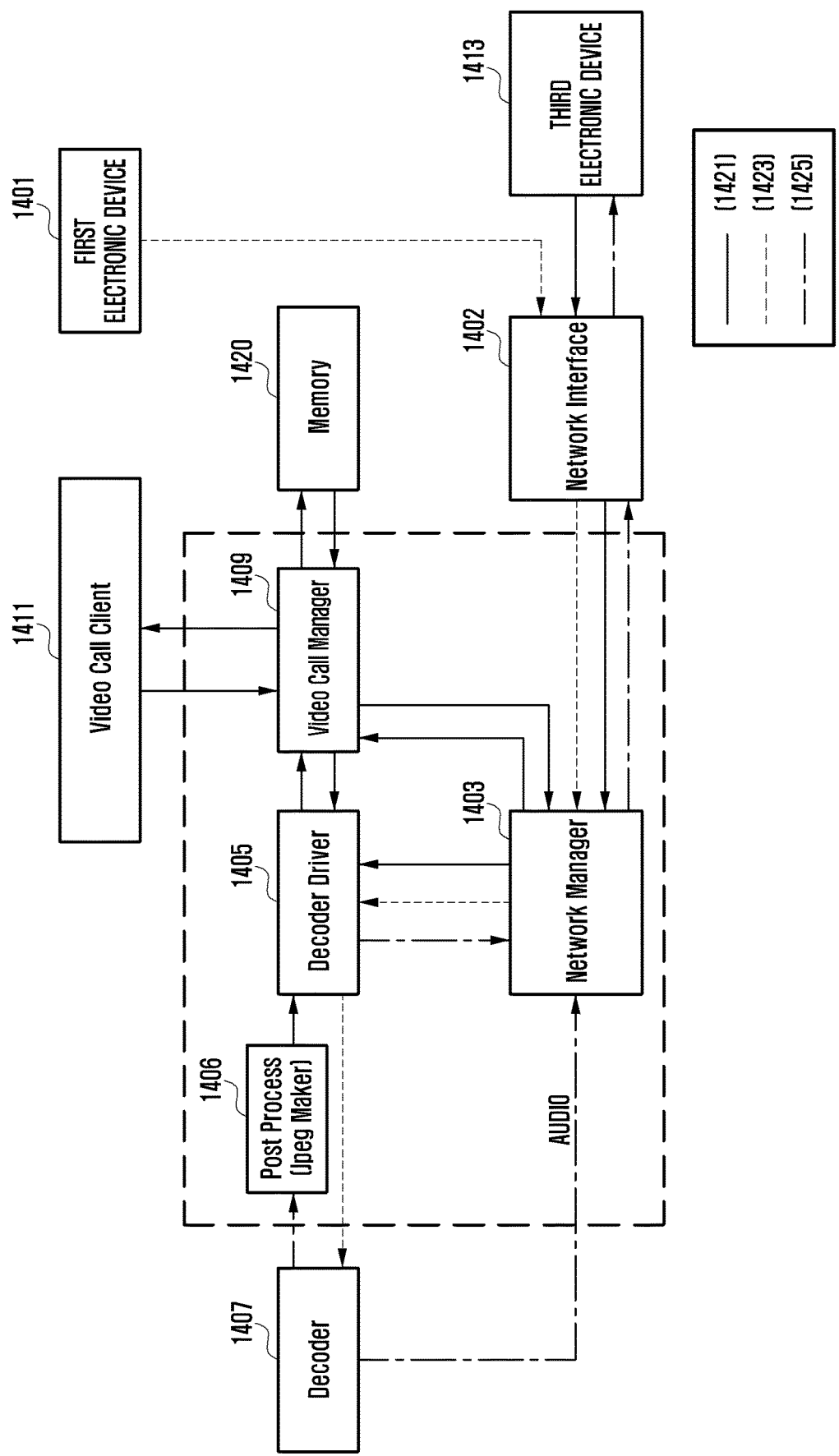
FIG. 14A is a diagram illustrating an example method of encoding video data in a second electronic device according to various example embodiments of the present disclosure.

FIG. 14A is a diagram illustrating an example method of encoding video data in a second electronic device according to various embodiments of the present disclosure.

In various embodiments of the present disclosure, the second electronic device (e.g., the second electronic device 403 illustrated in FIG. 4, the second electronic device 603 illustrated in FIG. 6, the second electronic device 703 illustrated in FIG. 7, the second electronic device 803 illustrated in FIG. 8, the second electronic device 903 illustrated in FIG. 9, the second electronic device 1123 illustrated in FIG. 11, or the second electronic device 1215 illustrated in FIG. 12) is capable of converting video data, e.g., video stream, received from the first electronic device 1401 (e.g., the first electronic device 401 illustrated in FIG. 4, the first electronic device 601 illustrated in FIG. 6, the first electronic device 701 illustrated in FIG. 7, the first electronic device 801 illustrated in FIG. 8, or the first electronic device 901 illustrated in FIG. 9), into analogue audio signals and digital still images and transmitting the analogue audio signals and digital still images to the third electronic device 1413 (e.g., the third electronic device 405 illustrated in FIG. 4, the third electronic device 605 illustrated in FIG. 6, the third electronic device 705 illustrated in FIG. 7, the third electronic device 805 illustrated in FIG. 8, or the third electronic device 905 illustrated in FIG. 9). For example, the third electronic device 1413 is capable of: continuously outputting audio signals received from the second electronic device; and outputting video signals, asynchronous with the audio signals. For example, when the quality of the second network (e.g., the second network 413 illustrated in FIG. 4) connecting the second electronic device and the third electronic device 1413 is a relatively low level or the battery level of the third electronic device 1413 is relatively low, the third electronic device 1413 outputs: audio signals in a continuous manner; and video signals in a manner asynchronous with the audio signals, thereby maintaining the video call service with a minimum of resources.

With reference to FIG. 14A, reference number 1421 represents the flow of a control signal. Reference number 1423 represents the flow of a video call signal from the first electronic device 1401 to the second electronic device. Reference number 1425 represents the flow of signals transmitting encoded video data from the second electronic device to the third electronic device 1413.

In various embodiments of the present disclosure, after the encoding process is performed, the decoder 1407 is capable of processing the video data process via a post process 1406. For example, the post process 1406 is capable of creating a still image based on the video data decoded by the decoder 1407. The decoder 1407 is capable of separating the video data received from the decoder driver 1405 into a voice signal and a video signal and decoding the separated signals. The decoder 1407 is capable of transmitting the decoded voice signal to the third electronic device 1413 via a channel separated by the network manager 1403. The decoder 1407 is capable of transferring the decoded video signal to the post process 1406. The post process 1406 is capable of converting the video signal into a still image, and transmitting the still image to the third electronic device 1413, via the decoder driver 1405 and the network manager 1403 (e.g., the network manager 1105 illustrated in FIG. 11, the network manager 1203 illustrated in FIG. 12, or the network manager 1303 illustrated in FIG. 13).

The post process 1406 is described in detail as follows, with reference to FIG. 14B.

Figure 14B:
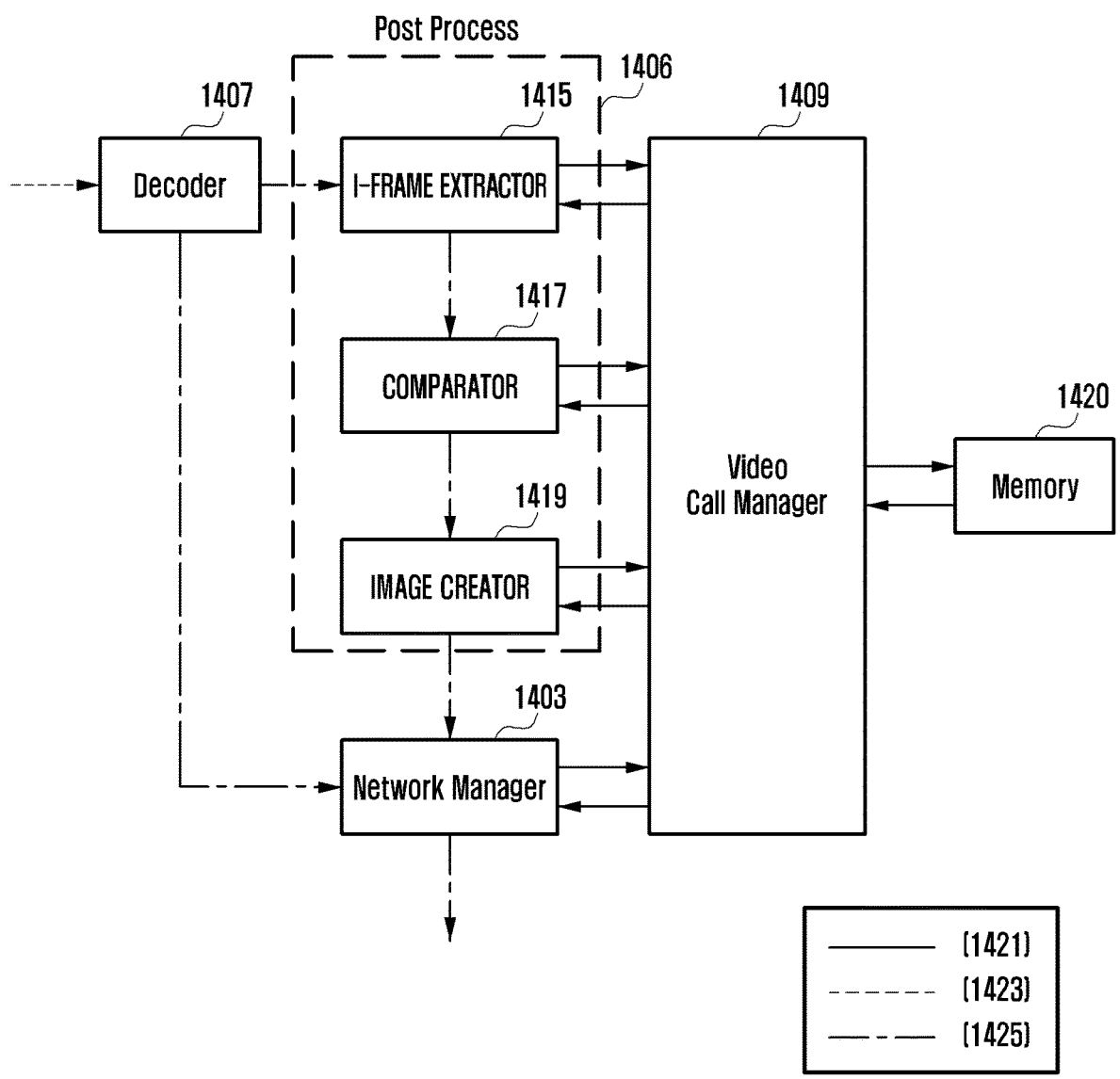
FIG. 14B is a diagram illustrating an example post process according to various example embodiments of the present disclosure.

FIG. 14B is a diagram illustrating an example post process according to various embodiments of the present disclosure.

With reference to FIG. 14B, the post process 1406 is capable of including an intra-frame (I-frame) extractor 1415, a comparator 1417, and an image creator 1419.

In various embodiments of the present disclosure, reference number 1421 represents the flow of a control signal. Reference number 1423 represents the flow of a video call signal from the first electronic device (e.g., the first electronic device 401 illustrated in FIG. 4, the first electronic device 601 illustrated in FIG. 6, the first electronic device 701 illustrated in FIG. 7, the first electronic device 801 illustrated in FIG. 8, the first electronic device 901 illustrated in FIG. 9, or the first electronic device 1401 illustrated in FIG. 14A) to the second electronic device (e.g., the second electronic device 403 illustrated in FIG. 4, the second electronic device 603 illustrated in FIG. 6, the second electronic device 703 illustrated in FIG. 7, the second electronic device 803 illustrated in FIG. 8, the second electronic device 903 illustrated in FIG. 9, the second electronic device 1123 illustrated in FIG. 11, or the second electronic device 1215 illustrated in FIG. 12). Reference number 1425 represents the flow of signals transmitting encoded video data from the second electronic device to the third electronic device (e.g., the third electronic device 405 illustrated in FIG. 4, the third electronic device 605 illustrated in FIG. 6, the third electronic device 705 illustrated in FIG. 7, the third electronic device 805 illustrated in FIG. 8, the third electronic device 905 illustrated in FIG. 9, or the third electronic device 1413 illustrated in FIG. 14A).

In various embodiments of the present disclosure, the I-frame extractor 1415, the comparator 1417, and the image creator 1419 are capable of transmitting/receiving control signals to/from the video call manager 1409. The I-frame extractor 1415 is capable of: receiving video data decoded by the decoder 1407; extracting an I-frame from the received video data; and transferring the I-frame to the comparator 1417.

The comparator 1417 is capable of comparing a previous I-frame, e.g., a first I-frame, with a current I-framed, e.g., a second I-frame, in terms of similarity. The comparator 1417 is capable of determining a degree of similarity, based on criterions received from the video call manager 1409, and adjusting the number of images to be created from the video data, based on the determined similarity. For example, when the comparator 1417 ascertains that the similarity exceeds criterions, it is capable of transferring the second I-frame to the image creator 1419. The image creator 1419 is capable of creating a still image based on the second I-frame. The image creator 1419 is capable of transmitting the created still image to the third electronic device via the network manager 1403.

Figure 15:
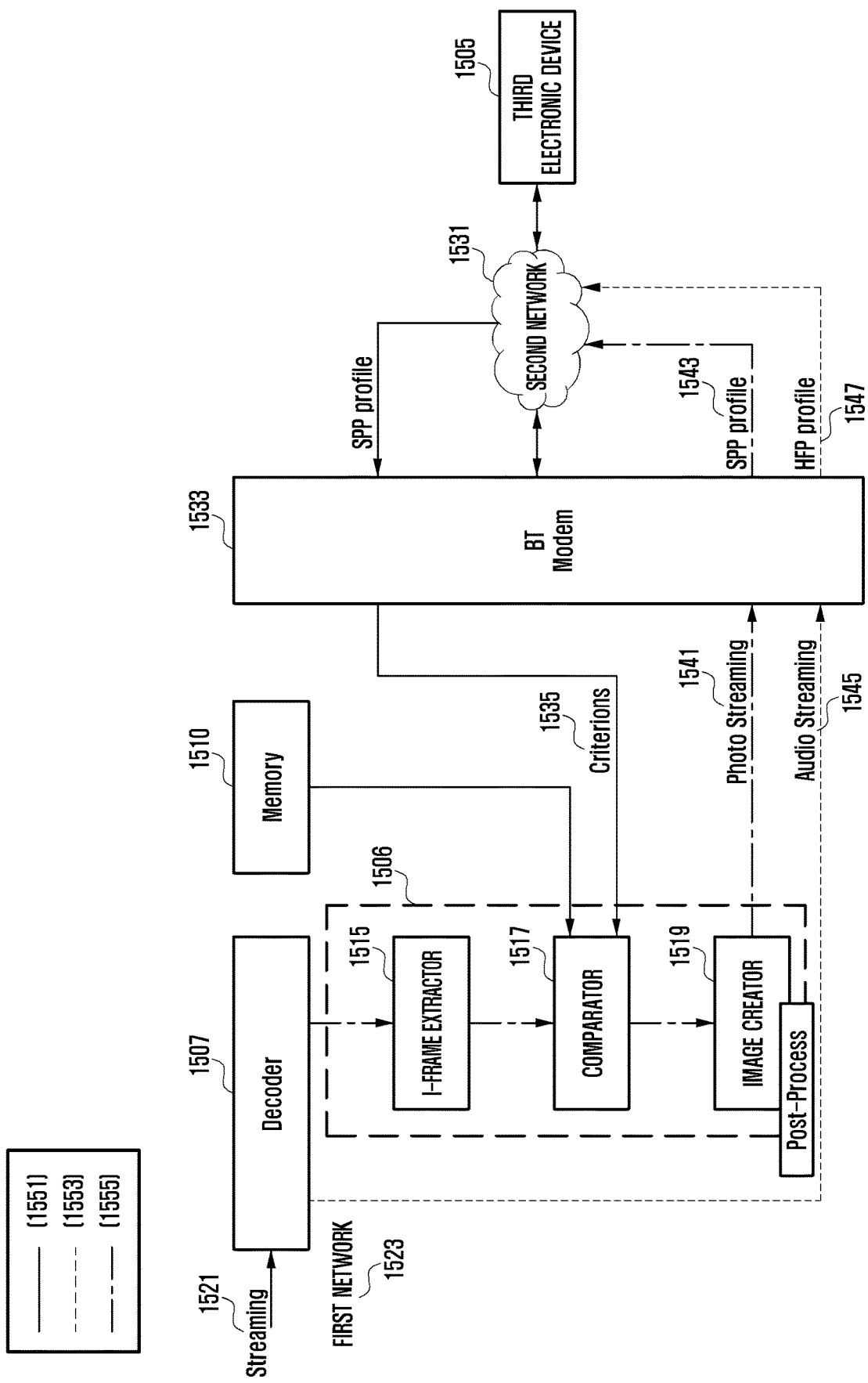
FIG. 15 is a diagram illustrating an example method of encoding video data in a second electronic device according to various example embodiments of the present disclosure.

FIG. 15 is a diagram illustrating an example method of encoding video data in a second electronic device according to various example embodiments of the present disclosure.

With reference to FIG. 15, reference number 1551 represents the flow of a control signal. Reference number 1553 represents the flow of a video call signal from the first electronic device (e.g., the first electronic device 401 illustrated in FIG. 4, the first electronic device 601 illustrated in FIG. 6, the first electronic device 701 illustrated in FIG. 7, the first electronic device 801 illustrated in FIG. 8, the first electronic device 901 illustrated in FIG. 9, or the first electronic device 1401 illustrated in FIG. 14A) to the second electronic device (e.g., the second electronic device 403 illustrated in FIG. 4, the second electronic device 603 illustrated in FIG. 6, the second electronic device 703 illustrated in FIG. 7, the second electronic device 803 illustrated in FIG. 8, the second electronic device 903 illustrated in FIG. 9, the second electronic device 1123 illustrated in FIG. 11, or the second electronic device 1215 illustrated in FIG. 12). Reference number 1555 represents the flow of signals transmitting encoded video data from the second electronic device to the third electronic device 1505 (e.g., the third electronic device 405 illustrated in FIG. 4, the third electronic device 605 illustrated in FIG. 6, the third electronic device 705 illustrated in FIG. 7, the third electronic device 805 illustrated in FIG. 8, the third electronic device 905 illustrated in FIG. 9, or the third electronic device 1413 illustrated in FIG. 14A).

In various embodiments of the present disclosure, the second electronic device creates a still image in such a way that the decoder 1507 (e.g., the decoder 1407 illustrated in FIG. 14A or 14B) decodes a video 1521 received from the first electronic device via the first network 1523 (e.g., the first network 411 illustrated in FIG. 4). The post process 1506 (e.g., the post process 1406 illustrated in FIG. 14A or 14B) is capable of receiving the decoded video data from the decoder 1507. The I-frame extractor 1515 (e.g., the I-frame extractor 1415 illustrated in FIG. 14B) of the post process 1506 extracts an I-frame from the received video data and transfers the I-frame to the comparator 1517 (e.g., the comparator 1417 illustrated in FIG. 14B). The comparator 1517 is capable of comparing a previous I-frame, e.g., a first I-frame, with a current I-framed, e.g., a second I-frame, and determining a degree of similarity, based on criterions 1535 received from the video call manager. For example, when the comparator 1517 ascertains that the similarity exceeds the criterions 1535 (e.g., the displacement of a video is relatively large), it is capable of transferring the second I-frame to the image creator 1519 (e.g., the image creator 1419 illustrated in FIG. 14B).

In various embodiments of the present disclosure, the comparator 1517 of the second electronic device is capable of adjusting a cycle for obtaining still images, based on: status information (e.g., signal quality) regarding a network connecting the second electronic device and the third electronic device 1505, e.g., the second network 1531; and information regarding the third electronic device 1505 (e.g., a type of electronic device, display size, processing power, maximum resolution, current battery level (capacity), memory usage, presence/absence of a camera, video call windows size (a resolution difference between when performing a video call via a multi-window and the entire screen), supporting codec, the number of applications in use, a type of application, etc.), from the third electronic device

1505, via the second network 1531 (e.g., the second network 413 illustrated in FIG. 4). For example, when the second electronic device ascertains that the quality of the second network 1531 is a relatively high level to perform a video call and the battery level is relatively high, it is capable of setting the cycle for obtaining still images to 1 second. When the second electronic device ascertains that the quality of the second network 1531 is a relatively high level to perform a video call but the battery level is relatively low, it is capable of setting the cycle for obtaining still images to 3 seconds. When the second electronic device ascertains that the quality of the second network 1531 is a relatively low level to perform a video call and the battery level is relatively low, it is capable of setting the cycle for obtaining still images to 5 seconds. Although the embodiment sets the cycle for obtaining still images to 1, 3 and 5 seconds based on the quality of the second network 1531 and the battery level, it should be understood that the present disclosure is not limited to the embodiment. It should be understood that the cycle for obtaining still images may also be set to any other value.

In various embodiments of the present disclosure, the image creator 1519 is capable of creating still images based on the second I-frame received from the comparator 1517.

In various embodiments of the present disclosure, the I-frames may be stored in a buffer before they are transferred to the image creator 1519. Each I-frame may be stored in the buffer, along with an assigned identification code, using a number, a mark, a character, or the like. The identification code may be assigned, based on time information, sequence information, calling and called parties' accounts, information regarding electronic devices providing services (e.g., a name or a mac address of an electronic device). When the second electronic device receives a request for capturing or storing a displayed video from the third electronic device 1505, it is capable of: searching the buffer for a high-resolution image which has not been encoded with an I-frame, corresponding to video data corresponding to the capture or storage request, using an identification code assigned to the I-frame; and storing the video image as a high-resolution video.

The high-resolution video may be stored in the second electronic device or the third electronic device 1505. The buffer may be a cyclic buffer.

The image creator 1519 is capable of transmitting the created still image to the third electronic device 1505 via the network manager, e.g., BT modem 1533.

Although the embodiment is described in such a way to create still images in comparison of I-frames, it should be understood that the present disclosure is not limited thereto. The embodiment may also be modified in such a way that still images are created based on direction (movement) vector variation, key frame variation, dominant color variation of video, a cycle of a specified time interval, any circle of a random time interval, etc.

Various embodiments of the present disclosure are capable of using the change in content of video data as a trigger point for creating an image. For example, when the image creator 1519 of the second electronic device detects a change in a specified region of video data, e.g., a change in creation or modification of a subtitle, a change in a character's face or the number of characters in a video, etc., it is capable of recognizing the change as a trigger point and creating a still image. When the image creator 1519 of the second electronic device ascertains that a specified video is illustrated or a specified region is changed in a video, it is capable of creating a still image. For example, the image creator 1519 of the second electronic device is capable of obtaining a still image each time that score information is illustrated in a specified region of a TV screen displaying a baseball game broadcast. When the image creator 1519 recognizes a change in score information via the comparator 1517 of the second electronic device, it is capable of creating a still image.

In various embodiments of the present disclosure, the image creator 1519 is capable of determining the size and/or the picture quality of a still image, based on information regarding the third electronic device 1505 and the second network 1531. For example, when the third electronic device 1505 has a relatively small size of display, it is capable of altering the size of a video to a size suitable for a display window, regardless of a size of the video, or adjusting a quantization level of a video, thereby adjusting the picture quality of the still image.

In various embodiments of the present disclosure, the second electronic device is capable of transmitting, in real-time: the created still image 1541 to the third electronic device 1505 via a serial port profile (SPP) 1543 of the BT modem 1533; and the audio signal 1545 to the third electronic device 1505, via a hands free profile (HFP) 1547 of the BT modem 1533.

In various embodiments of the present disclosure, the SPP 1543 and the HFP 1547 are capable of connecting to different electronic devices respectively. For example, the still image 1541 is transmitted via the SPP 1543 to the third electronic device 1505 and played back therein. The audio signal 1545 is transmitted via the HFP 1547 to an external speaker or an audio device such as a Bluetooth headset and played back thereby.

Although the embodiment is described in such a way that video data and voice signals are transmitted to the third electronic device 1505 using different methods, it should be understood that the present disclosure is not limited to those embodiments. The embodiment may be modified in such a way as to encode video data and voice signals into a single file and transmit the file to the electronic device. For example, after encrypting voice signals into an image file or an image file into voice signals, the second electronic device is capable of transmitting the encrypted result to the third electronic device 1505 via the SPP of the Bluetooth.

In various embodiments of the present disclosure, the video data and the voice signals, required to perform a video call, may be played back selectively according to conditions. For example, according to status information regarding the electronic device and the quality of network, video data and voice data may be played back or voice data may only be played back. The configuration for selectively playing back video data or voice data, based on network status information, is described in detail below.

In various embodiments of the present disclosure, when the quality of the first network (e.g., the first network 411 illustrated in FIG. 4 or the first network 1523 illustrated in FIG. 15) or the second network (e.g., the second network 413 illustrated in FIG. 4 or the second network 1531 illustrated in FIG. 15) is relatively high to perform a video call, and the battery level of the third electronic device (e.g., the third electronic device 405 illustrated in FIG. 4, the third electronic device 605 illustrated in FIG. 6, the third electronic device 705 illustrated in FIG. 7, the third electronic device 805 illustrated in FIG. 8, the third electronic device 905 illustrated in FIG. 9, the third electronic device 1413 illustrated in FIG. 14A, or the third electronic device 1505 illustrated in FIG. 15) is relatively high, the second electronic device (e.g., the second electronic device 403 illustrated in FIG. 4, the second electronic device 603 illustrated in FIG. 6, the second electronic device 703 illustrated in FIG. 7, the second electronic device 803 illustrated in FIG. 8, the second electronic device 903 illustrated in FIG. 9, the second electronic device 1123 illustrated in FIG. 11, or the second electronic device 1215 illustrated in FIG. 12) is capable of: adjusting video data for performing a video call, using a transcoding scheme parameter suitable for the network quality; and encoding the video data, via the transcoding scheme. That is, the second electronic device is capable of: adjusting resolution, frame rate (fps) or picture quality of video data to create video data which can be used for a video call at a relatively low transfer rate, and transmitting the video data to the third electronic device.

In various embodiments of the present disclosure, when the quality of the first or second network is deteriorated, the second electronic device transmits, to the third electronic device, audio signals, in real-time, and still images, instead of video data, at a certain interval (e.g., a transfer cycle determined the network state). Therefore, the user may be provided with a limited video call service.

In various embodiments of the present disclosure, when the quality of the first or second network is further deteriorated, the second electronic device does not transmit, to the third electronic device, video data, but transmits only audio signals, so that the user can perform a voice call.

In various embodiments of the present disclosure, when the quality of the first or second network is worst or the distance between the second and third electronic devices exceeds a threshold, the second electronic device determines that it cannot provide the third electronic device with a video call service, and thus switches a video call to another electronic device or terminates the video call.

In another embodiment, while the second electronic device is performing a video call via the third electronic device, it is capable of detecting the movement of the third electronic device. The third electronic device is capable of: estimating the quality of a network connecting to the second electronic device, based on the moving direction and the displacement change; and providing a corresponding notification to the second electronic device. For example, when the third electronic device detects the decrease in the network quality since it moves away from the second electronic device, it is capable of notifying the second electronic device that the video call quality is deteriorated, via a notification, such as vibration, a message, etc.

Figure 16:
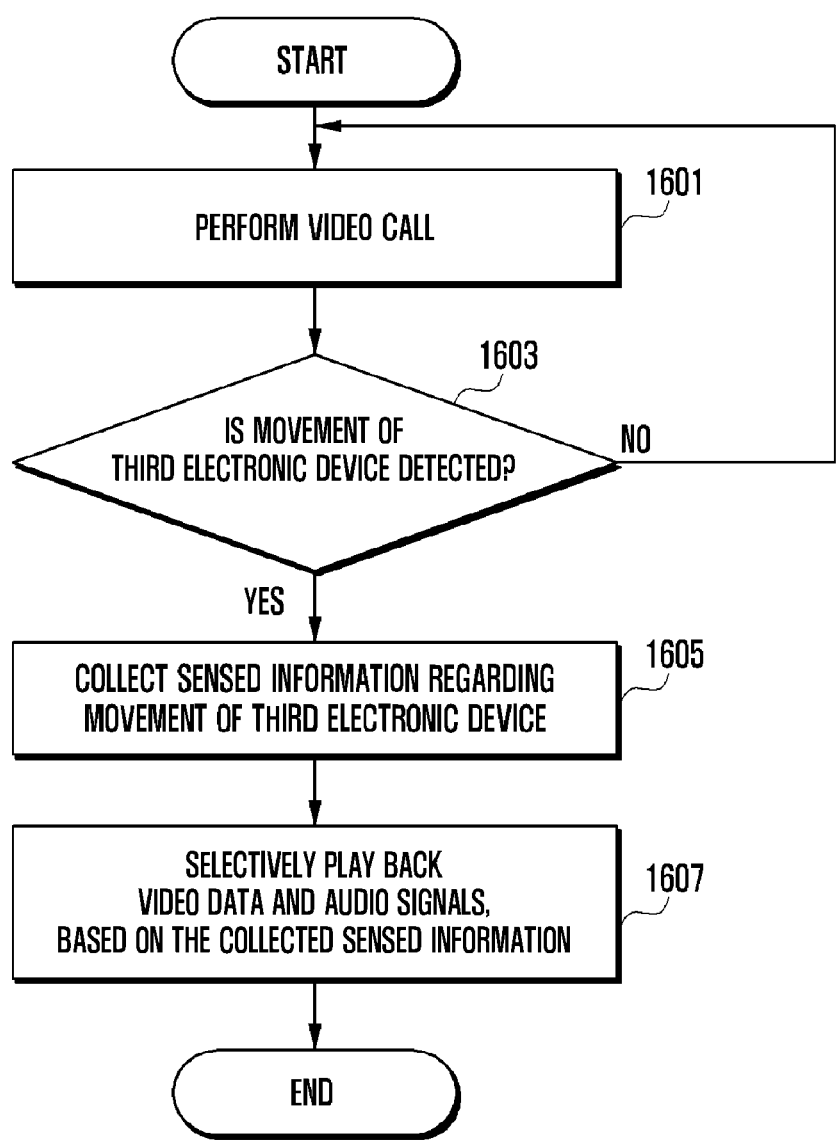
FIG. 16 is a flowchart illustrating an example method of reproducing video data in a third electronic device according to various example embodiments of the present disclosure.

FIG. 16 is a flowchart illustrating an example method of reproducing video data in a third electronic device according to various example embodiments of the present disclosure.

In various embodiments of the present disclosure, the third electronic device (e.g., the third electronic device 405 illustrated in FIG. 4, the third electronic device 605 illustrated in FIG. 6, the third electronic device 705 illustrated in FIG. 7, the third electronic device 805 illustrated in FIG. 8, the third electronic device 905 illustrated in FIG. 9, the third electronic device 1413 illustrated in FIG. 14A, or the third electronic device 1505 illustrated in FIG. 15) detects the movement, it is capable of controlling a video call service according to the movement.

With reference to FIG. 16, the third electronic device is capable of performing a video call in operation 1601. The third electronic device is capable of determining whether it detects its movement in operation 1603.

When the third electronic device detects its movement in operation 1603, it collects sensed information regarding its movement via the sensor in operation 1605. The third electronic device selectively plays back video data or audio signals, based on the collected sensed information in operation 1607.

For example, the third electronic device is capable of measuring a movement angle of its head, using a geomagnetic sensor. The third electronic device is capable of detecting its movement, using an acceleration sensor and a gyro sensor. The third electronic device is capable of collecting sensed information according to its movement, via the geomagnetic sensor, acceleration sensor or gyro sensor.

In various embodiments of the present disclosure, the third electronic device is implemented with a watch. In this case, the third electronic device is capable of controlling the playback of video data according to the movement of a user's hand wearing the watch (e.g., a movement angle of the head of the watch, measured by geomagnetic sensor). For example, when the user puts the hand down (e.g., when a movement angle of the head of the third electronic device changes from 0° to 90°), the third electronic device determines that the user is performing a video call, via only voice, without viewing a video of a video call. When the user puts the hand up (e.g., when a movement angle of the head of the third electronic device changes from 90° to 0°), the third electronic device determines that the user is performing a video call, via a video and voice, viewing a video of the video call. That is, in various embodiments of the present disclosure, the third electronic device analyzes the collected sensed information and ascertains that the movement of the electronic device is within a preset range, it is capable of storing video data in the memory, while reproducing the audio. On the other hand, when the third electronic device ascertains that the movement of the electronic device is not within a preset range, it is capable of reproducing video streams stored in the memory.

In various embodiments of the present disclosure, when the third electronic device is equipped with a video input module, e.g., a camera, it is capable of obtaining the movement of a user's eyes via the sensor, determining whether the user fixes their eyes on the screen, and controlling the playback of video data based on the determination. Alternatively, the third electronic device is capable of performing the recognition of a user's face and/or iris, and determining whether the user fixes their eyes on the screen.

In various embodiments of the present disclosure, when the third electronic device ascertains that the user is performing a video call, using only voice, it stores the video data in a buffer, without updating the video data, and receives only the voice.

When the third electronic device recognizes the face and/or iris, via the camera, it is capable of playing back a video stored in a buffer, in a slide show mode, at a relatively high speed. Therefore, the user may check the updated images without missing out.

In various embodiments of the present disclosure, a playback speed of slides may vary depending on the number of images to be played back. For example, when a slide playback time has been set to a specified period of time, 30 images and 10 images may set their playback speeds to different values to be played within the set period of time. Alternatively, a required time for playback may vary depending on the number of images to be played back. Therefore, various embodiments of the present disclosure are capable of preventing images from being played back too fast or slow.

Various embodiments of the present disclosure are capable of compressing and storing the displayed video data. For example, when third electronic device does not recognize a user's face and/or iris, it determines that the user has not fixed their eyes on the screen and stores video data corresponding to when the user does not gaze.

In various embodiments of the present disclosure, when the third electronic device recognizes a user's face and/or iris via the camera, it is capable of playing back video data which has been compressed and stored.

In various embodiments of the present disclosure, when the third electronic device does not recognize a user's face and/or iris via the camera, it is capable of extracting a key frame from the video data, and creating and storing an image. When the third electronic device recognizes a user's face and/or iris via the camera, it is capable of playing back stored images in a slideshow mode.

Figure 17A:
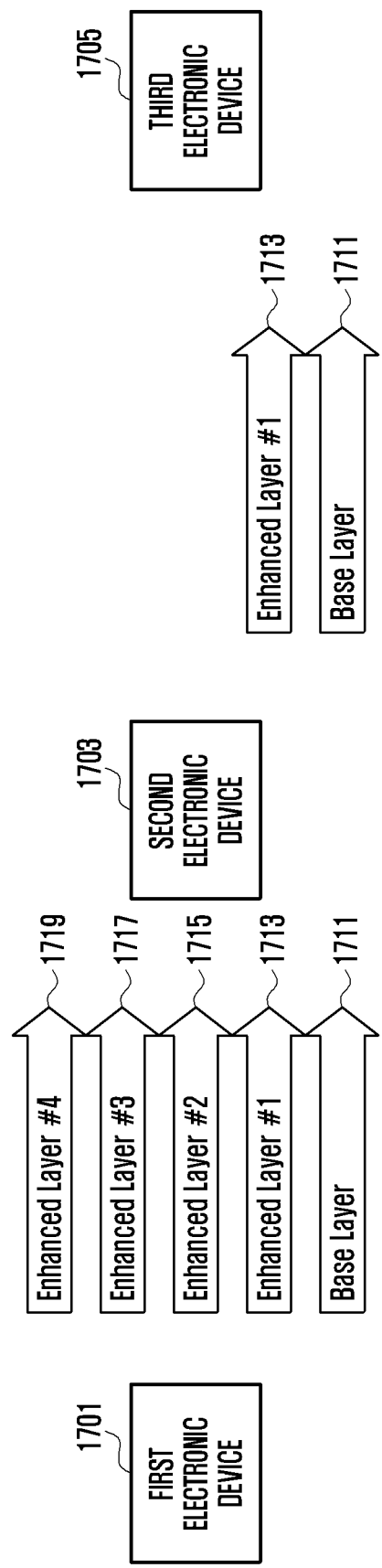
FIGS. 17A and 17B are diagrams illustrating an example method of encoding video data in a second electronic device according to various example embodiments of the present disclosure.
Figure 17B:
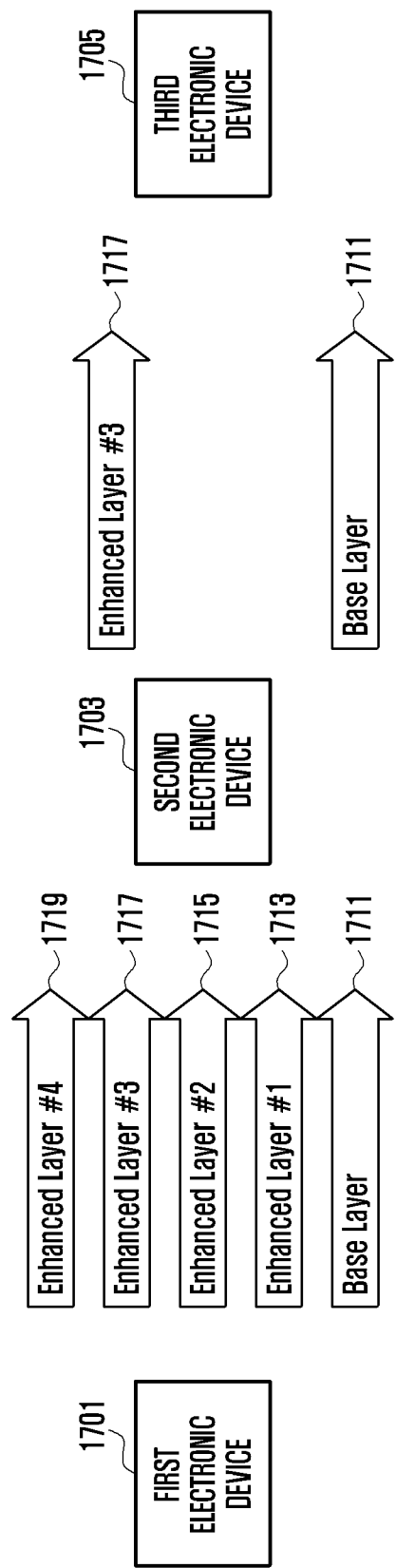

FIGS. 17A and 17B are diagrams illustrating an example method of encoding video data in a second electronic device according to various example embodiments of the present disclosure.

In various embodiments of the present disclosure, the second electronic device 1703 (e.g., the second electronic device 403 illustrated in FIG. 4, the second electronic device 603 illustrated in FIG. 6, the second electronic device 703 illustrated in FIG. 7, the second electronic device 803 illustrated in FIG. 8, the second electronic device 903 illustrated in FIG. 9, the second electronic device 1123 illustrated in FIG. 11, or the second electronic device 1215 illustrated in FIG. 12) is capable of encoding video data using a scalable encoding (spatial and time domain) scheme. The scalable encoding is processes of dividing input video streams into video streams of two or more layers, i.e., a hierarchical structure, and encoding the video streams. In the scalable encoding, a video sequence may be compressed into a number layers, e.g., a base layer and one or more enhanced layers. The base layer is bit streams which can be independently decoded and may contain information for restoring a minimum quality of video. The enhanced layer is additional bit streams to improve the base layer bit stream and may be decoded along with the base layer. Therefore, the scalable encoding is capable of encoding a number of video layers into one bit stream. That is, the hierarchical streams may be played back using only a base layer. When the hierarchical streams may be played back with enhanced layers that differ from the base layer, high quality of video in layers may be obtained according to the number of enhanced layers in use.

In various embodiments of the present disclosure, the second electronic device 1703 is capable of receiving all layers of scalable encoding signals from the first electronic device 1701 (e.g., the first electronic device 401 illustrated in FIG. 4, the first electronic device 601 illustrated in FIG. 6, the first electronic device 701 illustrated in FIG. 7, the first electronic device 801 illustrated in FIG. 8, the first electronic device 901 illustrated in FIG. 9, or the first electronic device 1401 illustrated in FIG. 14A). The second electronic device 1703 is capable of transmitting only a base layer of the received all layers to the third electronic device 1705 (e.g., the third electronic device 405 illustrated in FIG. 4, the third electronic device 605 illustrated in FIG. 6, the third electronic device 705 illustrated in FIG. 7, the third electronic device 805 illustrated in FIG. 8, the third electronic device 905 illustrated in FIG. 9, the third electronic device 1413 illustrated in FIG. 14A, or the third electronic device 1505 illustrated in FIG. 15). Alternatively, the second electronic device 1703 is capable of: determining an enhanced layer to be transmitted along with a base layer, based on basic information and current status information regarding the third electronic device 1705 or status information regarding the second network between the second electronic device 1703 and the third electronic device 1705 (e.g., the second network 413 illustrated in FIG. 4, or the second network 1531 illustrated in FIG. 15); and transmitting the base layer and the determined enhanced layer to the third electronic device 1705.

In various embodiments of the present disclosure, when the first electronic device 1701 performs the encoding operation using a scalable encoding scheme and transmits the encoded result to the second electronic device 1703, the second electronic device 1703 is capable of determining enhanced layers to be transmitted to the third electronic device 1705, based on current status information and basic information regarding the third electronic device 1705 (e.g., type, display size, display shape (e.g., circle, rectangle, or square), battery capacity, display resolution, CPU power) or status information regarding the second network between the second electronic device 1703 and the third electronic device 1705 (e.g., the second network 413 illustrated in FIG. 4 or the second network 1531 illustrated in FIG. 15). That is, the second electronic device 1703 is capable of transmitting, to the third electronic device 1705 to which a current video call is made, a base layer received from the first electronic device 1701 or a combination of the base layer with at least one enhanced layer, considering a state of the third electronic device 1705.

In various embodiments of the present disclosure, information regarding the second electronic device 1703 may have been registered in a user account cooperation server. Alternatively, when the first electronic device 1701 makes a call to the second electronic device 1703, it is capable of obtaining the information regarding the second electronic device 1703 from the second electronic device 1703. For example, the user account cooperation server is capable of managing users' electronic devices and information regarding the electronic devices (e.g., status information), based on user accounts (e.g., IDs). The user account cooperation server is capable of providing a calling electronic device (e.g., first electronic device) to make a video call with information regarding a called electronic device.

It is assumed that the second electronic device 1703 is connected, via Bluetooth, with a third electronic device 1705, e.g., a watch with a screen of 2 inches, as illustrated in FIG. 17A, and a car kit with a screen of 7 inches as illustrated in FIG. 17B, and this status information, as use information regarding a user's devices, is updated in the user account cooperation server.

In various embodiments of the present disclosure, the first electronic device 1701 is capable of determining a scheme for encoding video data, e.g., a scalable encoding scheme, based on device information stored in the user account cooperation server.

For example, the user may set the electronic device, and the watch and the car kit (a car entertainment system, a car control system, etc.), connected to the electronic device, to be in use, and may register the watch and the car kit in the user account cooperation server. The user account cooperation server is capable of monitoring the registered electronic devices, e.g., a watch, a car kit, etc. In a state where the user account cooperation server is monitoring a vehicle as a registered electronic device, when it detects the change in its status information, it is capable of updating the status information regarding the vehicle.

In various embodiments of the present disclosure, the first electronic device 1701 may configure enhanced layers in various types according to time and spatial requirements. The first electronic device 1701 transmits the variously configured, enhanced layers to the third electronic device 1705 connected to the second electronic device 1703 via the second network. The first electronic device 1701 is capable of creating a base layer and enhanced layers, considering a temporal resolution (7.5 fps, 15 fps, or 30 fps) and a spatial resolution (QCIF, CIF, or QVGA).

Since the user account cooperation server stores information regarding a watch and a car kit, the first electronic device 1701 is capable of performing a video call with the watch and/or the car kit. The first electronic device 1701 is capable of encoding video data for a video call with the watch and the car kit. For example, the first electronic device 1701 is capable of: encoding, based on a base layer 1711, video data to enhanced layer #1 (1713) of low quality for a watch, enhanced layer #2 (1715) of high quality for a watch, enhanced layer #3 (1717) of low quality for a car kit, and enhanced layer #4 (1719) of high quality for a car kit; and transmitting the encoded results to the second electronic device 1703.

For example, when the third electronic device 1705 receives a video call via a watch as illustrated in FIG. 17A, the second electronic device 1703 is capable of transmitting: to the watch, only the base layer 1711, based on status information regarding the second network, and current information regarding the watch, such as the memory usage, the battery level, etc.; or to the third electronic device 1705, enhanced layer #1 (1713) corresponding to encoded video data of low quality for the watch and the base layer 1711.

When the third electronic device 1705 receives a video call via a car kit as illustrated in FIG. 17B, the second electronic device 1703 is capable of transmitting: to the car kit, only the base layer 1711, based on status information regarding the second network, and current information regarding the car kit, such as the memory usage, CPU power, process occupancy by the operating system, etc.; or to the third electronic device 1705, enhanced layer #3 (1717) corresponding to encoded video data of low quality for the car kit and the base layer 1711.

FIG. 18 is a diagram illustrating an example method of encoding video data in a second electronic device according to various example embodiments of the present disclosure.

With reference to FIG. 18, the second electronic device (e.g., the second electronic device 403 illustrated in FIG. 4, the second electronic device 603 illustrated in FIG. 6, the second electronic device 703 illustrated in FIG. 7, the second electronic device 803 illustrated in FIG. 8, the second electronic device 903 illustrated in FIG. 9, the second electronic device 1123 illustrated in FIG. 11, the second electronic device 1215 illustrated in FIG. 12, the second electronic device 1703 illustrated in FIG. 17A or 17B) is capable of encoding video data using a mirroring/resized-mirroring scheme.

In various embodiments of the present disclosure, the second electronic device is capable of transmitting mirroring video data resized based on video data received from the first electronic device (e.g., the first electronic device 401 illustrated in FIG. 4, the first electronic device 601 illustrated in FIG. 6, the first electronic device 701 illustrated in FIG. 7, the first electronic device 801 illustrated in FIG. 8, the first electronic device 901 illustrated in FIG. 9, the first electronic device 1401 illustrated in FIG. 14A, the first electronic device 1701 illustrated in FIG. 17A or 17B) to the third electronic device (e.g., the third electronic device 405 illustrated in FIG. 4, the third electronic device 605 illustrated in FIG. 6, the third electronic device 705 illustrated in FIG. 7, the third electronic device 805 illustrated in FIG. 8, the third electronic device 905 illustrated in FIG. 9, the third electronic device 1413 illustrated in FIG. 14A, the third electronic device 1505 illustrated in FIG. 15, the third electronic device 1705 illustrated in FIG. 17A or 17B). The second electronic device is capable of determining a resize of video data, based on information regarding the third electronic device (e.g., type, display size, CPU power, screen shape, battery level, or memory usage) and status information regarding the second network (e.g., the second network 413 illustrated in FIG. 4, or the second network 1531 illustrated in FIG. 15) connecting the second and third electronic devices.

In various embodiments of the present disclosure, the second electronic device is capable of moving the focus of mirroring video data or cropping mirroring video data, using the content and the display shape (e.g., circle, square, or rectangle) of the third electronic device, and transmitting the result to the third electronic device. The second electronic device is capable of: focusing or cropping mirroring video data with respect to the center; or focusing or cropping mirroring video data, using the facial recognition or the object recognition, and transmitting the result to the third electronic device.

The third electronic device is an electronic device with a display shaped as a square as illustrated in diagram 1803 or a circle as illustrated in diagram 1805. When video data displayed on a rectangle display screen of the electronic device 1801 whose height is larger than the width needs to be displayed on a square or circle display screen of the electronic device 1803 or 1805, the second electronic device recognizes only the face region in the video data displayed on the electronic device 1801 and crops the region for the display shape, e.g., a square shape 1803 or a circle shape 1805. The second electronic device is capable of transmitting only the cropped face region to the third electronic device. The third electronic device is capable of displaying the video data corresponding to the face region, received from the second electronic device.

Figure 19A:
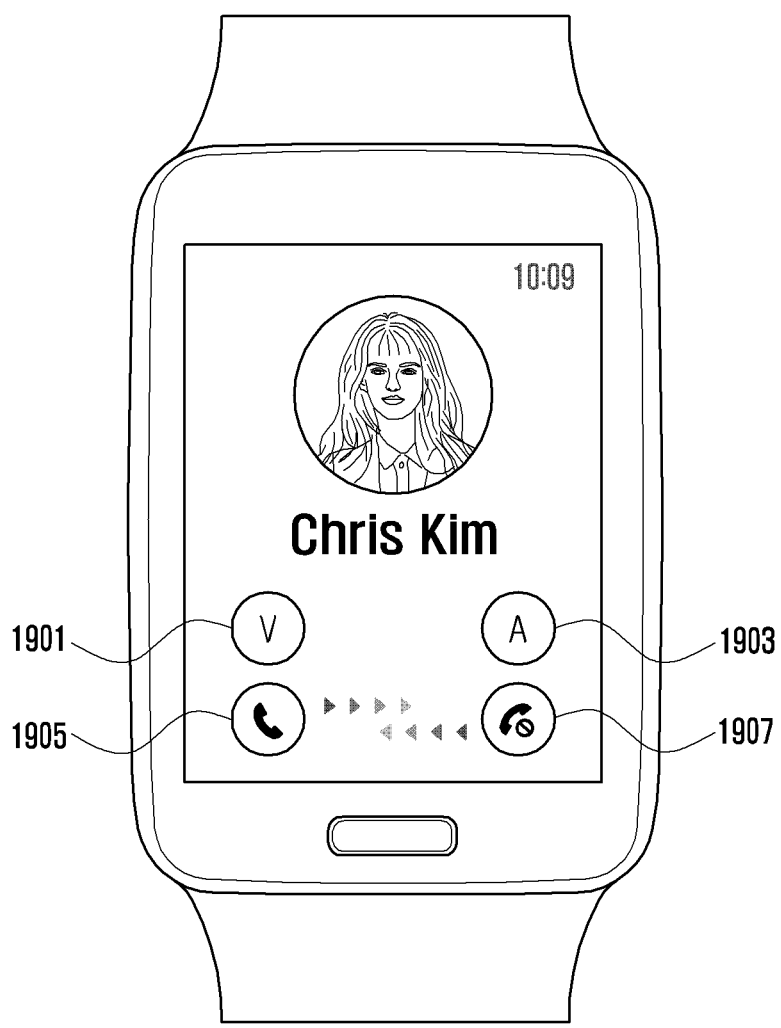
FIGS. 19A and 19B are diagrams illustrating an example user interface related to the reception/transmission of a video call according to various example embodiments of the present disclosure.
Figure 19B:
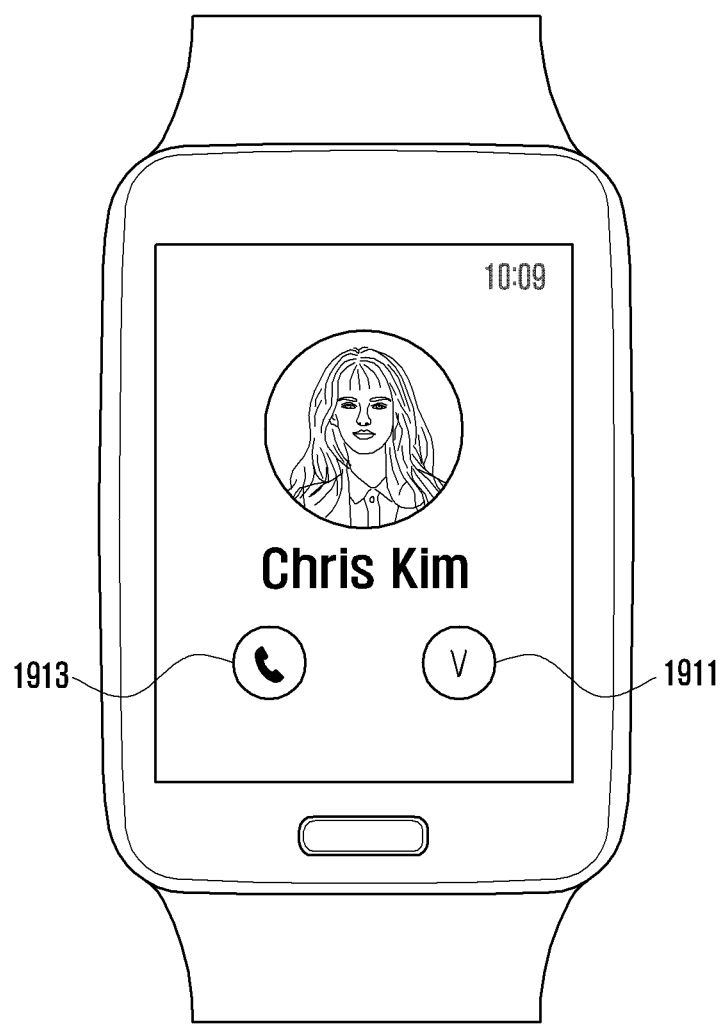

FIGS. 19A and 19B are diagrams illustrating an example user interface related to the reception/transmission of a video call according to various example embodiments of the present disclosure.

With reference to FIGS. 19A and 19B, the second electronic device (e.g., the second electronic device 403 illustrated in FIG. 4, the second electronic device 603 illustrated in FIG. 6, the second electronic device 703 illustrated in FIG. 7, the second electronic device 803 illustrated in FIG. 8, the second electronic device 903 illustrated in FIG. 9, the second electronic device 1123 illustrated in FIG. 11, the second electronic device 1215 illustrated in FIG. 12, the second electronic device 1703 illustrated in FIG. 17A or 17B) receives a video call request from the first electronic device (e.g., the first electronic device 401 illustrated in FIG. 4, the first electronic device 601 illustrated in FIG. 6, the first electronic device 701 illustrated in FIG. 7, the first electronic device 801 illustrated in FIG. 8, the first electronic device 901 illustrated in FIG. 9, the first electronic device 1401 illustrated in FIG. 14A, the first electronic device 1701 illustrated in FIG. 17A or 17B), and transmits a notification to the third electronic device (e.g., the third electronic device 405 illustrated in FIG. 4, the third electronic device 605 illustrated in FIG. 6, the third electronic device 705 illustrated in FIG. 7, the third electronic device 805 illustrated in FIG. 8, the third electronic device 905 illustrated in FIG. 9, the third electronic device 1413 illustrated in FIG. 14A, the third electronic device 1505 illustrated in FIG. 15, the third electronic device 1705 illustrated in FIG. 17A or 17B) connected to the second electronic device via the second network (e.g., the second network 413 illustrated in FIG. 4, or the second network 1531 illustrated in FIG. 15). After receiving the notification, the third electronic device is capable of: determining whether it can make a video call, based on status information regarding the second network connected to the second electronic device, information regarding battery level, memory usage, process schedule, etc. of the second and third electronic devices; and displaying the determination on the display screen.

For example, when the quality of the second network is relatively high to perform a video call and the battery level is also high level, the third electronic device is capable of displaying a user interface of icons corresponding to video calling 1901 to the second electronic device, video calling 1903 to third electronic device, voice calling 1905 to the third electronic device, call rejection 1907, etc. as illustrated in FIG. 19A.

In various embodiments of the present disclosure, when the third electronic device receives video data for a video call, it is capable of displaying a user interface for receiving a video of low quality or high quality, along with video call quality information such as frame rate (fps), resolution information regarding the video data, etc.

In various embodiments of the present disclosure, when the third electronic device makes a video call to an external electronic device, e.g., the first electronic device is capable of: determining whether a video call is possible, based on status information regarding the second network with the second electronic device, status information regarding the first network (e.g., the first network 411 illustrated in FIG. 4, or the first network 1523 illustrated in FIG. 15), information regarding the first to third electronic devices, such as battery level, memory status, schedule states of the processor, etc.; and displaying the determination on the user interface. For example, when the quality of the second network is relatively low to perform a video call or the battery level is relatively low, the third electronic device is capable of displaying a user interface of icons corresponding to video calling 1913 using only voice to an external electronic device, e.g., first electronic device, and video calling 1911 with the second electronic device, etc., as illustrated in FIG. 19B.

In various embodiments of the present disclosure, the third electronic device is capable of serving as a controller or a hub for connecting a video call to another electronic device. In this case, the first electronic device is capable of performing a video call using a device which is registered in the first to third electronic devices via the third electronic device or a device which is not registered but is available.

FIGS. 20A, 20B, 20C and 20D are diagrams illustrating an example user interface for receiving a video call according to various example embodiments of the present disclosure.

With reference to FIGS. 20A to 20D, the third electronic device (e.g., the third electronic device 405 illustrated in FIG. 4, the third electronic device 605 illustrated in FIG. 6, the third electronic device 705 illustrated in FIG. 7, the third electronic device 805 illustrated in FIG. 8, the third electronic device 905 illustrated in FIG. 9, the third electronic device 1413 illustrated in FIG. 14A, the third electronic device 1505 illustrated in FIG. 15, the first electronic device 1701 illustrated in FIG. 17A or 17B) is capable of displaying: the third electronic device or an electronic device connected to the third electronic device; an electronic device connected to or registered in the second electronic device (e.g., the second electronic device 403 illustrated in FIG. 4, the second electronic device 603 illustrated in FIG. 6, the second electronic device 703 illustrated in FIG. 7, the second electronic device 803 illustrated in FIG. 8, the second electronic device 903 illustrated in FIG. 9, the second electronic device 1123 illustrated in FIG. 11, the second electronic device 1215 illustrated in FIG. 12, the second electronic device 1703 illustrated in FIG. 17A or 17B); and an electronic device which is not registered in the second or third electronic device but is connectable. When the third electronic device receives an input for selecting one of the displayed electronic devices capable of performing a video call, it is capable of transmitting a video call signal to the selected electronic device.

In various embodiments of the present disclosure, the size of an icon representing an electronic device capable of performing a video call may indicate a level of video call quality. The video call quality level may be determined based on the quality of network with each electronic device and a state of each electronic device. The size of the icon may be proportional to the video call quality level. For example, the larger the size of the icon, the higher the video call quality level. That is, the smaller the size of the icon, the lower the video call quality level.

Although the embodiment is descried in such a way that the size of the icon representing an electronic device capable of performing a video call varies depending on levels of video call quality, it should be understood that the present disclosure is not limited to the embodiment. An icon presenting an electronic device suitable for a video call is displayed in such a way as to vary the shape, the color (e.g., brightness/black-and-white), or the outline. Alternatively, an electronic device suitable for a video call may be displayed with different icons according to levels of video call quality, e.g., a broken icon showing a relatively low level of quality. That is, various embodiments of the present disclosure are capable of indicating levels of video call quality, by varying size, icon shape or color of an icon or a combination thereof.

As illustrated in FIGS. 20A to 20D, the third electronic device is capable of displaying icons representing electronic devices capable of performing a video call. For example, the third electronic device is capable of displaying an icon 2011 representing a TV, an icon 2013 representing a smartphone, an icon 2015 representing a car kit, an icon 2017 representing a tablet PC, an icon 2019 representing a headset, an icon 2021 representing video call rejection, and an icon 2023 representing a watch.

For example, the third electronic device is capable of displaying the TV icon 2011 larger in size than the other electronic devices, e.g., the smartphone icon 2013, the car kit icon 2015, the table PC icon 2017, the headset icon 2019, the video call rejection icon 2021, and the watch icon 2023. That is, when the TV icon 2011 is selected, the first electronic device (e.g., the first electronic device 401 illustrated in FIG. 4, the first electronic device 601 illustrated in FIG. 6, the first electronic device 701 illustrated in FIG. 7, the first electronic device 801 illustrated in FIG. 8, the first electronic device 901 illustrated in FIG. 9, the first electronic device 1401 illustrated in FIG. 14A, the first electronic device 1701 illustrated in FIG. 17A or 17B) is capable of performing a video call of high quality with the TV. The car kit icon 2015 is relatively smaller in size that the TV icon 2111. That is, when the car kit icon 2015 is selected, the communication state with the car kit may be performed in a lower level of quality than the communication state with the TV. In this case, the first electronic device is capable of: performing a video call by receiving voice signals, in real-time, and the video at a certain interval, from the car kit; or performing a video call, using only voice.

Although the embodiment is described in such a way that the size of an icon representing a specified electronic device is adjusted based on levels of video call quality, it should be understood that the present disclosure is not limited to the embodiment. The size of an icon representing a specified electronic device may also be adjusted based on a user's use history, a user's use pattern, context awareness information, etc. The icon representing a specified electronic device may be relocated to another location. For example, the icon representing a specified electronic device may be displayed in a form arranged according to the size. The number of icons, types or attributes of electronic device to be displayed on the third electronic device may be set by the user.

In various embodiments of the present disclosure, when the third electronic device: receives a video call; ascertains the change from an electronic device to make a video call to another during a video call; or detects a user's input for changing an electronic device to make a call during a video call, it is capable of displaying electronic devices capable of performing a video call on the user interface.

In various embodiments of the present disclosure, the third electronic device is capable of analyzing: states of the displayed electronic devices capable of performing a video call; or the quality of networks with the displayed electronic devices capable of performing a video call. The third electronic device is capable of determining priority based on the analysis and displaying icons corresponding to electronic devices in different sizes based on the determined priority.

In various embodiments of the present disclosure, the third electronic device is capable of analyzing: the change in states (e.g., the change in battery level) of the displayed electronic devices capable of performing a video call; or the quality of networks with the displayed electronic devices capable of performing a video call, in real-time or at a certain time interval. The third electronic device is capable of adjusting icons corresponding to the electronic devices in size or display location, and displaying the adjusted icons.

Various embodiments of the present disclosure are capable of obtaining the network quality of each electronic device or status information regarding the electronic device, based on a certain time interval, an average of time intervals, or a threshold, and updating the size and/or location of each of the icons representing the electronic devices. Therefore, various embodiments of the present disclosure are capable of preventing the size of each of the icons representing the electronic devices from being changed suddenly.

Various embodiments of the present disclosure are capable of displaying icons representing electronic devices along with additional information, respectively. For example, the additional information may contain an owner (account subscriber) of an electronic device, a name set for an electronic device, authority information, etc.

Figure 20A:
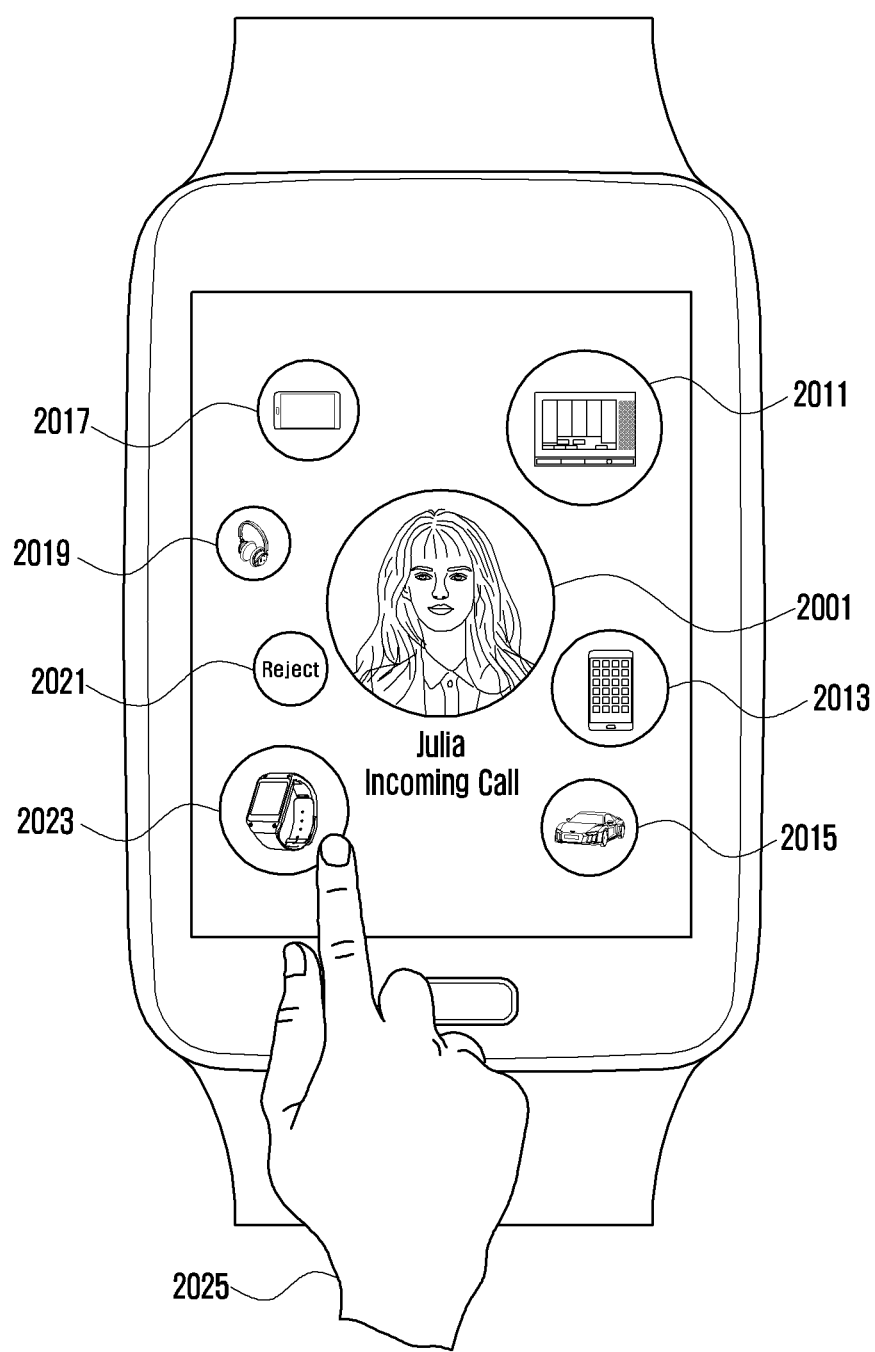
FIGS. 20A, 20B, 20C and 20D are diagrams illustrating an example user interface for receiving a video call according to various example embodiments of the present disclosure.
Figure 20B:
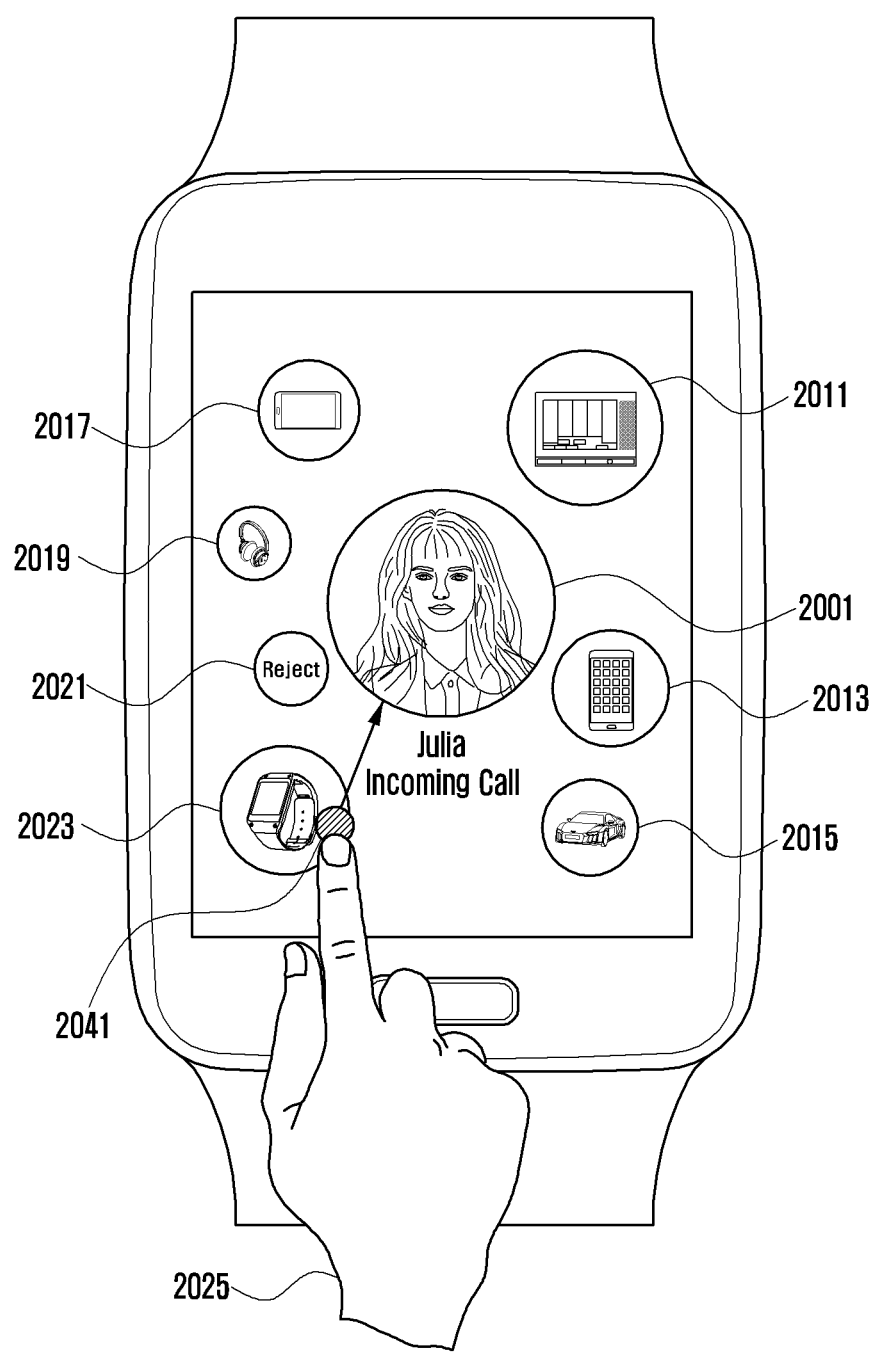
Figure 20C:
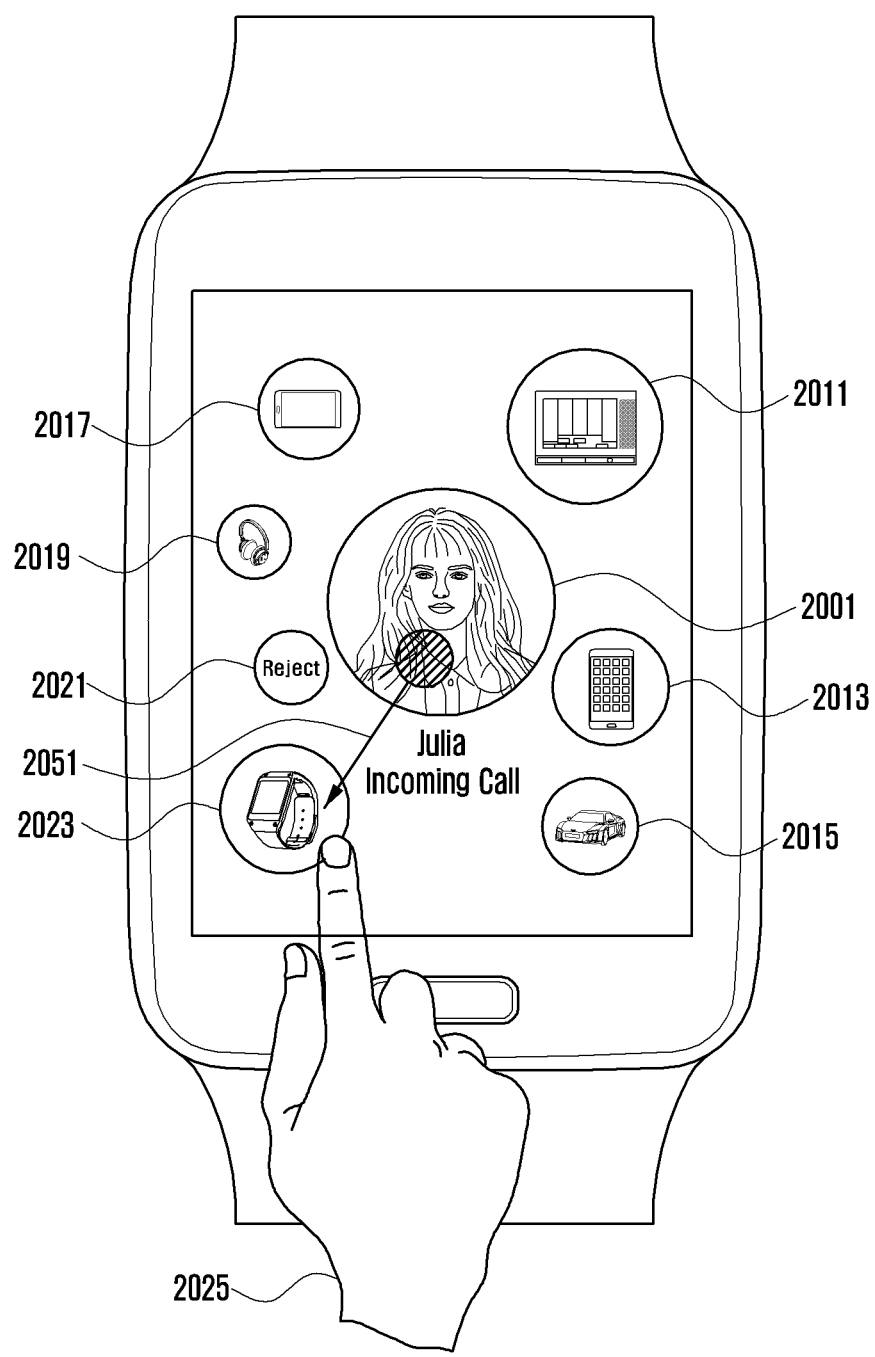

In various embodiments of the present disclosure, when the third electronic device receives an input for selecting a specified electronic device, it is capable of transmitting a video call connection signal to the selected, specified electronic device. For example, when the third electronic device detects an input 2025 for selecting a watch icon 2023 as illustrated in FIG. 20A, an input 2041 for dragging the watch icon 2023 into an originator display window or video call window 2001 as illustrated in FIG. 20B, or an input 2051 for dragging the watch icon 2023 into the originator display window or video call window 2001 as illustrated in FIG. 20C, it is capable of transmitting a video call connection signal to the watch.

Figure 20D:
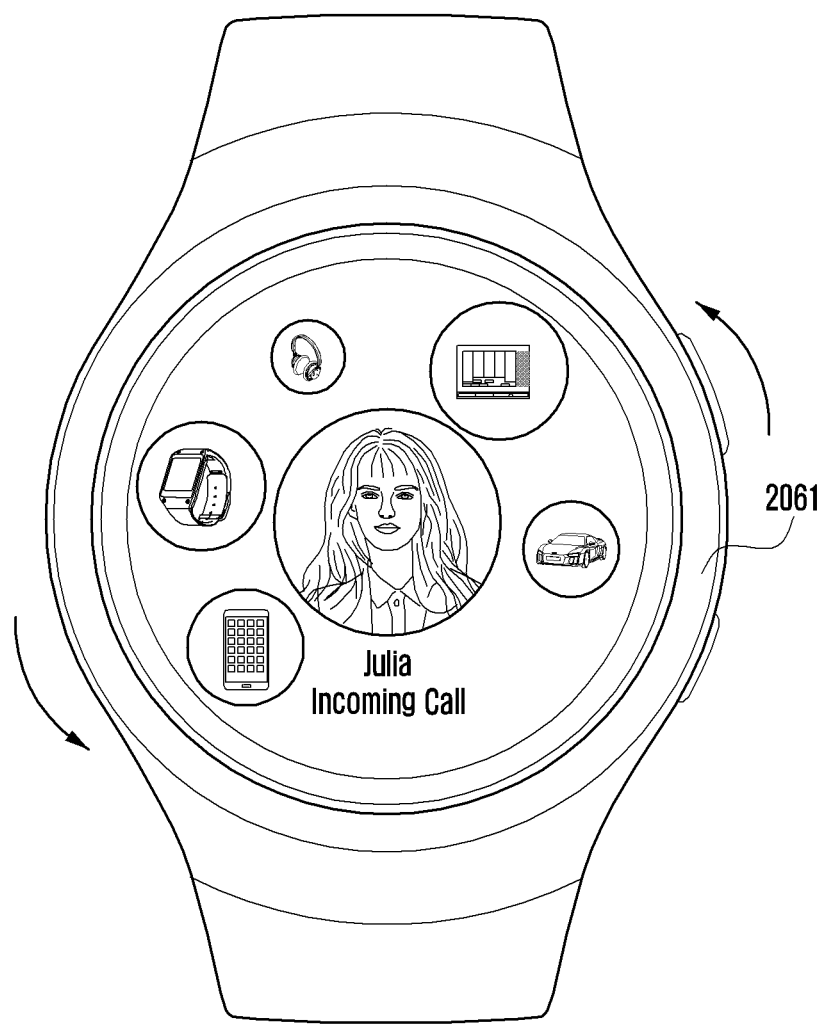

In various embodiments of the present disclosure, the third electronic device may be implemented with a watch without a stem. In this case, a video call is performed by selecting an icon representing the electronic device. Alternatively, the third electronic device may be implemented with a watch with a stem (not shown). In this case, a video call is performed by controlling the stem to select an icon representing the electronic device. Alternatively, the third electronic device may be implemented with a watch with a wheel shaped as a circle as illustrated in FIG. 20D. In this case, a video call is performed by rotating the wheel 2061 to select an icon representing the electronic device.

Figure 20E:
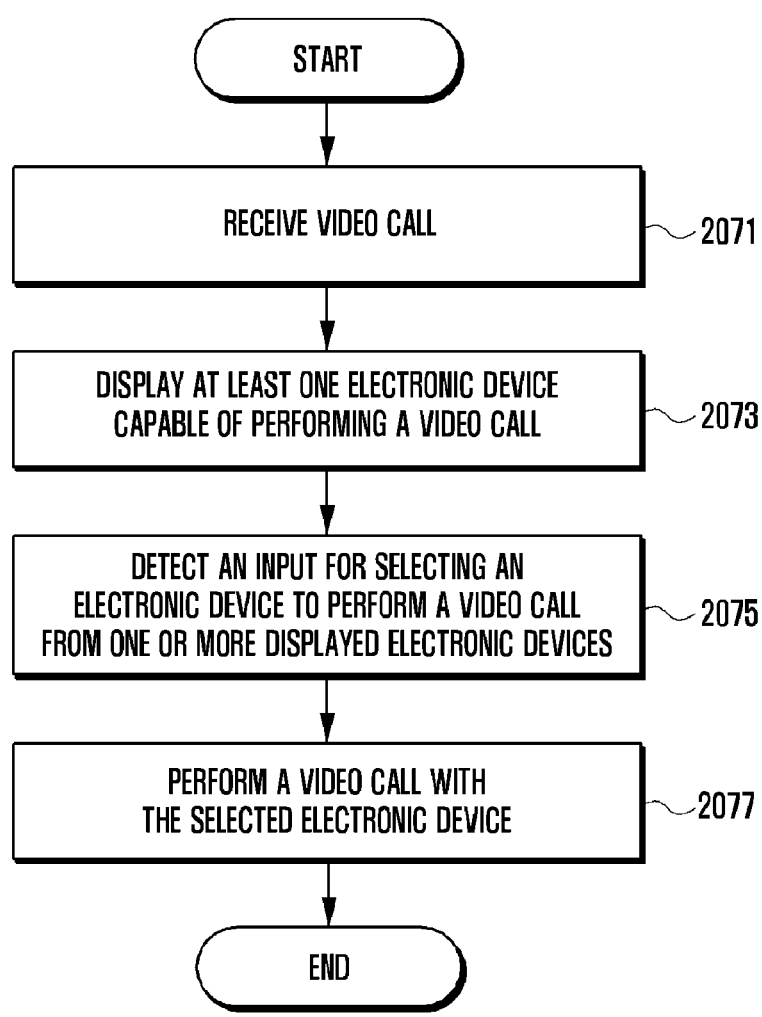
FIG. 20E is a flowchart illustrating an example method of performing a video call in a third electronic device according to various example embodiments of the present disclosure.

FIG. 20E is a flowchart illustrating an example method of performing a video call in a third electronic device according to various embodiments of the present disclosure.

With reference to FIG. 20E, a third electronic device is capable of receiving a video call in operation 2071.

In various embodiments of the present disclosure, when the third electronic device receives a video call, it may determine whether it is worn by the user.

In various embodiments of the present disclosure, the third electronic device is capable of determining whether it is worn by the user, via a sensor, e.g., a geomagnetic sensor, a gravity sensor, a heart-rate sensor, a temperature sensor, etc. For example, when the third electronic device is a watch, it is capable of determining whether it is worn by the user in such a way that a hall effect sensor detects whether the watch chains/straps are coupled.

In various embodiments of the present disclosure, when the third electronic device ascertains that it is worn by the user, it is capable of transmitting a sensor signal corresponding to the state of being worn to the second electronic device. The second electronic device does not display a notification based on the received sensor signal and transmits a control signal to the third electronic device so that the notification is displayed only on the third electronic device. Therefore, the second electronic device does not display a notification of an incoming video call on its display screen; however, the third electronic device directly performs a video call and displays the notification of an incoming video call on its display screen.

In various embodiments of the present disclosure, the third electronic device is capable of displaying notifications of an incoming video call, varying according to locations of the second electronic device. For example, when the second electronic device is in a living room, the third electronic device is capable of outputting a first notification sound to notify an incoming video call. When the second electronic device is in a bedroom, the third electronic device is capable of outputting a second notification sound to notify an incoming video call. When the second electronic device is in a dining room, the third electronic device is capable of outputting vibration to notify an incoming video call. When the second electronic device is near the entrance, the third electronic device is capable of turning the flash on/off to notify the reception of a video call request. In various embodiments of the present disclosure, the third electronic device is capable of obtaining a location of the second electronic device, via an indoor navigation using Wi-Fi, BLE, etc., or via a communication network, such as GPS, LTE, or 3G, etc.

In various embodiments of the present disclosure, when receiving a video call request, the third electronic device is capable of displaying additional information containing a location of the second electronic device, along with a notification indicating the video call request reception. For example, the third electronic device is capable of displaying a location of the second electronic device obtained from map information stored in the memory, along with a name of a location that the user has registered or an attribute and a name of a location stored in a server.

In various embodiments of the present disclosure, when receiving a video call request, the third electronic device is capable of displaying an arrow mark indicating a location of the second electronic device, along with a notification of the video call request reception. For example, the third electronic device is capable of displaying map information, direction information, information regarding a distance from the third electronic device to the second electronic device, and an estimated period of time to reach the second electronic device based on the distance. The distance information may be displayed in various forms, such as number, color, icon, etc.

In various embodiments of the present disclosure, the third electronic device is capable of displaying at least one electronic device capable of performing a video call in operation 2073. The third electronic device is capable of displaying: the third electronic device or an electronic device connected to the third electronic device; an electronic device registered in or connected to the second electronic device; and an electronic device which is not registered in the second or third electronic device but is connectable to the second electronic device.

In various embodiments of the present disclosure, the third electronic device is capable of displaying at least one electronic device using icons. The size of an icon may be determined based on video call quality level (e.g., a state of an electronic device, such as a battery level or a network state), a user's use history, a user's use pattern, context awareness information, etc. For example, the third electronic device is capable of setting an icon of an electronic device whose video call quality level is relatively high to be larger in size than a preset size. The third electronic device is also capable of analyzing a user's use history or a user's use pattern, and setting an icon of an electronic device with which the user has frequently performed a video call to be larger in size than a preset size. In contrast, the third electronic device is capable of setting an icon of an electronic device whose video call quality level is relatively low to be smaller in size than a preset size. The third electronic device is also capable of analyzing a user's use history or a user's use pattern, and setting an icon of an electronic device with which the user has not frequently performed a video call to be smaller in size than a preset size.

In various embodiments of the present disclosure, the third electronic device is capable of detecting an input for selecting an electronic device to perform a video call from one or more displayed electronic devices in operation 2075. The third electronic device is capable of transmitting a video call signal to the selected electronic device in operation 2077. For example, as described above with reference to FIGS. 20A to 20C, the third electronic device is capable of selecting an electronic device to perform a video call, by detecting: a touch input applied to an electronic device to perform a video call; an input for dragging an icon representing an electronic device to perform a video call to an originator display window or video call window; or an input for dragging an originator display window or video call window to an icon representing an electronic device to perform a video call.

In various embodiments of the present disclosure, the third electronic device may be implemented with a watch without a stem. In this case, a video call is performed by selecting an icon representing the electronic device. Alternatively, the third electronic device may be implemented with a watch with a stem (not shown). In this case, a video call is performed by controlling the stem to select an icon representing the electronic device. Alternatively, the third electronic device may be implemented with a watch with a wheel shaped as a circle. In this case, a video call is performed by rotating the wheel to select an icon representing the electronic device.

Figure 21A:
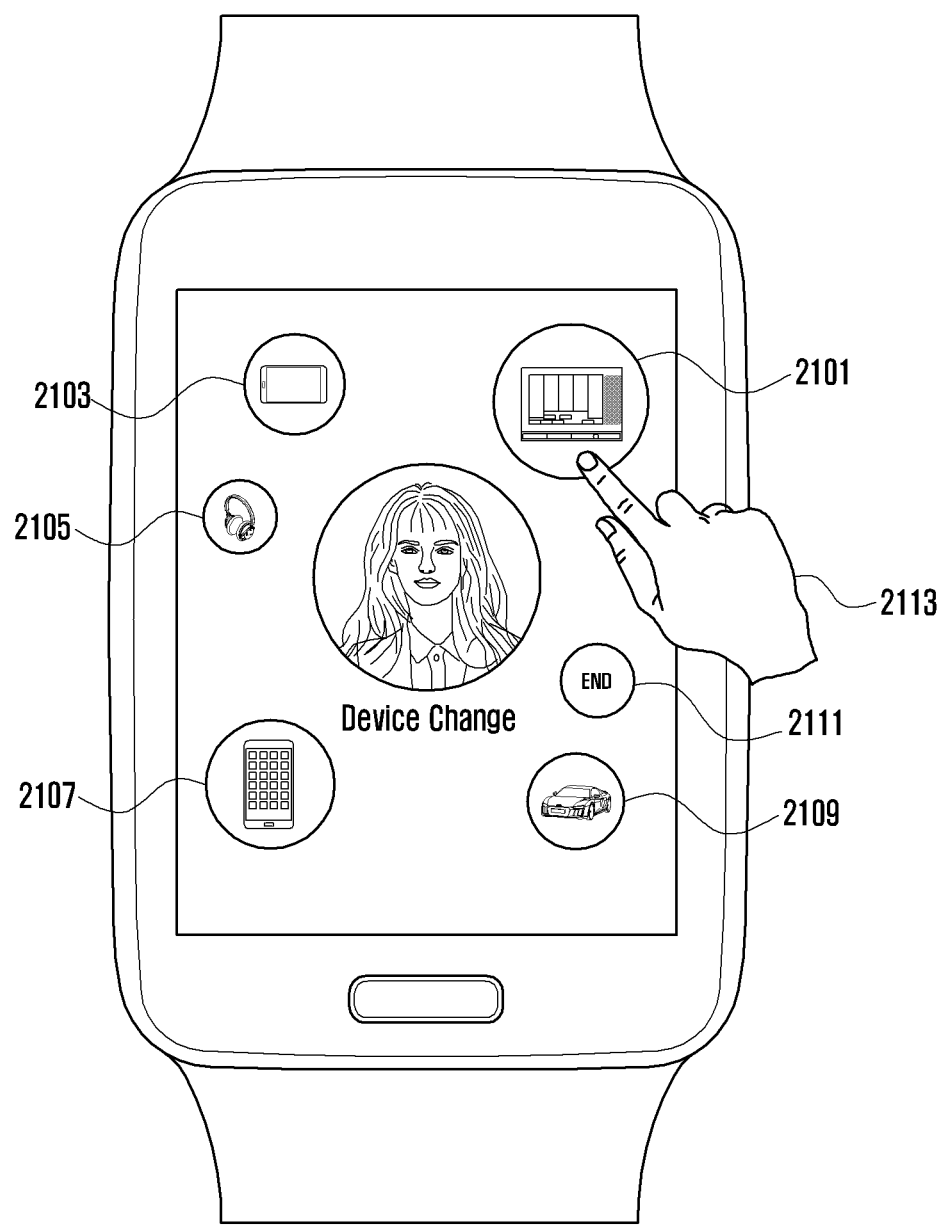
FIGS. 21A and 21B are diagrams illustrating an example user interface depending on pressure levels of the user input according to various example embodiments of the present disclosure.
Figure 21B:
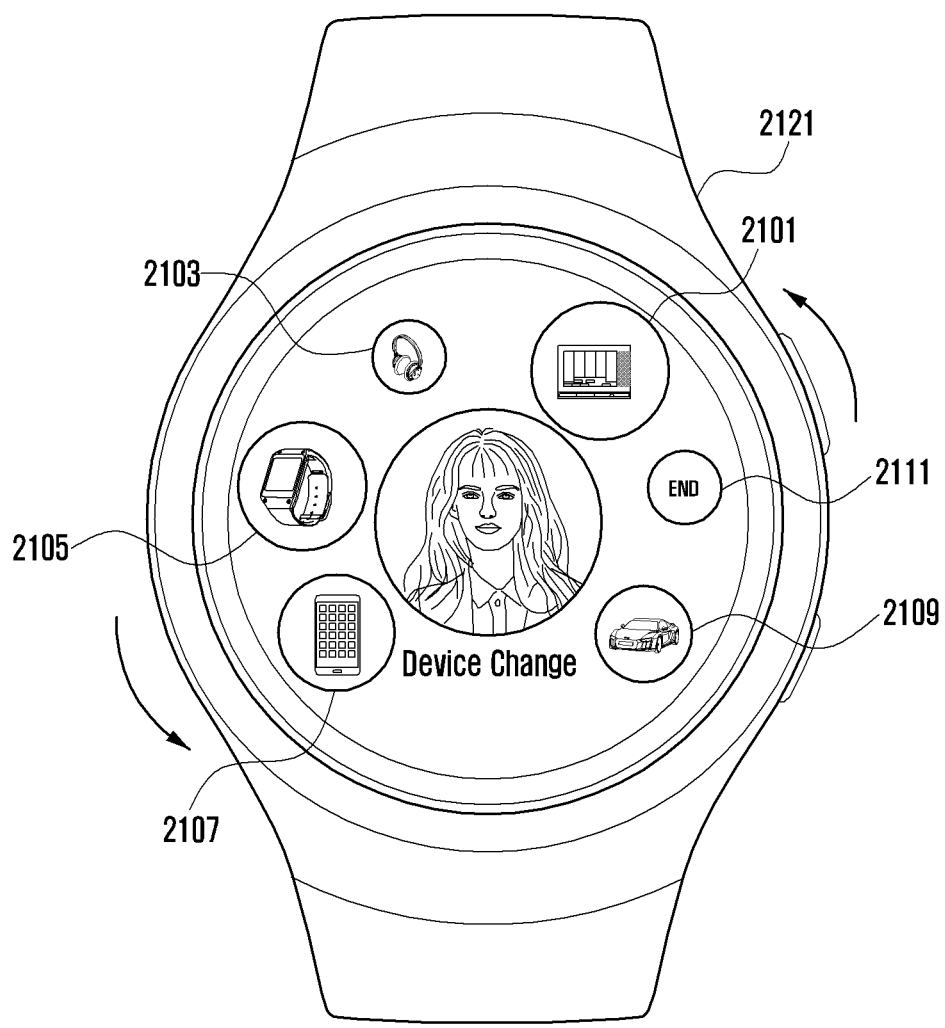

FIGS. 21A and 21B are diagrams illustrating an example user interface depending on pressure levels of the user input according to various example embodiments of the present disclosure.

With reference to FIGS. 21A and 21B, when the third electronic device (e.g., the third electronic device 405 illustrated in FIG. 4, the third electronic device 605 illustrated in FIG. 6, the third electronic device 705 illustrated in FIG. 7, the third electronic device 805 illustrated in FIG. 8, the third electronic device 905 illustrated in FIG. 9, the third electronic device 1413 illustrated in FIG. 14A, the third electronic device 1505 illustrated in FIG. 15, the third electronic device 1705 illustrated in FIG. 17A or 17B) detects an input for switching a video call, it is capable of arranging icons of at least one electronic device, to which it can switch a video call, to meet its shape. Examples of the cons of at least one electronic device are an icon 2101 representing a TV, an icon 2103 representing a tablet PC, an icon 2105 representing a headset, an icon 2107 representing a smartphone, an icon 2109 representing a car kit, and an icon 2111 representing video call end.

In various embodiments of the present disclosure, the third electronic device is capable of performing different functions according to pressure levels of the user input selecting an icon presenting a specified electronic device. For example, when the third electronic device detects a touch input of pressure level 1, it is capable of switching a video call to a specified electronic device on which the touch input of pressure level 1 is detected. When the third electronic device detects a touch input of pressure level 2, it is capable of transmitting a notification to a specified electronic device on which the touch input of pressure level 2 is detected. The notification allows the user to intuitively identify a specified electronic device to which a video call is switched.

For example, when the third electronic device detects a touch input 2113 of pressure level 2 applied to a TV icon 2101 of the displayed icons, it is capable of transmitting a notification to the TV corresponding to the TV icon 2101. Based on the received notification, the TV is capable of: controlling the TV screen to blink; displaying a specified image pattern on at least part of the TV screen; and displaying information regarding the user, e.g., user account information or information regarding the third electronic device on at least part of the TV screen. Alternatively, when the third electronic device detects a touch input 2113 of pressure level 2 applied to a TV icon 2101 of the displayed icons, it is capable of changing a user interface, using "device change," and displaying the user interface, as illustrated in FIGS. 21A and 21B.

Various embodiments of the present disclosure display a screen illustrated ion the TV and a screen illustrated on the display of the third electronic device, temporarily matching the screens with each other, so that the user can intuitively identify the electronic device to which a video call signal is transmitted, before connecting the video call.

In various embodiments of the present disclosure, the third electronic device is capable of temporarily displaying an icon representing an electronic device to which a video call will be switched, by an altering function, on a screen showing icons representing electronic devices to which a video call can be switched. Alternatively, the third electronic device is capable of temporarily displaying an icon representing an electronic device to which a video call will be switched, by an altering function, at a location displaying an originator's information.

In various embodiments of the present disclosure, when the third electronic device detects a touch input of pressure level 3, it is capable of displaying details of the electronic device on which the touch input of pressure level 3 is detected. For example, the third electronic device is capable of displaying details related to attributes of the electronic device on which the touch input is detected and network connection attributes.

Figure 21C:
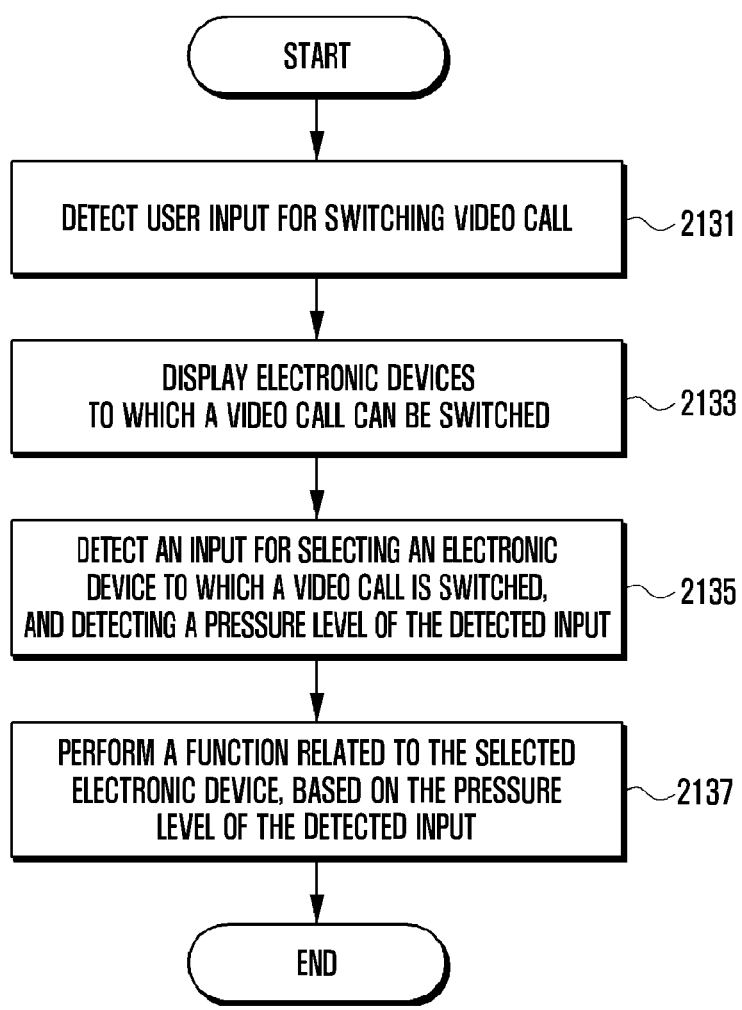
FIG. 21C is a flowchart illustrating example functions depending on pressure levels of the user input according to various example embodiments of the present disclosure.

FIG. 21C is a flowchart illustrating example functions depending on pressure levels of the user input according to various example embodiments of the present disclosure.

With reference to FIG. 21C, when the third electronic device detects an input for switching a video call in operation 2131, it is capable of displaying at least one electronic device to which a video call can be switched in operation 2133.

The third electronic device is capable of detecting an input for selecting an electronic device to which a video call is switched from at least one displayed electronic device, and detecting a pressure level of the detected input in operation 2135. The third electronic device is capable of performing a function related to the selected electronic device, based on the pressure level of the detected input in operation 2137.

For example, when the third electronic device detects a touch input of pressure level 1, it is capable of switching a video call to the electronic device on which the touch input of pressure level 1 is detected. When third electronic device detects a touch input of pressure level 2, it is capable of transmitting a notification to the electronic device on which the touch input of pressure level 2 is detected, so that the electronic device can output the notification. When the third electronic device 405 detects a touch input of pressure level 3, it is capable of displaying attribute information regarding the electronic device on which the touch input of pressure level 3 is detected, for example, information regarding the electronic device on which the touch input is detected or network information.

Figure 21D:
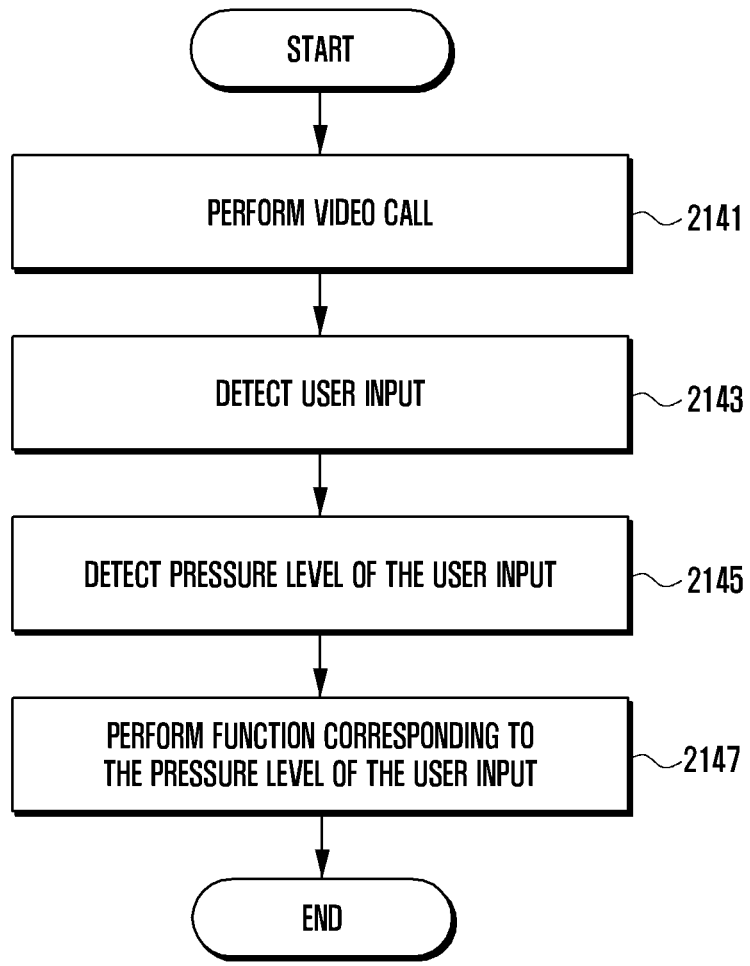
FIG. 21D is a flowchart illustrating example functions depending on pressure levels of the user input according to various example embodiments of the present disclosure.

FIG. 21D is a flowchart illustrating example functions depending on pressure levels of the user input according to various example embodiments of the present disclosure.

In various embodiments of the present disclosure, the third electronic device is capable of performing different functions according to detected user inputs and pressure levels of the detected user input.

In various embodiments of the present disclosure, the third electronic device is capable of recognizing objects of video data, based on locations where a user input is detected, and adjusting at least one of the following: resolution, focus, and exposure, according to pressure levels applied to a corresponding object.

In various embodiments of the present disclosure, the third electronic device is capable of displaying different user interfaces, based on at least one of the following: a user input, a duration of the user input, an area of the user input (e.g., an area of a user's finger), and a level of hovering input (e.g., an input tool, such as a user's finger, a stylus, etc., or a distance between the input tool to the touchscreen).

With reference to FIG. 21D, the third electronic device is capable of performing a video call in operation 2141. The third electronic device is capable of detecting a user input in operation 2143. The third electronic device is capable of obtaining a pressure level of the detected user input in operation 2145. The third electronic device is capable of performing a function corresponding to the pressure level of the user input in operation 2147.

For example, when the third electronic device detects a user input on part of the region of display during a video call, it is capable of displaying a video call menu. When the third electronic device detects a user input of pressure level 1, it is capable of displaying a user interface for changing a resolution of video data. When the third electronic device detects a user input of pressure level 2, it is capable of displaying a user interface for switching a video call. When the third electronic device detects a user input of pressure level 3, it is capable of displaying a user interface for altering picture quality of video data.

In various embodiments of the present disclosure, when the third electronic device detects a user input of pressure level 1 on at least part of the region of a video displayed on the screen, it is capable of capturing and storing the video data as still images during a specified time interval or a key frame interval while the user input is maintained in pressure level 1. When the third electronic device detects a user input of pressure level 2 on at least part of the region of a video displayed on the screen, it is capable of storing the video data as a moving image (video) while the user input is maintained in pressure level 2.

In various embodiments of the present disclosure, the third electronic device is capable of displaying at least part of the image or moving image (video), stored according to the user input of pressure level 2, on at least part of the display screen, for a preset period of time. For example, the third electronic device is capable of displaying an image, stored in response to the user input of pressure level 2, on at least part of the display screen showing video data, e.g., a snap-shot of a certain size on the bottom of the screen. Alternatively, the third electronic device is capable of displaying an icon, indicating that a moving image (video) is being recorded in response to the user input of pressure level 2, on at least part of the display screen. Therefore, various embodiments of the present disclosure allow the user to intuitively recognize that an image or a moving image (video) is being stored (or recorded), via an icon indicating the state of a snap-shot or recording.

In various embodiments of the present disclosure, when third electronic device detects a user input of pressure level 1 on part of the region of a video being displayed, it is capable of requesting a video of high-resolution, corresponding to a video when the user input of pressure level 1 is detected, from the first electronic device (e.g., the first electronic device 401 illustrated in FIG. 4, the first electronic device 601 illustrated in FIG. 6, the first electronic device 701 illustrated in FIG. 7, the first electronic device 801 illustrated in FIG. 8, the first electronic device 901 illustrated in FIG. 9, the first electronic device 1401 illustrated in FIG. 14A, the first electronic device 1701 illustrated in FIG. 17A or 17B) or the second electronic device (e.g., the second electronic device 403 illustrated in FIG. 4, the second electronic device 603 illustrated in FIG. 6, the second electronic device 703 illustrated in FIG. 7, the second electronic device 803 illustrated in FIG. 8, the second electronic device 903 illustrated in FIG. 9, the second electronic device 1123 illustrated in FIG. 11, the second electronic device 1215 illustrated in FIG. 12, the second electronic device 1703 illustrated in FIG. 17A or 17B). When the third electronic device (e.g., the third electronic device 405 illustrated in FIG. 4, the third electronic device 605 illustrated in FIG. 6, the third electronic device 705 illustrated in FIG. 7, the third electronic device 805 illustrated in FIG. 8, the third electronic device 905 illustrated in FIG. 9, the third electronic device 1413 illustrated in FIG. 14A, the third electronic device 1505 illustrated in FIG. 15, the second electronic device 1703 illustrated in FIG. 17A or 17B) detects a user input of pressure level 2 on part of the region of a video being displayed, it is capable of requesting the first or second electronic device to adjust the focus of the camera, with respect to the region where the user input of pressure level 2 is detected. When the third electronic device detects a user input of pressure level 3 on part of the region of a video being displayed, it is capable of requesting the first or second electronic device to adjust the exposure of the camera, with respect to the region where the user input of pressure level 3 is detected.

Although the embodiment is described in such a way as to perform different functions according to pressure levels of the user input, it should be understood that the present disclosure is not limited thereto. The embodiment may also be modified in such a way as to perform different functions according to directions in which the user input is detected, which is described in detail, below, with reference to FIG. 21E.

Figure 21E:
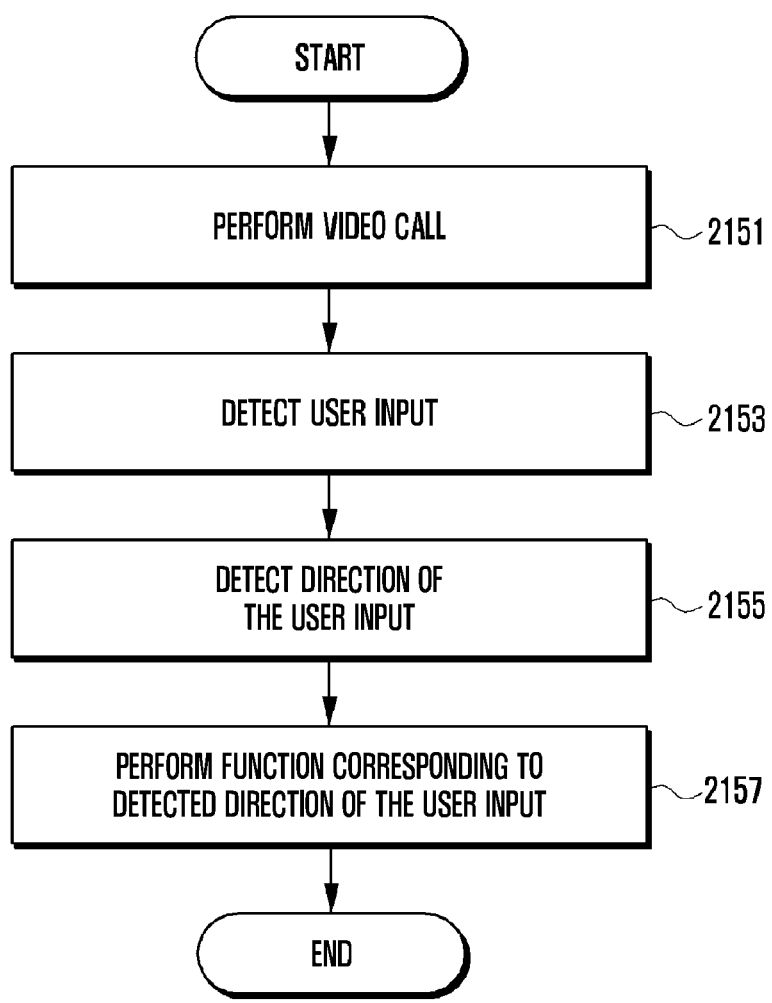
FIG. 21E is a flowchart illustrating example functions depending on directions in which a user input is detected, according to various example embodiments of the present disclosure.

FIG. 21E is a flowchart illustrating example functions depending on directions in which a user input is detected, according to various embodiments of the present disclosure.

In various embodiments of the present disclosure, the third electronic device is capable of performing different functions according to directions in which a user input is detected.

With reference to FIG. 21E, the third electronic device is capable of performing a video call in operation 2151. The third electronic device is capable of detecting a user input in operation 2153. In various embodiments of the present disclosure, the user input may include swipe input and/or drag input. The third electronic device is capable of identifying a direction of the detected user input in operation 2155, and performing a function corresponding to the direction of the detected user input in operation 2157.

In various embodiments of the present disclosure with reference to FIG. 21E, it is assumed that the user input is a swipe action. When the third electronic device detects a user input, e.g., swipe, on at least part of the display screen during a video call, it is capable of displaying a menu related to video call. The third electronic device is capable of analyzing a direction in which the swipe is detected. The swipe action may be performed from left-to-right, from right to left, from top to bottom, and from bottom to top.

For example, when the third electronic device detects a swipe action from left to right, it is capable of displaying a user interface for altering resolution of video data. When the third electronic device detects a swipe action from right to left, it is capable of displaying a user interface for switching a video call. When the third electronic device detects a swipe action from top to bottom, it is capable of displaying a user interface for changing picture quality of video data. It should be understood that the present disclosure is not limited to the functions according to the swipe actions. The resolution, focus and exposure of a video may also be adjusted according to directions of the swipe.

As described above, various embodiments of the present disclosure are capable of displaying different user interfaces or performing different functions, based on at least one of the following: a user input, a duration of the user input, a hovering level, a pressure level of the user input, and a direction in which the user input is detected. various embodiments are also capable of: mapping a displayed user interface, based on at least one of the following: a user input, a duration of the user input, a level of hovering input (e.g., a distance between an input tool (e.g., a user's finger or a stylus) and a touchscreen), a pressure level of the user input, and a direction in which the user input is detected; and storing the mapping result in the memory.

FIG. 22A are diagrams illustrating an example user interface including an indicator indicating the quality of video call according to various example embodiments of the present disclosure.

With reference to diagram 2201 of FIG. 22A, the third electronic device (e.g., the third electronic device 405 illustrated in FIG. 4, the third electronic device 605 illustrated in FIG. 6, the third electronic device 705 illustrated in FIG. 7, the third electronic device 805 illustrated in FIG. 8, the third electronic device 905 illustrated in FIG. 9, the third electronic device 1413 illustrated in FIG. 14A, the third electronic device 1505 illustrated in FIG. 15, the second electronic device 1703 illustrated in FIG. 17A or 17B) is capable of displaying video data 2209 and an indicator 2211 indicating the video call quality during a video call. As illustrated in diagram 2203, the third electronic device is also capable of displaying video data 2209, an indicator 2211 indicating the video call quality, and a button 213 for lowering down the resolution (quality) of video data.

As illustrated in diagram 2205, the third electronic device is capable of displaying video data 2209 and the video call quality determined based on its information and the network state, and showing a user interface including an indicator 2215 for controlling the video call quality. For example, the indicator 2215 may include a maximum of available video call quality 2221, determined based on a network state and information regarding the third electronic device, and the video call quality 2223 currently in use. The user may intuitively adjust a level of video call quality on the indicator 2215, using a slide control 2223.

For example, the indicator 2215 indicates a maximum of available video call quality 2221 and the video call quality 2223 currently in use. When the third electronic device detects an input 2225 (e.g., an input for selecting and dragging a video call quality region in the right or left) for adjusting video call quality on the indicator 2215, it is capable of adjusting the video call quality. The third electronic device is capable of determining an encoding scheme corresponding to the adjusted video call quality. The third electronic device is capable of transmitting the determined encoding scheme to the first electronic device (e.g., the first electronic device 401 illustrated in FIG. 4, the first electronic device 601 illustrated in FIG. 6, the first electronic device 701 illustrated in FIG. 7, the first electronic device 801 illustrated in FIG. 8, the first electronic device 901 illustrated in FIG. 9, the first electronic device 1401 illustrated in FIG. 14A, the first electronic device 1701 illustrated in FIG. 17A or 17B). The first or second electronic device is capable of encoding video data based on the encoding scheme and transmitting the encoded video data to the third electronic device. The third electronic device is capable of reproducing the received, encoded video data.

As illustrated in diagram 2207, when the indicator 2231 is shaded near the left end in the left region with respect to a criterion 2230, it indicates that the video call quality is relatively low. When the indicator 2233 is shaded in the left region from the left end up to the criterion 2230, it indicates that the video call quality is intermediate. When the indicator 2235 is shaded, extending from the left end to the right region with respect to the criterion 2230, it indicates that the video call quality is relatively high.

Although the embodiment is described in such a way that the video call quality is adjusted by controlling the indicator, it should be understood that the present disclosure is not limited thereto. For example, when the third electronic device is a watch which is equipped with a stem (not shown) or a wheel (not shown), the video call quality is adjusted via the rotation of the stem or wheel, a voice input, a gesture input, or a combination thereof.

For example, when battery power consumption needs to be reduced or multi-tasking process needs for other tasks, various embodiments allow the user to minimize the level of video call quality. Therefore, various embodiments of the present disclosure are capable of adjusting the level of video call quality according to a use's conditions, thereby providing the user with a relatively high degree of video call service satisfaction.

In various embodiments of the present disclosure, when the third electronic device receives and displays video data for video call, it is capable of displaying information regarding the video call quality such as a video data resolution, a frame rate (fps), etc., along with the video data. When the third electronic device detects an input for adjusting the indicator, it is capable of displaying information regarding the video call quality corresponding to the adjusted level of indicator. Since various embodiments of the present disclosure display video data for video call along with information regarding the video call quality, the user may intuitively recognize information regarding the currently displayed video data or information regarding the video data according to the adjusted indicator.

Figure 22B:
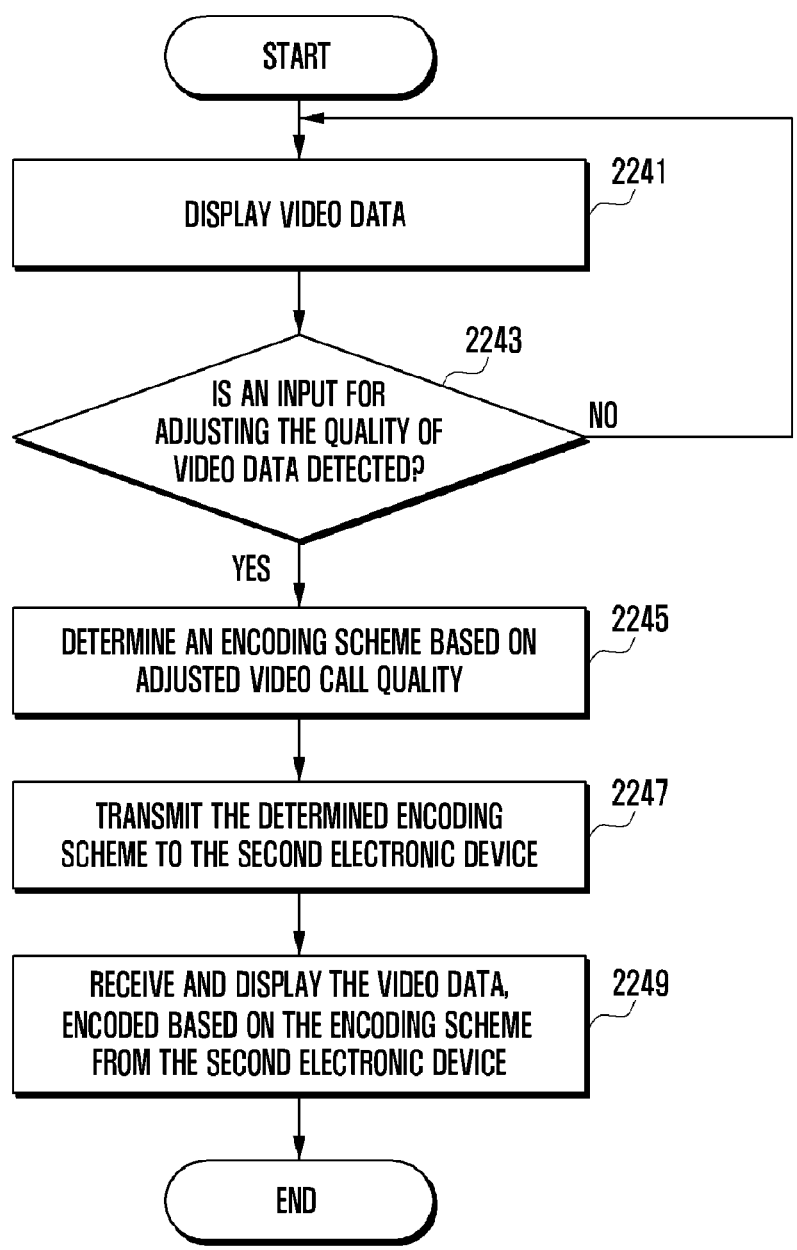
FIG. 22B is a flowchart illustrating an example method of adjusting the quality of video call according to various example embodiments of the present disclosure.

FIG. 22B is a flowchart illustrating an example method of adjusting the quality of video call according to various example embodiments of the present disclosure.

With reference to FIG. 22B, while the third electronic device displays video data for video call in operation 2241, it is capable of determining whether an input for adjusting the quality of video data is detected in operation 2243.

In various embodiments of the present disclosure, the third electronic device is capable of displaying video data for video call and an indicator for adjusting the quality of video data on part of the display unit. The indicator may include the current quality of video data a maximum available quality of video data determined based on a state of the third electronic device or a network state.

When the third electronic device has not detected an input for adjusting the quality of video data via the indicator in operation 2243, it returns to operation 2241 and displays video data.

On the other hand, when the third electronic device detects an input for adjusting the quality of video data via the indicator in operation 2243, it is capable of determining an encoding scheme based on the adjusted video call quality in operation 2245, and transmitting the determined encoding scheme to the second electronic device in operation 2247.

When the embodiment is implemented in such a way that to encode video data in the second electronic device, the second electronic device is capable of encoding video data based on the encoding scheme, received from the third electronic device, and transmitting the encoded video data to the third electronic device. Alternatively, when the embodiment is implemented in such a way that to encode video data in the first electronic device, the second electronic device is capable of transmitting the encoding scheme, received from the third electronic device, to the first electronic device. In this case, the second electronic device receives, from the first electronic device, the video data that the first electronic device encoded based on the encoding scheme, and forwards the received encoded video data to the third electronic device.

The third electronic device is capable of receiving the video data, encoded based on the encoding scheme, from the second electronic device, and displaying the received video data in operation 2249.

Figure 23A:
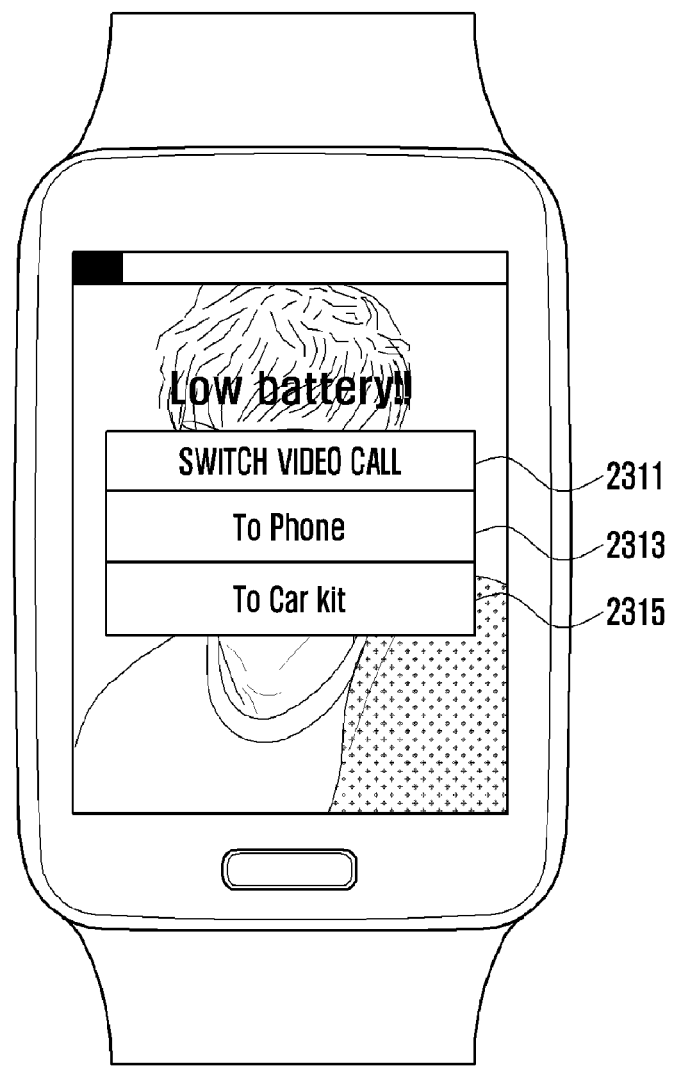
FIGS. 23A and 23B are diagrams illustrating an example user interface for switching a video call device according to various example embodiments of the present disclosure.
Figure 23B:
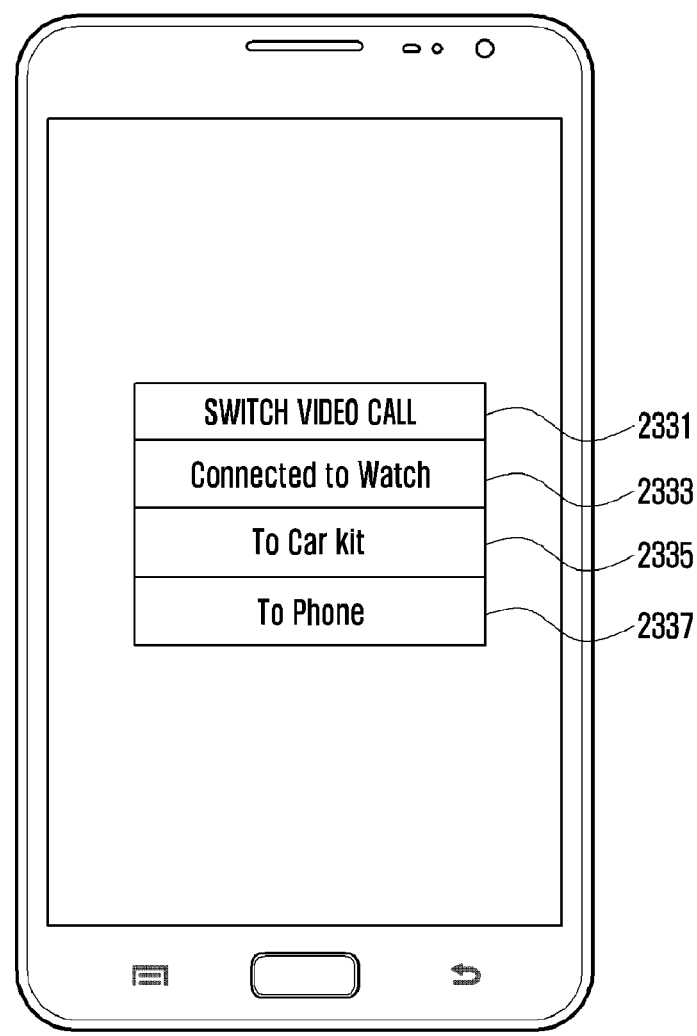

FIGS. 23A and 23B are diagrams illustrating an example user interface for switching a video call according to various embodiments of the present disclosure.

In various embodiments of the present disclosure, when the third electronic device (e.g., the third electronic device 405 illustrated in FIG. 4, the third electronic device 605 illustrated in FIG. 6, the third electronic device 705 illustrated in FIG. 7, the third electronic device 805 illustrated in FIG. 8, the third electronic device 905 illustrated in FIG. 9, the third electronic device 1413 illustrated in FIG. 14A, the third electronic device 1505 illustrated in FIG. 15, the third electronic device 1705 illustrated in FIG. 17A or 17B) moves or is affected by external interference signals during a video call, it is capable of detecting the change in a state of a second network (e.g., the second network 413 illustrated in FIG. 4, or the second network 1531 illustrated in FIG. 15). The third electronic device is also capable of detecting: the change in battery status during a video call, shortage of memory capacity due to multi-tasking, and insufficiency of processing power in the third electronic device; the quality degradation of the first network (e.g., the first network 411 illustrated in FIG. 4, or the first network 1523 illustrated in FIG. 15) connecting the first electronic device (e.g., the first electronic device 401 illustrated in FIG. 4, the first electronic device 601 illustrated in FIG. 6, the first electronic device 701 illustrated in FIG. 7, the first electronic device 801 illustrated in FIG. 8, the first electronic device 901 illustrated in FIG. 9, the first electronic device 1401 illustrated in FIG. 14A, the first electronic device 1701 illustrated in FIG. 17A or 17B) and the second electronic device (e.g., the second electronic device 403 illustrated in FIG. 4, the second electronic device 603 illustrated in FIG. 6, the second electronic device 703 illustrated in FIG. 7, the second electronic device 803 illustrated in FIG. 8, the second electronic device 903 illustrated in FIG. 9, the second electronic device 1123 illustrated in FIG. 11, the second electronic device 1215 illustrated in FIG. 12, the second electronic device 1703 illustrated in FIG. 17A or 17B); and the change in the video call quality during a video call, which is caused by to the change in battery level, short of memory capacity or insufficiency of processing power in the first or second electronic device.

In various embodiments of the present disclosure, when the third electronic device detects the change in the video call quality, it is capable of requesting the first or second electronic device performing an encoding operation to change its encoding scheme. The third electronic device is capable of: receiving, from the first or second electronic device, video data encoded based on an encoding scheme changed according to the encoding scheme change request; and reproducing the received video data.

In various embodiments of the present disclosure, when the third electronic device is in a state so that it cannot perform a video call, it is capable of switching the video call to a voice call. When the third electronic device is in a worse state so that it cannot perform a video call, it ends a call and switches a video call to the second electronic device or another electronic device connected to the second electronic device. When the video call is switched to a voice call or when the video call is switched to another electronic device connected to the second electronic device, the third electronic device is capable of informing the user of a video call switching notification, via a user interface (e.g., a pop-up message) for switching a video call to a voice call or another electronic device, a voice, or vibration.

In various embodiments of the present disclosure, the third electronic device is capable of: obtaining information regarding currently connectable electronic devices from the second electronic device; and displaying electronic devices to which a video call is switched, according to priority assigned, based on a user's use pattern, a state of each electronic device or network connection states.

In various embodiments of the present disclosure, when the third electronic device is in an environment not suitable for providing a video call service, it is capable of displaying a pop-up message including electronic devices to which it can be connected and switched, so that the user can select a corresponding one of the displayed electronic devices. For example, as illustrated in FIG. 23A, a pop-up message 2311 for switching a video call shows electronic devices connected to the second electronic device to which a video call can be switched, e.g., a smartphone 2313 and a car kit 2315. When the third electronic device detects an input for selecting one of the electronic devices illustrated in the pop-up message 2311, e.g., a smartphone 2313 or a car kit 2315, it is capable of transmitting a video call switching signal to the selected electronic device.

In various embodiments of the present disclosure, a video call switching operation is processed by the third electronic device performing a video call or the second electronic device. For example, when the third electronic device detects a signal changing the video call quality during a video call, the second electronic device is capable of displaying a pop-up message 2331 for a video call switching operation as illustrated in FIG. 23B. When the second electronic device detects an input for selecting one of the electronic devices, e.g., a watch 2333, a car kit 2335 and a phone 2337, illustrated in the pop-up message 2331, it is capable of transmitting a video call switching signal to the selected electronic device.

In various embodiments of the present disclosure, when the third electronic device has not detected an input for selecting an electronic device to which a video call is switched, it is capable of automatically selecting an optimal electronic device from among electronic devices to which a video call can be switched. The optimal electronic device may be selected, based on status information regarding each electronic device (e.g., battery level, process power, or memory status), a condition as to whether the user is currently using the electronic device, using network connection information, or previous connection information.

Figure 23C:
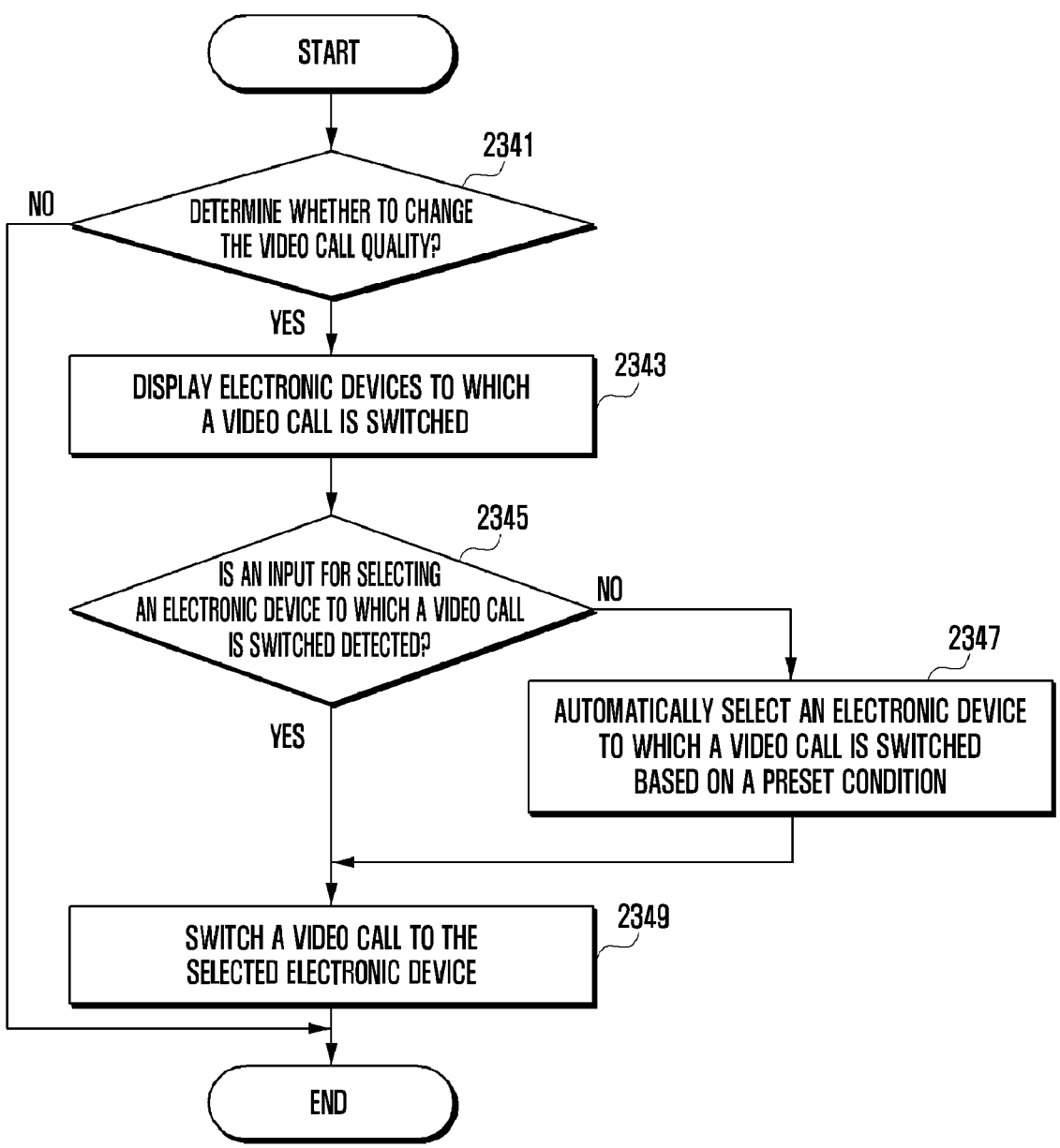
FIG. 23C is a flowchart illustrating an example method of switching a video call to a fourth electronic device according to various example embodiments of the present disclosure.

FIG. 23C is a flowchart illustrating an example method of switching a video call to a third electronic device according to various example embodiments of the present disclosure.

With reference to FIG. 23C, a third electronic device is capable of determining whether it detects a signal according to the change of the video call quality in operation 2341. For example, the third electronic device is capable of detecting a signal showing the change in the state of a second network, which is caused due to the location change or the presence of an external interference signals, during a video call. Alternatively, the third electronic device is capable of detecting a signal according to the change of the video call quality, which is caused by: the change in battery status, shortage of memory capacity, and insufficiency of processing power in the third electronic device; the quality degradation of the first network connecting the first and second electronic devices; and the change in battery level, short of memory capacity or insufficiency of processing power in the first or second electronic device.

When the third electronic device detects the signal according to the change of the video call quality in operation 2341, it is capable of displaying at least one electronic device to which a video call is switched in operation 2343. For example, as illustrated in FIG. 23A, the third electronic device is capable of displaying a pop-up message including at least one electronic device to which a video call can be switched.

The third electronic device is capable of determining whether an input for selecting an electronic device to which a video call is switched within a preset period of time is detected in operation 2345. When the third electronic device detects an input for selecting an electronic device to which a video call is switched within a preset period of time in operation 2345, it is capable of transmitting a signal for switching a video call to the selected electronic device in operation 2349. For example, when the third electronic device detects an input for selecting one of the electronic devices to which a video call is switched in a pop-up message, it is capable of transmitting a video call signal to the selected electronic device. Therefore, the first electronic device and the selected electronic device perform a video call to each other.

On the other hand, when the third electronic device has not detected an input for selecting an electronic device to which a video call is switched within a preset period of time in operation 2345, it is capable of automatically selecting an electronic device to which a video call is switched, based on a preset condition, in operation 2347, and transmitting a signal for switching a video call to the selected electronic device in operation 2349. In various embodiments of the present disclosure, the preset condition may be a state of at least one electronic device to which a video call can be switched and network status information. The third electronic device is capable of receiving priority, determined based on a state of at least one of the electronic devices to which a video call can be switched or network status information, from the second electronic device, and automatically switching a video call to an electronic device with high priority.

Although the embodiments are described in such a way as to: determine whether an input for selecting an electronic device to which a video call is switched is detected within a preset period of time; and switch a video call to the selected electronic device based on the determination, it should be understood that the present disclosure is not limited thereto. The embodiments may also display a pop-up window showing an option as to whether an electronic device to which a video call is switched is selected automatically or according to a user input. When the electronic device determines to select an electronic device to which a video call is switched, according to a user input, via the displayed pop-up window, it is capable of performing operations 2345 and 2349 illustrated in FIG. 23C. When the electronic device determines to select an electronic device to which a video call is switched, automatically, on the displayed pop-up window, it is capable of performing operations 2347 and 2349 illustrated in FIG. 23C.

Figure 24:
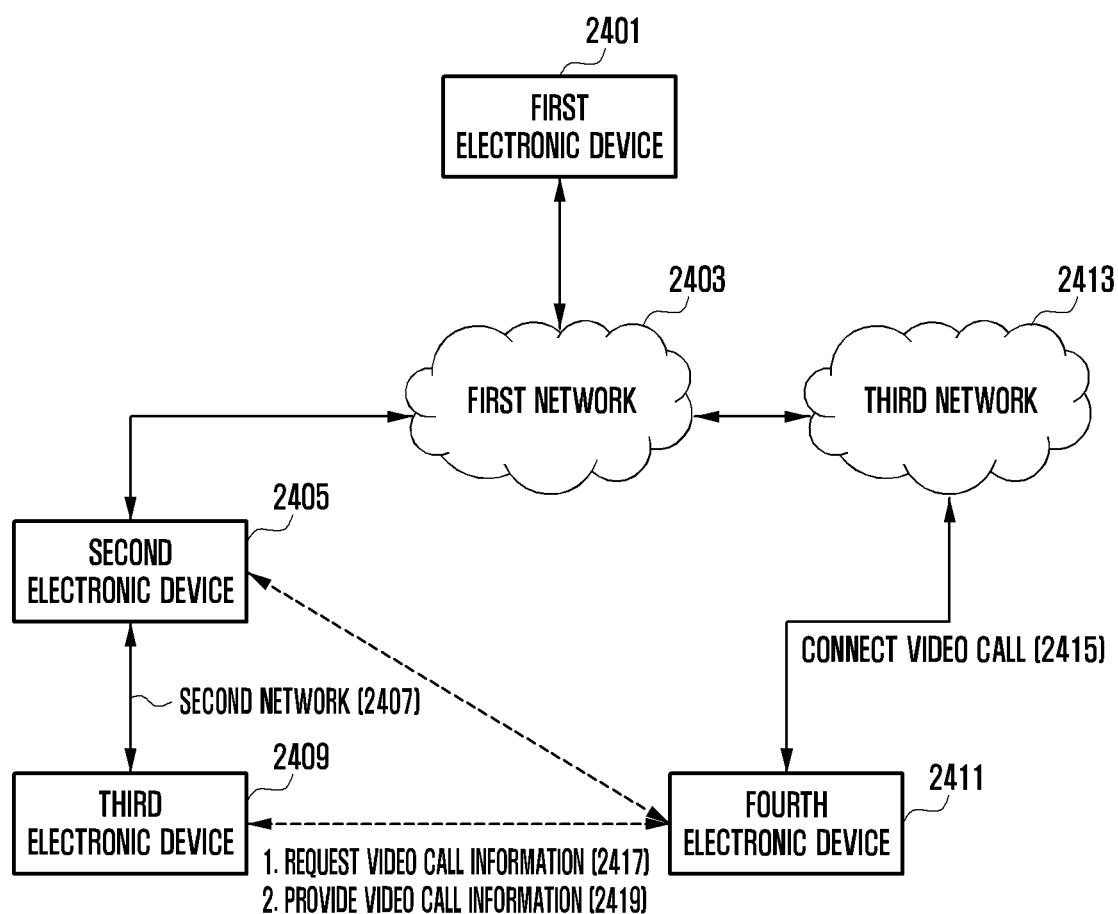
FIG. 24 is a diagram illustrating example operations of switching a video call to a fourth electronic device according to various example embodiments of the present disclosure.

FIG. 24 is a diagram illustrating example operations of switching a video call to a fourth electronic device according to various example embodiments of the present disclosure.

With reference to FIG. 24, various embodiments of the present disclosure are capable of switching a video call currently in service to a standalone device with an access function to a standalone network, e.g., a fourth electronic device 2411.

In various embodiments of the present disclosure, the first electronic device 2401 (e.g., the first electronic device 401 illustrated in FIG. 4, the first electronic device 601 illustrated in FIG. 6, the first electronic device 701 illustrated in FIG. 7, the first electronic device 801 illustrated in FIG. 8, the first electronic device 901 illustrated in FIG. 9, the first electronic device 1401 illustrated in FIG. 14A, the first electronic device 1701 illustrated in FIG. 17A or 17B) and the second electronic device 2405 (e.g., the second electronic device 403 illustrated in FIG. 4, the second electronic device 603 illustrated in FIG. 6, the second electronic device 703 illustrated in FIG. 7, the second electronic device 803 illustrated in FIG. 8, the second electronic device 903 illustrated in FIG. 9, the second electronic device 1123 illustrated in FIG. 11, the second electronic device 1215 illustrated in FIG. 12, the second electronic device 1703 illustrated in FIG. 17A or 17B) are connected to each other via the first network 2403 (e.g., the first network 411 illustrated in FIG. 4, the first network 1523 illustrated in FIG. 15). The second electronic device 2405 and the third electronic device 2409 (e.g., the third electronic device 405 illustrated in FIG. 4, the third electronic device 605 illustrated in FIG. 6, the third electronic device 705 illustrated in FIG. 7, the third electronic device 805 illustrated in FIG. 8, the third electronic device 905 illustrated in FIG. 9, the third electronic device 1413 illustrated in FIG. 14A, the third electronic device 1505 illustrated in FIG. 15, the third electronic device 1705 illustrated in FIG. 17A or 17B) are connected to each other via the second network 2407 (e.g., the second network 413 illustrated in FIG. 4, or the second network 1531 illustrated in FIG. 15). In addition, a fourth electronic device 2411 is capable of connecting to an external network independently via a third network 2413, e.g., Wi-Fi, etc. Alternatively, the fourth electronic device 2411 is also capable of connecting to an external network via a wired network.

The fourth electronic device 2411 is a device which is connected to or registered in the second electronic device 2405. Alternatively, the fourth electronic device 2411 may be a new device which is not connected to or is not registered in the second electronic device 2405. The fourth electronic device 2411 may be devices for public use, such as a TV or a monitor installed in public places. The owner and the user of the second electronic device 2405 may differ from those of the fourth electronic device 2411.

The second electronic device 2405 or the third electronic device 2409, connected to the second electronic device 2405 via the second network 2407, is capable of requesting to switch a video call currently in service to the fourth electronic device 2411. The fourth electronic device 2411 is capable of requesting the second electronic device 2405 or the third electronic device 2409 to switch a video call. The fourth electronic device 2411 and the second electronic device 2405 or the third electronic device 2409 are capable of performing the transmission/reception of data for switching a video call to each other, as in operations 2417 and 2419. Examples of the data for switching a video call are IP information, MAC information, secure certification information, VPN configuration information, or electronic device identification information. For example, the fourth electronic device 2411 is capable of requesting the second electronic device 2405 or the third electronic device 2409 to switch a video call, via an NFC tagging, RFID, BLE, BT broadcasting, etc.

In various embodiments of the present disclosure, the third electronic device 2409 providing a video call service or the second electronic device 2405, connected to the third electronic device 2409 via the second network 2407, is capable of displaying an image pattern, QR code or encryption data, in order to switch a video call. The fourth electronic device 2411 is capable of obtaining video call information from the displayed image pattern, QR code or encryption data via an image sensor, and requesting the connection of a video call.

For example, when the fourth electronic device 2411 detects an input for selecting a menu for requesting to switch a video call, e.g., "video call connecting," it is capable of activating a camera and transmitting a pattern of brightness signals of an LED or LCD screen or a flash to the second electronic device 2405 or the third electronic device 2409. The second electronic device 2405 of the third electronic device 2409 is capable of temporarily displaying a specified image pattern for switching a video call on the display unit, based on the pattern of signals received from the fourth electronic device 2411. The fourth electronic device 2411 is capable of reading the specified image pattern via the image sensor and performing the transmission/reception of data for switching a video call, based on the specified image pattern.

In various embodiments of the present disclosure, the second electronic device 2405 or the third electronic device 2409 is capable of accepting a video call with the fourth electronic device 2411, before connecting to the fourth electronic device 2411 or transmitting data for switching a video call.

In various embodiments of the present disclosure, the fourth electronic device 2411 is capable of inserting information regarding the fourth electronic device 2411 into a specified ultrasonic or sonic wave pattern, and making a video call request to the second electronic device 2405 or the third electronic device 2409 via a speaker and a microphone or transmitting/receiving data for switching a video call to/from the second electronic device 2405 or the third electronic device 2409.

For example, the fourth electronic device 2411 is capable of inserting its information, e.g., type, MAC information, connection information, etc., into a specified ultrasonic or sonic wave pattern or a BLE signal, and transmitting the information to the second electronic device 2405 or the third electronic device 2409. The second electronic device 2405 or the third electronic device 2409 is capable of determining video call data to be transmitted to the fourth electronic device 2411, based on the received information regarding the fourth electronic device 2411, and displaying the video call data on the display unit. When the second electronic device 2405 or the third electronic device 2409 detects an input for selecting the determined video call data, it is capable of switching a video call to the fourth electronic device 2411.

In various embodiments of the present disclosure, the third electronic device 2409 is capable of discovering nearby electronic devices to be connectable via a video call during a video call connection waiting, and displaying the discovered electronic devices. The third electronic device 2409 is capable of selecting one of the displayed electronic devices to be connectable via a video call.

In various embodiments of the present disclosure, the third electronic device 2409 is capable of temporarily registering the fourth electronic device 2411 in an account server in the process of discovering and registering nearby electronic devices to be connectable via a video call.

Figure 25:
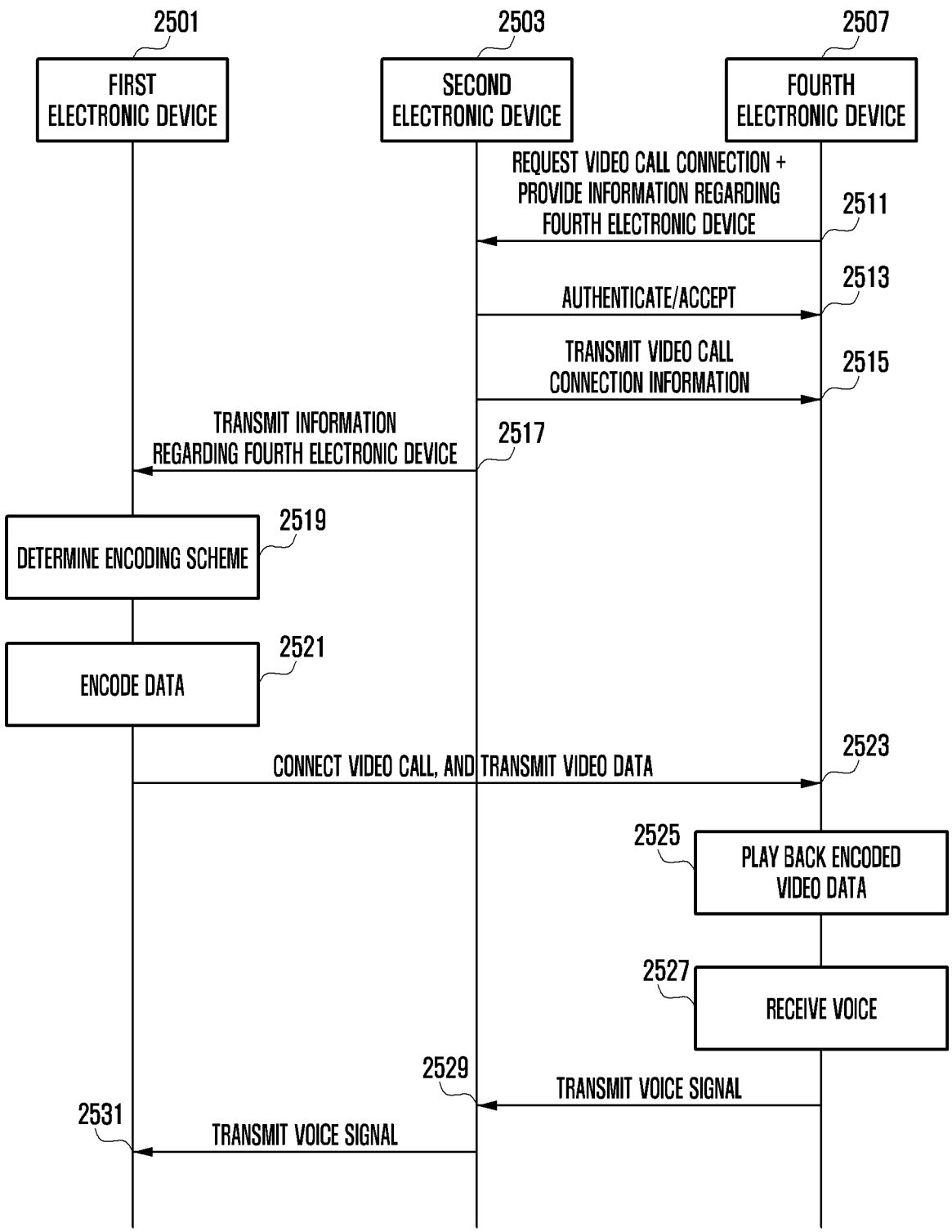
FIG. 25 is a signal flow diagram illustrating an example method of switching a video call to a fourth electronic device, flowing signals between first, second and fourth electronic devices, according to various example embodiments of the present disclosure.

FIG. 25 is a signal flow diagram illustrating an example method of switching a video call to a fourth electronic device, flowing signals between first, second and fourth electronic devices, according to various example embodiments of the present disclosure.

With reference to FIG. 25, a fourth electronic device 2507 (e.g., the fourth electronic device 2411 illustrated in FIG. 24) is capable of requesting a second electronic device 2503 (e.g., the second electronic device 403 illustrated in FIG. 4, the second electronic device 603 illustrated in FIG. 6, the second electronic device 703 illustrated in FIG. 7, the second electronic device 803 illustrated in FIG. 8, the second electronic device 903 illustrated in FIG. 9, the second electronic device 1123 illustrated in FIG. 11, the second electronic device 1215 illustrated in FIG. 12, the second electronic device 1703 illustrated in FIGS. 17A and 17B, or the second electronic device 2405 illustrated in FIG. 24) to switch a video call, and transmitting information regarding the fourth electronic device 2507 to the second electronic device 2503 in operation 2511. When the second electronic device 2503 receives information regarding the fourth electronic device 2507 and a video call switching request signal from the fourth electronic device 2507, it is capable of transmitting, to the fourth electronic device 2507, a signal for authenticating the fourth electronic device 2507 and a signal for accepting the video call switching request by the fourth electronic device 2507 in operation 2513. The second electronic device 2503 is capable of transmitting information regarding the video call connection with the first electronic device 2501 (e.g., the first electronic device 401 illustrated in FIG. 4, the first electronic device 601 illustrated in FIG. 6, the first electronic device 701 illustrated in FIG. 7, the first electronic device 801 illustrated in FIG. 8, the first electronic device 901 illustrated in FIG. 9, the first electronic device 1401 illustrated in FIG. 14A, the first electronic device 1701 illustrated in FIGS. 17A and 17B, or the first electronic device 2401 illustrated in FIG. 24) to the fourth electronic device 2507 in operation 2515. The second electronic device 2503 is capable of transmitting information regarding the fourth electronic device 2507 to the first electronic device 2501 in operation 2517. The first electronic device 2501 is capable of determining an encoding scheme, based on the information regarding the fourth electronic device 2507, in operation 2519, and encoding video data based on the encoding scheme in operation 2521. The first electronic device 2501 is capable of transmitting the encoded video data to the fourth electronic device 2507 and switching a video call to the fourth electronic device 2507 in operation 2523. The fourth electronic device 2507 is capable of reproducing the received, encoded video data in operation 2525. The fourth electronic device 2507 receives a voice using the microphone (e.g., the microphone 563) in operation 2527, and transmits the voice signal to the second electronic device 2503 in operation 2529. The second electronic device 2503 is capable of forwarding the received voice signal to the first electronic device 2501 in operation 2531. Therefore, the first electronic device 2501 and the fourth electronic device 2507 perform a video call with each other.

Although the embodiment is described in such a way that the second electronic device 2503 controls a video call switching to the fourth electronic device 2507, it should be understood that the present disclosure is not limited thereto. For example, although it is not shown in FIG. 25, a third electronic device (e.g., the third electronic device 405 illustrated in FIG. 4, the third electronic device 605 illustrated in FIG. 6, the third electronic device 705 illustrated in FIG. 7, the third electronic device 805 illustrated in FIG. 8, the third electronic device 905 illustrated in FIG. 9, the third electronic device 1413 illustrated in FIG. 14A, the third electronic device 1505 illustrated in FIG. 15, the third electronic device 1705 illustrated in FIGS. 17A and 17B, or the third electronic device 2409 illustrated in FIG. 24) may control a video call switching to the fourth electronic device 2507.

In various embodiments of the present disclosure, when a video call is switched to the fourth electronic device 2507, the first electronic device 2501 and the fourth electronic device 2507 perform a video call with each other, via the relay of the second electronic device 2503. Alternatively, when a video call is switched to the fourth electronic device 2507, the first electronic device 2501 and the fourth electronic device 2507 perform a video call with each other via a standalone network (e.g., the third network 2413 illustrated in FIG. 24) 2415, without the relay of the second electronic device 2503.

In another embodiment, while the second electronic device 2503 performs a video call with the first electronic device 2501, it is capable of receiving a video call request signal from a standalone device, e.g., the fourth electronic device 2507. In various embodiments of the present disclosure, the second electronic device 2503 is capable of establishing a new video call connection with the fourth electronic device 2507, while maintaining a video call with the first electronic device 2501, thereby performing a three-way video call. The newly joined, fourth electronic device 2507 is capable of obtaining information regarding the video call connection with the first electronic device 2501 from the second electronic device 2503. The fourth electronic device 2507 is capable of joining a video call with the second electronic device 2503, based on the obtained information regarding the video call connection with the first electronic device 2501, thereby performing a three-way video call with the first electronic device 2501. That is, the first electronic device 2501, the second electronic device 2503, and the fourth electronic device 2507 are capable of performing a three-way video call, and the second electronic device 2503 and the fourth electronic device 2507 are capable of performing a one-to-one video call with the first electronic device 2501. Various embodiments of the present disclosure enable the second electronic device 2503 to make a video call with the first electronic device 2501, without providing information regarding the second electronic device 2503 to other nearby devices, thereby increasing a user's usability of video call service.

In various embodiments of the present disclosure, after switching a video call to the fourth electronic device 2507, the second electronic device 2503 may maintain the authority for controlling a video call of the fourth electronic device 2507 or the fourth electronic device 2507 to which the video call is switched may control the video call.

Figure 26:
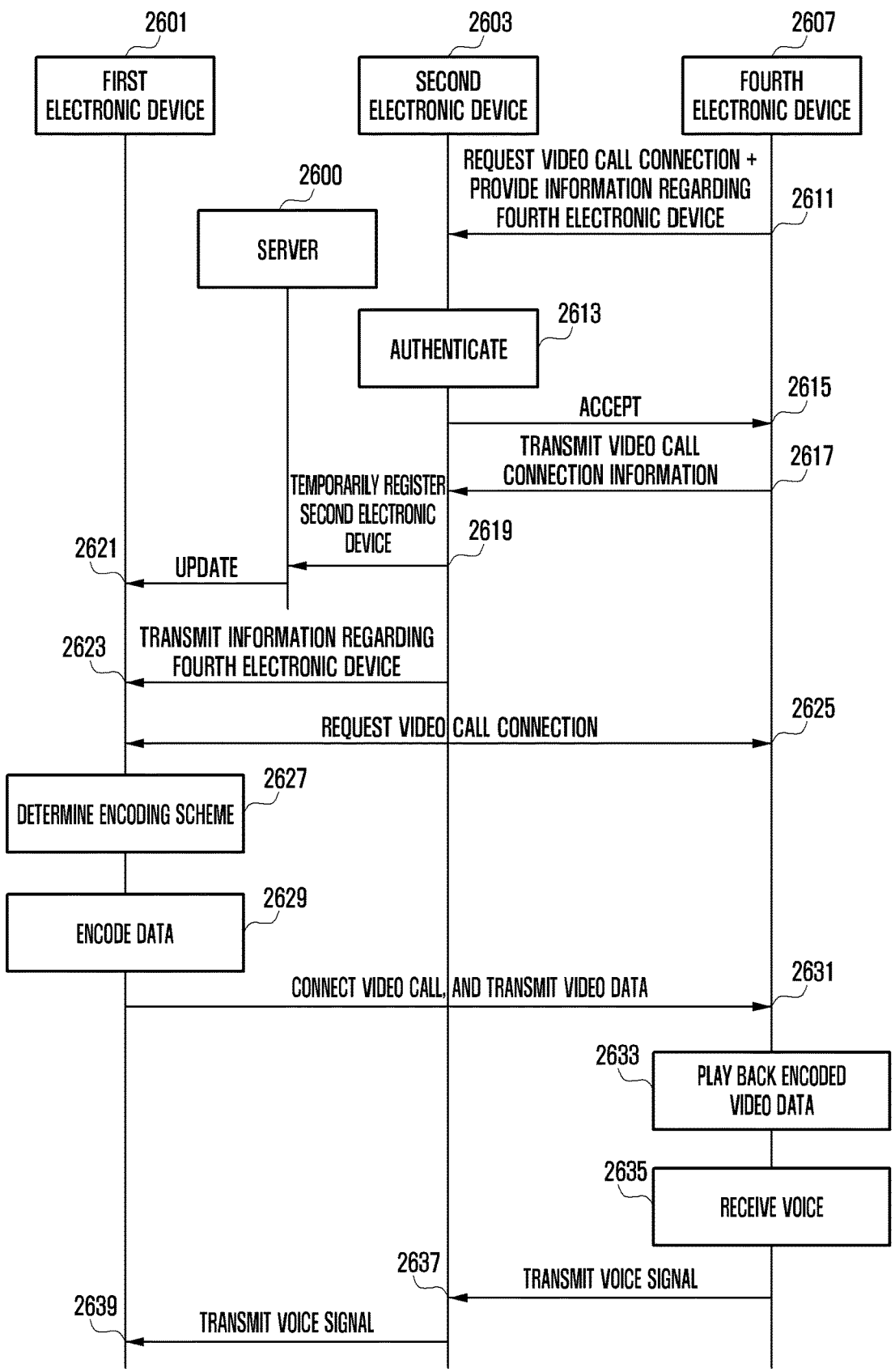
FIG. 26 is a signal flow diagram illustrating an example method of switching a video call to a fourth electronic device using an account management server, flowing signals between first, second and fourth electronic devices, according to various example embodiments of the present disclosure.

FIG. 26 is a signal flow diagram illustrating an example method of switching a video call to a fourth electronic device using an account management server, flowing signals between first, second and fourth electronic devices, according to various example embodiments of the present disclosure.

With reference to FIG. 26, various example embodiments of the present disclosure are capable of switching a video call from a third electronic device (e.g., the third electronic device 405 illustrated in FIG. 4, the third electronic device 605 illustrated in FIG. 6, the third electronic device 705 illustrated in FIG. 7, the third electronic device 805 illustrated in FIG. 8, the third electronic device 905 illustrated in FIG. 9, the third electronic device 1413 illustrated in FIG.

14A, the third electronic device 1505 illustrated in FIG. 15, the third electronic device 1705 illustrated in FIGS. 17A and 17B, or the third electronic device 2409 illustrated in FIG. 24) to a fourth electronic device 2607 (e.g., the fourth electronic device 2411 illustrated in FIG. 24, the fourth electronic device 2507 illustrated in FIG. 25), using an account management server 2600. The fourth electronic device 2607 is capable of requesting the second electronic device 2603 (e.g., the second electronic device 403 illustrated in FIG. 4, the second electronic device 603 illustrated in FIG. 6, the second electronic device 703 illustrated in FIG. 7, the second electronic device 803 illustrated in FIG. 8, the second electronic device 903 illustrated in FIG. 9, the second electronic device 1123 illustrated in FIG. 11, the second electronic device 1215 illustrated in FIG. 12, the second electronic device 1703 illustrated in FIGS. 17A and 17B, the second electronic device 2405 illustrated in FIG. 24, or the second electronic device 2503 illustrated in FIG. 25) to switch a video call, and transmitting its information to the second electronic device 2603 in operation 2611. When the second electronic device 2603 receives a video call switching request signal and information regarding the fourth electronic device 2607, it is capable of authenticating the fourth electronic device 2607 in operation 2613. The second electronic device 2603 is capable of transmitting, to the fourth electronic device 2607, a signal for accepting the video call switching request by the fourth electronic device 2607 in operation 2615.

Although the embodiment is described in such a way that the second electronic device 2603 authenticates the fourth electronic device 2607 in operation 2613, it should be understood that the present disclosure is not limited thereto. For example, the embodiment may be modified in such a way that a third electronic device, connected to an electronic device performing a video call, e.g., the second electronic device 2603 via a second network (e.g., the second network 413 illustrated in FIG. 4, the second network 1531 illustrated in FIG. 15, or the second network 2407 illustrated in FIG. 24), selects another electronic device, e.g., the fourth electronic device 2607, and switches a video call, and, in this case, it may not perform the authentication for the fourth electronic device 2607.

The second electronic device 2603 is capable of transmitting information regarding the video call connection with the first electronic device 2601 (e.g., the first electronic device 401 illustrated in FIG. 4, the first electronic device 601 illustrated in FIG. 6, the first electronic device 701 illustrated in FIG. 7, the first electronic device 801 illustrated in FIG. 8, the first electronic device 901 illustrated in FIG. 9, the first electronic device 1401 illustrated in FIG. 14A, the first electronic device 1701 illustrated in FIGS. 17A and 17B, the first electronic device 2401 illustrated in FIG. 24, or the first electronic device 2501 illustrated in FIG. 25) to fourth electronic device 2607 in operation 2617.

In various embodiments of the present disclosure, the second electronic device 2603 is capable of temporarily registering information regarding the fourth electronic device 2607 in a server 2600 in operation 2619.

In various embodiments of the present disclosure, the server 2600 is capable of including a user account server. The user account server is capable of registering and managing user accounts and users' electronic devices. For example, the user account server is capable of managing a user's electronic device and information regarding the electronic device (e.g., status information) based on a user account. As described above, the user account server is capable of providing a method of temporarily registering an electronic device and performing a video call with the temporarily registered electronic device, as well as the user account-based management method. For example, when the user account server has registered a smartphone, a tablet PC, and a watch, based on a user account, it is capable of temporarily registering an electronic device, e.g., a TV, without using the user account. In this case, an electronic device performs a video call with the TV, temporarily registered in the user account server, without a user account.

In various embodiments of the present disclosure, the first electronic device 2601 is capable of receiving and updating information regarding the fourth electronic device 2607, as an electronic device to perform a video call, from the server 2600 in operation 2621. The second electronic device 2603 is capable of transmitting information regarding the fourth electronic device 2607 to the first electronic device 2601 in operation 2623.

In various embodiments of the present disclosure, the fourth electronic device 2607 is capable of making a video call connection request to the first electronic device 2601, based on information regarding the video call connection with the first electronic device 2601, in operation 2625. The first electronic device 2601 is capable of determining an encoding scheme, based on the information regarding the fourth electronic device 2607, in operation 2627, and encoding video data based on the encoding scheme in operation 2629. The first electronic device 2601 is capable of transmitting the encoded video data to the fourth electronic device 2607 and switching a video call to the fourth electronic device 2607 in operation 2631. The fourth electronic device 2607 is capable of performing a video call with the first electronic device 2601, reproducing the received, encoded video data in operation 2633. The fourth electronic device 2607 receives a voice using the microphone (e.g., the microphone 563) in operation 2635, and transmits the voice signal to the second electronic device 2603 in operation 2637. The second electronic device 2603 is capable of forwarding the received voice signal to the first electronic device 2601 in operation 2639. Therefore, the first electronic device 2601 and the fourth electronic device 2607 perform a video call with each other.

When the video call is ended, information regarding the fourth electronic device 2607, temporarily registered in the account management server 2600, may be removed.

Although the embodiment is described in such a way that the second electronic device 2603 controls a video call switching to the fourth electronic device 2607, it should be understood that the present disclosure is not limited thereto. For example, although it is not shown in FIG. 26, a third electronic device may control a video call switching to the fourth electronic device 2507.

In various embodiments of the present disclosure, when a video call is switched to the fourth electronic device 2607, the first electronic device 2601 and the fourth electronic device 2607 perform a video call with each other, via the relay of the second electronic device 2603. Alternatively, when a video call is switched to the fourth electronic device 2607, the first electronic device 2601 and the fourth electronic device 2607 perform a video call with each other via a standalone network (e.g., the third network 2413 illustrated in FIG. 24), without the relay of the second electronic device 2603.

Figure 27:
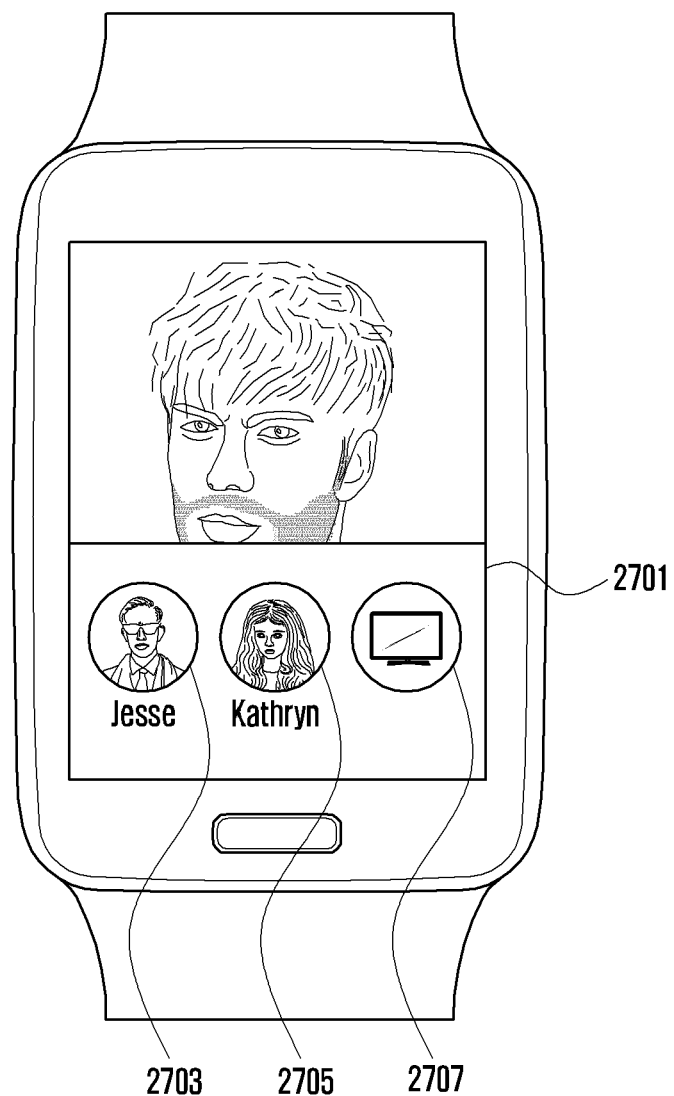
FIG. 27 is a diagram illustrating an example user interface when a third electronic device discovers nearby electronic devices and switches a video call to an electronic device, according to various example embodiments of the present disclosure.

FIG. 27 is a diagram illustrating an example user interface when a third electronic device discovers nearby electronic devices and switches a video call to an electronic device, according to various example embodiments of the present disclosure.

With reference to FIG. 27, a third electronic device (e.g., the third electronic device 405 illustrated in FIG. 4, the third electronic device 605 illustrated in FIG. 6, the third electronic device 705 illustrated in FIG. 7, the third electronic device 805 illustrated in FIG. 8, the third electronic device 905 illustrated in FIG. 9, the third electronic device 1413 illustrated in FIG. 14A, the third electronic device 1505 illustrated in FIG. 15, the third electronic device 1705 illustrated in FIGS. 17A and 17B, or the third electronic device 2409 illustrated in FIG. 24) is capable of discovering electronic devices to which a video call can be switched. For example, the third electronic device is capable of discovering electronic devices to which a video call can be switched, via at least one of the following: BLE, Wi-Fi, and Zigbee. The third electronic device is capable of displaying electronic devices which are connected to the same network as the third electronic device and to which a video call can be switched, in response to the operation for discovering electronic devices. For example, the third electronic device is capable of discovering electronic devices such as home appliances, electric apparatuses, health care devices, remote metering devices, smart home system, smart cars, etc., connected to a network to which the third electronic device is connected, and sharing information regarding the discovered electronic devices with each other.

In various embodiments of the present disclosure, electronic devices to which a video call can be switched may or may not be registered, based on user accounts (a user account server). When an electronic device has been registered based on a user account, the third electronic device is capable of displaying an icon (e.g., a profile photo/picture) representing the registered electronic device, along with the account information. When an electronic device has not been registered based on a user account, the third electronic device is capable of displaying only an icon of the electronic device showing a connectable state, without showing account information. In various embodiments of the present disclosure, the account information may be contained in the discovery signal or may be obtained from a user account server, based on the discovery signal.

In various embodiments of the present disclosure, when the third electronic device receives an input for selecting a specified one of the discovered electronic devices to which a video call can be switched, it is capable of controlling the first electronic device (e.g., the first electronic device 401 illustrated in FIG. 4, the first electronic device 2401 illustrated in FIG. 24, the first electronic device 2501 illustrated in FIG. 25, or the first electronic device 2601 illustrated in FIG. 26) and the selected, specified electronic device to perform a video call to each other.

For example, as illustrated in FIG. 27, the third electronic device is capable of displaying a pop-up window 2701 including Jesse 2703, Kathryn 2705, and TV icon 2707 to which a video call can be switched, in response to the operation for discovering electronic devices to which a video call can be switched. In various embodiments of the present disclosure, when the third electronic device discovers an electronic device registered based on user account, it is capable of displaying icons corresponding to electronic devices of Jesse 2703 and Kathryn 2705, along with account information regarding Jesse 2703 and Kathryn 2705. On the other hand, when the third electronic device discovers an electronic device which has not been registered based on user account, it is capable of displaying only an icon 2707 representing a TV. When the third electronic device receives an input for selecting one of the icons representing electronic devices of Jesse 2703 and Kathryn 2705 and TV 2707, it is capable of switching a video call to the electronic device or the TV corresponding to the selected icon.

In another embodiment of the present disclosure, a video call switching operation may also be performed via infrared communication. For example, various embodiments of the present disclosure are capable of selecting an electronic device to which a video call to be switched, by using a remote controller, an infrared light emitting unit of an electronic device, and a light receiving unit of a TV remote control. For example, electronic devices which need to perform a video call may exchange a signal for switching a video call and information regarding the electronic devices with each other via infrared communication. Therefore, various embodiments of the present disclosure allow users to intuitively switch a video call from one to another electronic device.

Figure 28:
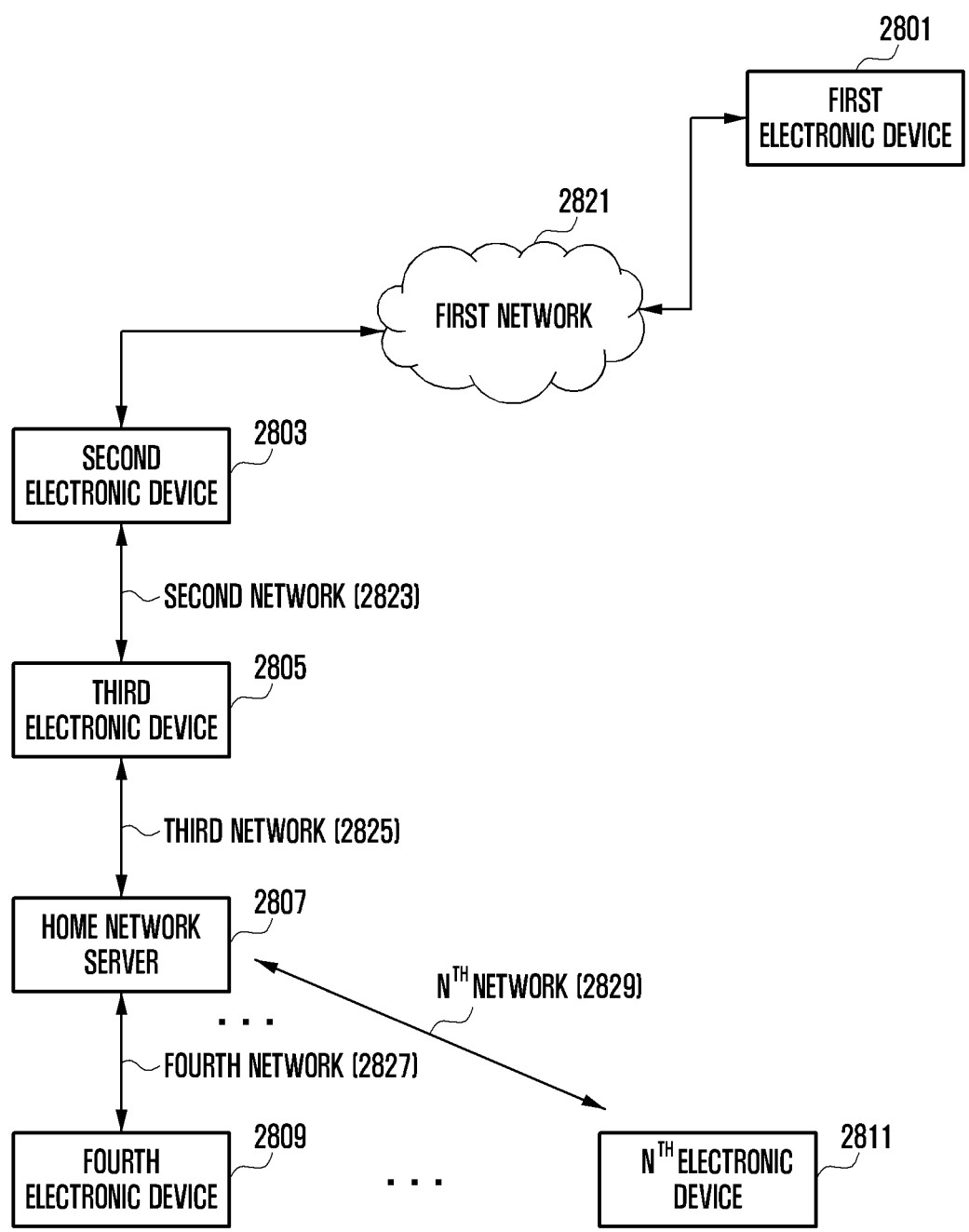
FIG. 28 is a diagram illustrating example connections among first to fourth electronic devices according to various example embodiments of the present disclosure.

FIG. 28 is a diagram illustrating an example connection among first to fourth electronic devices according to various example embodiments of the present disclosure.

Various embodiments of the present disclosure are capable of performing a video call via a chain structure of an extended connection device or two or more electronic devices.

With reference to FIG. 28, a first electronic device 2801 (e.g., the first electronic device 401 illustrated in FIG. 4, the first electronic device 601 illustrated in FIG. 6, the first electronic device 701 illustrated in FIG. 7, the first electronic device 801 illustrated in FIG. 8, the first electronic device 901 illustrated in FIG. 9, the first electronic device 1401 illustrated in FIG. 14A, the first electronic device 1701 illustrated in FIGS. 17A and 17B, the first electronic device 2401 illustrated in FIG. 24, the first electronic device 2501 illustrated in FIG. 25, or the first electronic device 2601 illustrated in FIG. 26) is capable of connecting to a second electronic device 2803 (e.g., the second electronic device 403 illustrated in FIG. 4, the second electronic device 603 illustrated in FIG. 6, the second electronic device 703 illustrated in FIG. 7, the second electronic device 803 illustrated in FIG. 8, the second electronic device 903 illustrated in FIG. 9, the second electronic device 1123 illustrated in FIG. 11, the second electronic device 1215 illustrated in FIG. 12, the second electronic device 1703 illustrated in FIGS. 17A and 17B, the second electronic device 2405 illustrated in FIG. 24, the second electronic device 2503 illustrated in FIG. 25, or the second electronic device 2603 illustrated in FIG. 26) via a first network 2821 (e.g., the first network 411 illustrated in FIG. 4, the first network 1523 illustrated in FIG. 15, or the first network 2403 illustrated in FIG. 24). The second electronic device 2803 is capable of connecting to a third electronic device 2805 (e.g., the third electronic device 405 illustrated in FIG. 4, the third electronic device 605 illustrated in FIG. 6, the third electronic device 705 illustrated in FIG. 7, the third electronic device 805 illustrated in FIG. 8, the third electronic device 905 illustrated in FIG. 9, the third electronic device 1413 illustrated in FIG. 14A, the third electronic device 1505 illustrated in FIG. 15, the third electronic device 1705 illustrated in FIGS. 17A and 17B, or the third electronic device 2409 illustrated in FIG. 24) via a second network 2823 (e.g., the second network 413 illustrated in FIG. 4, the second network 1531 illustrated in FIG. 15, or the second network 2407 illustrated in FIG. 24). The third electronic device 2805 is capable of connecting to a home network server 2807 via a third network 2825. The fourth electronic device 2809 is capable of connecting to the home network server 2807 via a fourth network 2827.

In various embodiments of the present disclosure, the home network server 2807 allows for the connection of a number of electronic devices. The home network server 2807 is capable of connecting to an Internet of things (IoT) network. For example, the home network server 2807 is connected with $n^{th}$ electronic devices 2811 (n is a positive integer) including the fourth electronic device 2809 via $n^{th}$ network 2829 (n is a positive integer). The home network server 2807 is capable of registering electronic devices over a wide area and also monitoring status information regarding the registered electronic devices. Therefore, users can recognize status information regarding the electronic devices registered in the home network server 2807 and immediately check whether electronic devices may perform a video call based on the status information.

In various embodiments of the present disclosure, the home network server 2807 is capable of connecting a video call between the first electronic device 2801 and the third electronic device 2805 to the fourth electronic device 2809.

For example, when three or more electronic devices are connected in chain structure, one of the three or more electronic devices, in the middle of the chain structure, e.g., the home network server 2807, is capable of relaying information regarding the connected electronic devices and information regarding the network to the electronic devices.

In various embodiments of the present disclosure, the home network server 2807 is capable of serving as an encoder. For example, the home network server 2807 is capable of controlling the first electronic device 2801, the second electronic device 2803, the third electronic device 2805, and the encoder of the home network server 2807 to transmit video data to the fourth electronic device 2809. When the first network 2821, connecting the first electronic device 2801 and the second electronic device 2803, the second network 2823, connecting the second electronic device 2803 and the third electronic device 2805, and the third network 2825, connecting the third electronic device 2805 and the home network server 2807, have a relatively high level of quality, respectively, the first electronic device 2801 or the second electronic device 2803 is capable of transmitting video data for video call to the home network server 2807, without encoding the video data.

In various embodiments of the present disclosure, the home network server 2807 is capable of encoding the received video data for video call, based on an encoding scheme, e.g., a transcoding scheme. For example, when the home network server 2807 employs a stationary power supply, it may encode video data more efficiently using its power supply than using a battery of the first electronic device 2801 or the second electronic device 2803.

In various embodiments of the present disclosure, the process of encoding video data using a scalable encoding scheme is capable of transmitting part of the layers received from individual electronic devices to the next, connected electronic device, thereby maximizing a scalable encoding effect. For example, the first electronic device 2801 is capable of transmitting a base layer and an enhanced layer #1 to the second electronic device 2803, according to conditions. The second electronic device 2803 is capable of transmitting the received base layer and the received enhanced layer #1 to the third electronic device 2805. The third electronic device 2805 detects a signal for switching a video call to the fourth electronic device 2809, it is capable of transmitting the base layer and the enhanced layer #1, received the second electronic device 2803, to the home network server 2807. The home network server 2807 is capable of transmitting, to the fourth electronic device 2809, not all the base layer and the enhanced layer #1, received from the third electronic device 2805, but only the base layer, according to conditions.

Various embodiments of the present disclosure are capable of switching a video call, based on the third electronic device 2805 or the home network server 2807.

Figure 29:
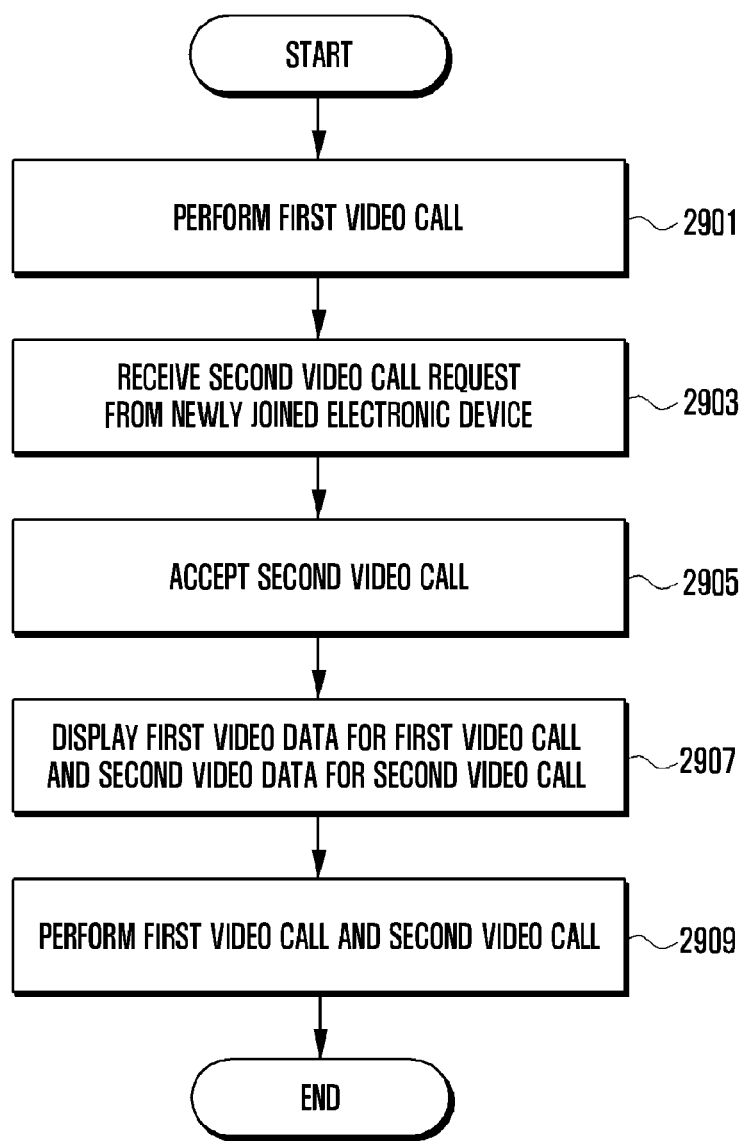
FIG. 29 is a flowchart illustrating an example multiple connection method according to various example embodiments of the present disclosure.

FIG. 29 is a flowchart illustrating an example multiple connection method according to various example embodiments of the present disclosure.

In various embodiments of the present disclosure, a second electronic device (e.g., the second electronic device 403 illustrated in FIG. 4, the second electronic device 603 illustrated in FIG. 6, the second electronic device 703 illustrated in FIG. 7, the second electronic device 803 illustrated in FIG. 8, the second electronic device 903 illustrated in FIG. 9, the second electronic device 1123 illustrated in FIG. 11, the second electronic device 1215 illustrated in FIG. 12, the second electronic device 1703 illustrated in FIGS. 17A and 17B, the second electronic device 2405 illustrated in FIG. 24, the second electronic device 2503 illustrated in FIG. 25, the second electronic device 2603 illustrated in FIG. 26, or the second electronic device 2803 illustrated in FIG. 28) or a third electronic device (e.g., the third electronic device 405 illustrated in FIG. 4, the third electronic device 605 illustrated in FIG. 6, the third electronic device 705 illustrated in FIG. 7, the third electronic device 805 illustrated in FIG. 8, the third electronic device 905 illustrated in FIG. 9, the third electronic device 1413 illustrated in FIG. 14A, the third electronic device 1505 illustrated in FIG. 15, the third electronic device 1705 illustrated in FIGS. 17A and 17B, the third electronic device 2409 illustrated in FIG. 24, or the third electronic device 2805 illustrated in FIG. 28), connected to the second electronic device, is capable of independently performing a multiple video call. In various embodiments of the present disclosure, when a multiple video call is performed via the second electronic device or the third electronic device connected to the second electronic device, the second or third electronic device is capable of performing a first video call, e.g., a video calling which is performed in a normal way by transmitting/receiving video and voice signals, and a second video call with another electronic device newly joined, e.g., a video calling which is performed in such a way as to transmit/receive a video data, using a speech to text (STT) or text to speech (TTS) function.

With reference to FIG. 29, the third electronic device is capable of performing a first video call in operation 2901. For example, the third electronic device has been performing a first video call, via a tablet PC.

The third electronic device is capable of receiving a second video call request from a newly joined electronic device in operation 2903. For example, the third electronic device is capable of receiving a second video call request from a new electronic device while performing a first video call via the tablet PC.

The third electronic device is capable of accepting a second video call in operation 2905. For example, the third electronic device is capable of: selecting another electronic device, e.g., a TV or a car kit, instead of the tablet PC, as an electronic device to perform a second video call; and perform a second video call with the newly selected electronic device.

The third electronic device is capable of displaying first video data for a first video call and second video data for a second video call in operation 2907. For example, the first video call is referred to as a normal video call performed in such a way as to transmit/receive video and voice signals.

The second video call is referred as a video call performed in such a way as to process voice information using an STT/TTS function, while displaying only an image on screen. For example, the third electronic device is capable of displaying subtitles for the voice information. When the third electronic device detects an input for entering characters/letters/text, it is capable of transmitting voice signals for the received characters/letters/text to the other party's electronic device. The third electronic device may employ a separate input device for entering characters/letters/text, e.g., a Bluetooth keyboard.

In various embodiments of the present disclosure, the third electronic device is capable of discerning between an enabled video call and a video call in an idle state (e.g., a disenabled video call), using a control device, e.g., a watch, etc. For example, the third electronic device is capable of transmitting/receiving a voice signal when a video call is enabled. When the third electronic device receives a voice signal from the other party's electronic device when a video call is in an idle state, it is capable of notifying the user that a voice signal has been received from the other party's electronic device, by outputting a notification, vibration, blinking, a beep sound, etc.

In various embodiments of the present disclosure, the third electronic device is capable of performing a first video call and a second video call in operation 2909. For example, the third electronic device is capable of splitting its screen into two areas and displaying first video data for a first video call on one of the two areas (a first area) and second video data for a second video call on the other area (a second area). The two split areas may be adjusted by the user. As described above, the first video call and the second video call are simultaneously performed in such a way that the first video call is performed as a normal video call and the second video call is performed using an STT/TTS function. Various embodiments are capable of discerning between an enabled video call and a video call in an idle state, and simultaneously performing a first video call and a second video call. In various embodiments of the present disclosure, notifications according to voice information may be displayed via individual windows. The third electronic device may output a notification via a watch.

Figure 30:
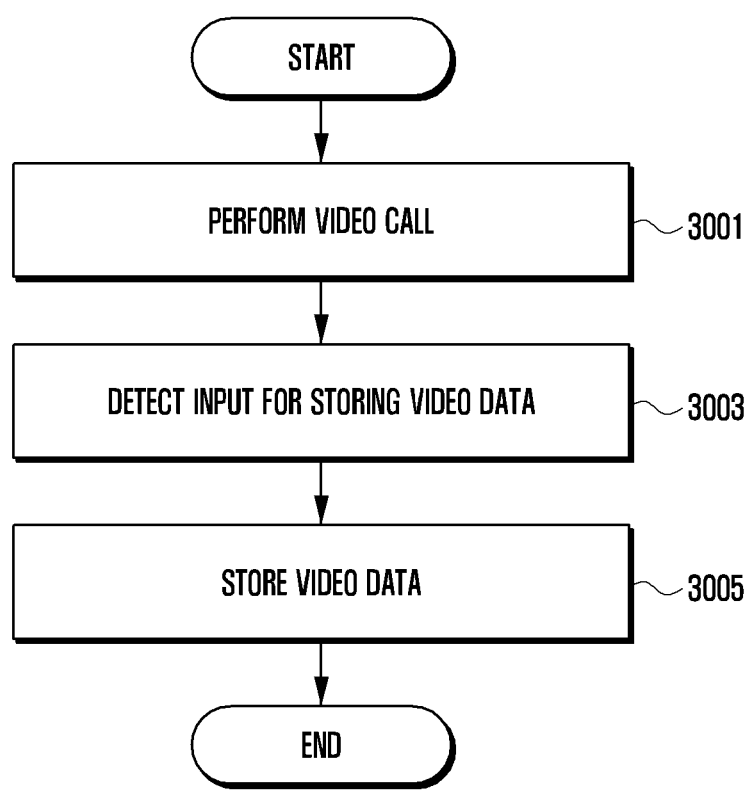
FIG. 30 is a flowchart illustrating an example method of storing video data according to various example embodiments of the present disclosure.

FIG. 30 is a flowchart illustrating an example method of storing video data according to various embodiments of the present disclosure.

In various embodiments of the present disclosure, a second electronic device (e.g., the second electronic device 403 illustrated in FIG. 4, the second electronic device 603 illustrated in FIG. 6, the second electronic device 703 illustrated in FIG. 7, the second electronic device 803 illustrated in FIG. 8, the second electronic device 903 illustrated in FIG. 9, the second electronic device 1123 illustrated in FIG. 11, the second electronic device 1215 illustrated in FIG. 12, the second electronic device 1703 illustrated in FIGS. 17A and 17B, the second electronic device 2405 illustrated in FIG. 24, the second electronic device 2503 illustrated in FIG. 25, the second electronic device 2603 illustrated in FIG. 26, or the second electronic device 2803 illustrated in FIG. 28) receiving a video call or a third electronic device (e.g., the third electronic device 405 illustrated in FIG. 4, the third electronic device 605 illustrated in FIG. 6, the third electronic device 705 illustrated in FIG. 7, the third electronic device 805 illustrated in FIG. 8, the third electronic device 905 illustrated in FIG. 9, the third electronic device 1413 illustrated in FIG. 14A, the third electronic device 1505 illustrated in FIG. 15, the third electronic device 1705 illustrated in FIGS. 17A and 17B, the third electronic device 2409 illustrated in FIG. 24, or the third electronic device 2805 illustrated in FIG. 28) connected to the second electronic device is capable of storing video call according to a user's setting or a user's selection. For example, a screen or voices of the video data may be stored. Alternatively, a screen and voices are stored together.

With reference to FIG. 30, the third electronic device performs a video call in operation 3001. During a video call, the third electronic device is capable of detecting an input for storing video data in operation 3003. When detecting an input for storing video data, the third electronic device is capable of transmitting the detected input to the second electronic device. The second electronic device is capable of requesting the first electronic device performing a video call to transmit video data to store a video, based on the received input. For example, when the second electronic device receives an input for capturing or storing a specified screen from the third electronic device, while reproducing video data for video call, it is capable of requesting the first electronic device, which creates the video data for performing a video call, to transmit video data for the specified screen, e.g., images. When the first electronic device receives a request for transmission of video data for a specified screen from the second electronic device, it is capable of extracting video call corresponding to the specified screen and transmitting the extracted video data to the second electronic device. The first electronic device is capable of transmitting high quality of images, referred to as images not re-processed considering network status information, etc., to the second electronic device. The high quality of images may be transmitted via a control signal channel or a newly established channel.

In various embodiments of the present disclosure, the third electronic device is capable of storing video data in operation 3005. For example, the third electronic device is capable of storing video call for a specified screen, based on external conditions of the second or third electronic device. For example, when the first electronic device is in an external environment where it is bright and nosy, and the second electronic device is in an external environment where it is dark and quiet, the third electronic device is capable of storing video call for a specified screen at a low level of brightness and a low level of volume corresponding to the external condition of the second electronic device. That is, images or voices may be captured and stored, considering information regarding the surrounding environment of the second or third electronic device.

In various embodiments of the present disclosure, when the third electronic device transmits an input for storing a video running on a screen to the second electronic device, it may receive video data before video-processing from the second electronic device and may store the received video data. Therefore, the user's electronic device is capable of obtaining higher quality of video data. In this case, the video may be transmitted to and stored in the third electronic device or may be stored in the second electronic device. For example, when an external TV, as an electronic device to provide a video call service, is temporarily selected, the third electronic device is capable of storing the video in the second or third electronic device, instead of the TV providing a video call service. That is, an electronic device to store video data may be set according to attributes of the electronic device, e.g., a condition as to whether the account is registered, a condition as to whether a type of electronic device is a device for public use, etc.

In various embodiments of the present disclosure, the video may be stored in a cloud storage. The cloud storage may include a cloud storage of electronic device owner's account, a cloud server of an account receiving a video call service, etc. The cloud storage may be selected by the user or according to attributes of an electronic device, e.g., a condition as to whether the account is registered, a condition as to whether a type of electronic device is a device for public use, etc.

In various embodiments of the present disclosure, when the third electronic device stores video data, e.g., a video and voices, it is capable of inserting a meta tag, e.g., a video call time, a place where a video call is made, or information regarding an electronic device, in the video data or marking a video or an image with a watermark shape.

In various embodiments of the present disclosure, when the third electronic device needs to store video data in small size or only voices, it is capable of extracting key frames and storing them using an image sliding method. For example, the third electronic device is capable of extracting key frames from video data for an interval of 10 minutes and storing the frames using an image sliding method. Therefore, various embodiments of the present disclosure are capable of storing video data reduced in storage capacity. The video may be stored in a format, synchronized with voice.

In various embodiments of the present disclosure, the stored video data may be inserted into or removed from a specified image via an editor. Voice and video of existing video data may be synchronized with each other, regardless of inserted/removed images.

Figure 31:
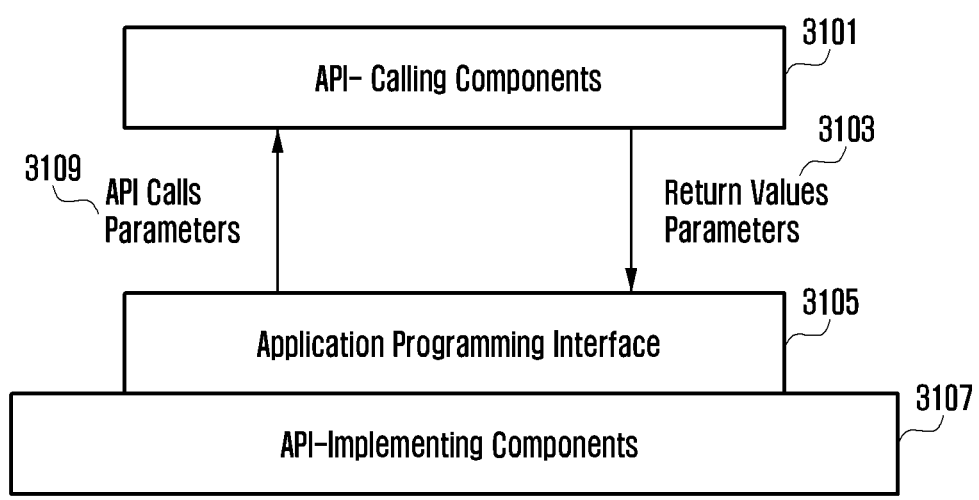
FIG. 31 is a diagram illustrating an example configuration of software according to various example embodiments of the present disclosure.

FIG. 31 is a diagram illustrating an example configuration of software according to various example embodiments of the present disclosure.

With reference to FIG. 31, various embodiments of the present disclosure are capable of providing a video calling method and a user interface, using application programming interface (API). Various embodiments of the present disclosure allow applications of electronic device manufacturers and third party applications to execute a video call and provide a corresponding user interface, using the API. For example, when an API 3105 calls an API-Calling components 3101 for parameters for performing a video call 3109, it is capable of receiving a parameter return value 3103 from the API-Calling components 3101. The API is capable of transferring the parameter return value 3103 to the API-Implementing components 3107. The API-Implementing components 3107 are capable of implementing a user interface for performing a video call, using the parameter return value 3103.

As described above, the video encoding method according to various embodiments of the present disclosure enables an electronic device receiving a video call to provide video data suitable for video calling to a wearable device connected to the electronic device, so that the user can easily make the video call with the wearable device on his/her body. The electronic device is adapted to the video encoding method.

The video encoding method according to various embodiments of the present disclosure is capable of analyzing states of a wearable device, in real time, and providing encoded video data, based on the analysis result, to the wearable device, so that the wearable device can smoothly make a video call although the wearable device has a limited battery level and a limited transfer rate. The electronic device is adapted to the video encoding method.

Although the video encoding method and electronic device adapted thereto according to various embodiments have been described, the scope of the disclosure is not limited thereto, and various changes and modifications can be made without departing from the essential features of the disclosure by those skilled in the art. Accordingly, the embodiments disclosed are provided merely for describing, but not limiting, the technical idea of the disclosure, and the scope of the technical idea of the disclosure is not limited by the various example embodiments. The scope of the disclosure should be construed by the appended claims, and all technical ideas within a range equivalent to the scope should be understood as being included in the scope of the disclosure.

What is claimed is:

1. An electronic device comprising:
a wireless communication circuit configured to communicate with a first electronic device;
one or more communication circuits;
a touchscreen;
a speaker;
a microphone;
a memory; and
one or more processors electrically connected to the wireless communication circuit, the one or more communication circuits, the touchscreen, the speaker, the memory and the microphone,
wherein the one or more processors are configured to:
perform a video call with a second electronic device via the wireless communication circuit and the first electronic device;
while performing the video call, receive a plurality of still images from the first electronic device via the wireless communication circuit, wherein the plurality of still images are extracted by the first electronic device from a video data stream received at the first electronic device from the second electronic device;
while performing the video call, receive a first voice data stream corresponding to the video call from the first electronic device via the wireless communication circuit, wherein the first voice data stream comprises encoded audio data stream generated based on audio data received at the first electronic device from the second electronic device; and
while performing the video call, transmit a second voice data stream corresponding to the video call to the second electronic device via the wireless communication circuit and the first electronic device, wherein the second voice data stream comprises encoded audio stream data generated based on audio data acquired by the microphone,
wherein the plurality of still images are different from each other and discontinuous from each other while the first and second voice data stream are continuous streaming data.

2. The electronic device of claim 1, wherein:
a display of the electronic device is smaller than a display of the first electronic device,
a battery performance of the electronic device is less than a battery performance of the first electronic device, and
a processing capability of the electronic device is lower than that a processing capability of the first electronic device.

3. The electronic device of claim 1, wherein the plurality of still images respectively corresponds to I-frames of the video data stream received at the first electronic device from the second electronic device.

4. The electronic device of claim 2, wherein the wireless communication circuit comprises a Bluetooth communication circuit and/or a Wi-Fi communication circuit.

5. The electronic device of claim 4, wherein:
the plurality of still images are received via the Wi-Fi communication circuit, and
the first voice data stream and second voice data stream are received via the Bluetooth communication circuit.

6. The electronic device of claim 4, wherein:
the plurality of still images are received via a first Bluetooth profile, and
the first voice data stream and second voice data stream are received via a second Bluetooth profile.

7. The electronic device of claim 6, wherein:
the first Bluetooth profile comprises a serial port profile (SPP), and
the second Bluetooth profile comprises a hands free profile (HFP).

8. An electronic device comprising:
a first wireless communication circuit configured to communicate with a wearable electronic device;
a second wireless communication circuit configured to communicate with a second electronic device through at least one network;
a display;
a speaker;
a microphone;
a memory; and
one or more processors electrically connected to the first and the second wireless communication circuits, the display, the speaker, the microphone, and the memory,
wherein the one or more processors are configured to:
detect occurrence of an event related to initiation or acceptance of a video call;
when the event occurs by the wearable electronic device operably connected with the electronic device:
receive, from the second electronic device via the second wireless communication circuit, a video data stream and a first audio data stream corresponding to the video call encoded based on attribute information of the wearable electronic device and status information of the first and the second wireless communication circuits, and transmit, to the wearable device via the first wireless communication circuit, the encoded video data stream and the encoded first audio data stream so as to perform the video call at the wearable electronic device; and
receive, from the wearable electronic device via the first wireless communication circuit, a second audio data stream corresponding to the video call, wherein the second audio data stream comprises encoded audio stream data generated based on audio data acquired by a microphone of the wearable electronic device, and transmit, to the second electronic device via the second wireless communication circuit, the second audio data stream so as to perform the video call at the second electronic device, wherein the first and the second audio data streams are continuous streaming data; and
when the event occurs by the electronic device, receive, from the second electronic device via the second wireless communication circuit, a video data stream encoded based on attribute information of the electronic device and status information of the second wireless communication circuit so as to perform the video call at the electronic device.

9. The electronic device of claim 8, wherein:
the attribute information of the wearable electronic device incudes at least one of a type of the wearable electronic device, a size of a display, a maximum resolution, a battery status, or memory capacity, and
the status information of the first and second wireless communication circuits includes at least one of state or signal quality.

10. The electronic device of claim 8, wherein the attribute information of the electronic device incudes at least one of a type of the wearable electronic device, a size of a display, a maximum resolution, a battery status, or memory capacity.

11. A method of performing a video call of an electronic device comprising:
performing a video call with a second electronic device via a wireless communication circuit and a first electronic device;
while performing the video call, receiving a plurality of still images from the first electronic device via the wireless communication circuit, wherein the plurality of still images are extracted by the first electronic device from a video data stream received at the first electronic device from the second electronic device;
while performing the video call, receiving a first voice data stream corresponding to the video call from the first electronic device via the wireless communication circuit, wherein the first voice data stream comprises encoded audio data stream generated based on audio data received at the first electronic device from the second electronic device; and
while performing the video call, transmitting a second voice data stream corresponding to the video call to the second electronic device via the wireless communication circuit and the first electronic device, wherein the second voice data stream comprises encoded audio stream data generated based on audio data acquired by the microphone,
wherein the plurality of still images are different from each other and discontinuous from each other while the first and second voice data stream are continuous streaming data.

12. The method of claim 11, wherein:
a display of the electronic device is smaller than a display of the first electronic device,
a battery performance of the electronic device is less than that a battery performance of the first electronic device, and
a processing capability of the electronic device is lower than that a processing capability of the first electronic device.

13. The method of claim 11, wherein the plurality of still images respectively corresponds to I-frames of the video data stream received at the first electronic device from the second electronic device.

14. The method of claim 12, wherein the wireless communication circuit comprises a Bluetooth communication circuit and/or a Wi-Fi communication circuit.

15. The method of claim 14, wherein:
the plurality of still images are received via the Wi-Fi communication circuit, and
the first voice data stream and second voice data stream are received via the Bluetooth communication circuit.

16. The method of claim 14, wherein:
the plurality of still images are received via a first Bluetooth profile, and
the first voice data stream and second voice data stream are received via a second Bluetooth profile.

17. The method of claim 16, wherein:
the first Bluetooth profile comprises a serial port profile (SPP), and
the second Bluetooth profile comprises a hands free profile (HFP).

18. A method of performing a video call of an electronic device, the method comprising:
detecting occurrence of an event related to initiation or acceptance of a video call;
when the event occurs by a wearable electronic device operably connected with the electronic device:
receiving, from a second electronic device via a second wireless communication circuit, a video data stream and a first audio data stream corresponding to the video call encoded based on attribute information of the wearable electronic device and status information of a first and the second wireless communication circuits, and transmitting, to the wearable electronic device via the first wireless communication circuit, the encoded video data stream and the encoded first audio data stream so as to perform the video call at the wearable electronic device; and
receiving, from the wearable electronic device via the first wireless communication circuit, a second audio data stream corresponding to the video call, wherein the second audio data stream comprises encoded audio stream data generated based on audio data acquired by a microphone of the wearable electronic device, and transmitting, to the second electronic device via the second wireless communication circuit, the second audio data stream so as to perform the video call at the second electronic device, wherein the first and the second audio data streams are continuous streaming data; and
when the event occurs by the electronic device, receiving, from the second electronic device via the second wireless communication circuit, a video data stream encoded based on attribute information of the electronic device and status information of the second wireless communication circuit so as to perform the video call at the electronic device.

19. The method of claim 18, wherein:
the attribute information of the wearable electronic device incudes at least one of a type of the wearable electronic device, a size of a display, a maximum resolution, a battery status, or memory capacity, and
the status information of the first and second wireless communication circuits includes at least one of state or signal quality.

20. The method of claim 18, wherein the attribute information of the electronic device incudes at least one of a type of the wearable electronic device, a size of a display, a maximum resolution, a battery status, or memory capacity.

* * * * *